United States Patent
Sugio et al.

(10) Patent No.: US 12,289,470 B2
(45) Date of Patent: *Apr. 29, 2025

(54) THREE-DIMENSIONAL DATA ENCODING METHOD, THREE-DIMENSIONAL DATA DECODING METHOD, THREE-DIMENSIONAL DATA ENCODING DEVICE, AND THREE-DIMENSIONAL DATA DECODING DEVICE

(71) Applicant: Panasonic Intellectual Property Corporation of America, Torrance, CA (US)

(72) Inventors: Toshiyasu Sugio, Osaka (JP); Noritaka Iguchi, Osaka (JP); Pongsak Lasang, Singapore (SG); Chi Wang, Singapore (SG); Chung Dean Han, Singapore (SG)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/390,138

(22) Filed: Dec. 20, 2023

(65) Prior Publication Data

US 2024/0137561 A1 Apr. 25, 2024

Related U.S. Application Data

(63) Continuation of application No. 17/381,789, filed on Jul. 21, 2021, now Pat. No. 11,902,577, which is a
(Continued)

(51) Int. Cl.
*H04N 19/597* (2014.01)
*H04N 19/167* (2014.01)
(Continued)

(52) U.S. Cl.
CPC ......... *H04N 19/597* (2014.11); *H04N 19/167* (2014.11); *H04N 19/182* (2014.11);
(Continued)

(58) Field of Classification Search
CPC .. H04N 19/597; H04N 19/167; H04N 19/182; H04N 19/46; H04N 19/85; H04N 13/246; H04N 13/282; G01S 17/89
See application file for complete search history.

(56) References Cited

U.S. PATENT DOCUMENTS

| 5,850,226 A | 12/1998 | Nagasawa et al. |
| 11,432,009 B2 * | 8/2022 | Salahieh ............ H04N 13/178 |

(Continued)

FOREIGN PATENT DOCUMENTS

| CN | 105447855 | | 3/2016 |
| CN | 105447855 A | * | 3/2016 |

(Continued)

OTHER PUBLICATIONS

Xiangmo CN 106204705 translated Jul. 2016 (Year: 2016).*
(Continued)

*Primary Examiner* — Zaihan Jiang
(74) *Attorney, Agent, or Firm* — Wenderoth, Lind & Ponack, L.L.P.

(57) ABSTRACT

A three-dimensional data encoding method includes: obtaining geometry information which includes first three-dimensional positions on a measurement target, and is generated by a measurer that radially emits an electromagnetic wave in different directions and obtains a reflected wave which is the electromagnetic wave that is reflected by the measurement target; generating a two-dimensional image including first pixels corresponding to the directions, based on the geometry information; and encoding the two-dimensional image to generate a bitstream. Each of the first pixels has a pixel
(Continued)

value indicating a first three-dimensional position or attribute information of a three-dimensional point which is included in a three-dimensional point cloud and corresponds to a direction to which the first pixel corresponds among the directions.

10 Claims, 55 Drawing Sheets

Related U.S. Application Data continuation of application No. PCT/JP2020/004561, filed on Feb. 6, 2020.

(60) Provisional application No. 62/801,841, filed on Feb. 6, 2019.

(51) Int. Cl.
| | | |
|---|---|---|
| *H04N 19/182* | (2014.01) | |
| *H04N 19/46* | (2014.01) | |
| *H04N 19/85* | (2014.01) | |
| *G01S 17/89* | (2020.01) | |
| *H04N 13/246* | (2018.01) | |
| *H04N 13/282* | (2018.01) | |

(52) U.S. Cl.
CPC ............ *H04N 19/46* (2014.11); *H04N 19/85* (2014.11); *G01S 17/89* (2013.01); *H04N 13/246* (2018.05); *H04N 13/282* (2018.05)

(56) References Cited

U.S. PATENT DOCUMENTS

| | | | | |
|---|---|---|---|---|
| 2008/0118143 | A1* | 5/2008 | Gordon | .................. G06T 7/521 |
| | | | | 382/154 |
| 2014/0028837 | A1* | 1/2014 | Gao | ........................ H04N 7/18 |
| | | | | 348/136 |
| 2017/0347120 | A1* | 11/2017 | Chou | ..................... H04N 19/89 |
| 2018/0268570 | A1* | 9/2018 | Budagavi | ................ G06T 9/001 |
| 2021/0065445 | A1* | 3/2021 | Kuma | ..................... G06T 9/001 |

FOREIGN PATENT DOCUMENTS

| | | | | |
|---|---|---|---|---|
| CN | 106204705 | | 12/2018 | |
| CN | 106204705 B | * | 12/2018 | ............. G06T 15/00 |
| JP | 9-237354 | | 9/1997 | |
| JP | 2003-249856 | | 9/2003 | |
| WO | 2008/011067 | | 7/2007 | |
| WO | 2018/048287 | | 3/2018 | |
| WO | WO-2018048287 A1 | * | 3/2018 | ............. G06T 15/20 |
| WO | 2018/130491 | | 7/2018 | |

OTHER PUBLICATIONS

Li CN 105447855 translated Nov. 2015 (Year: 2015).*
Choi WO 2018048287 translated Sep. 2017 (Year: 2017).*
International Search Report (ISR) issued on Apr. 7, 2020 in International (PCT) Application No. PCT/JP2020/004561.

* cited by examiner

FIG. 28F
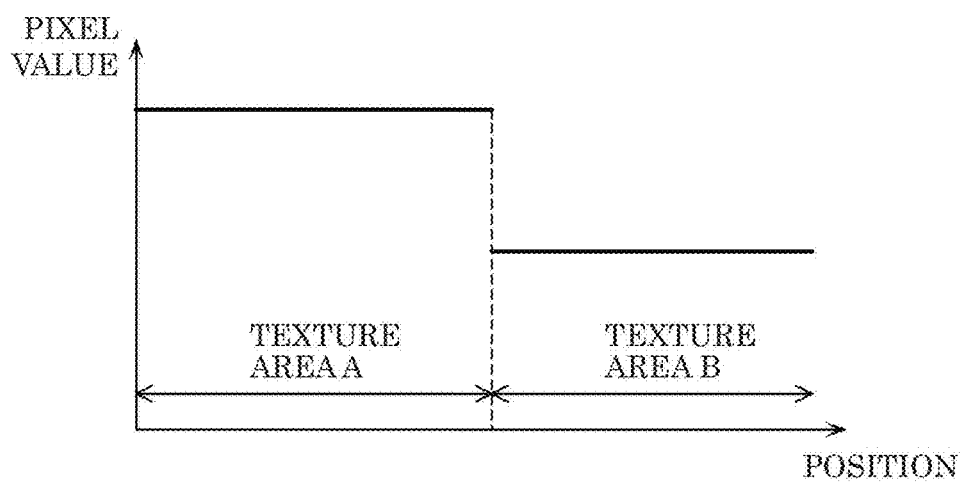
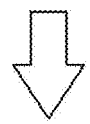
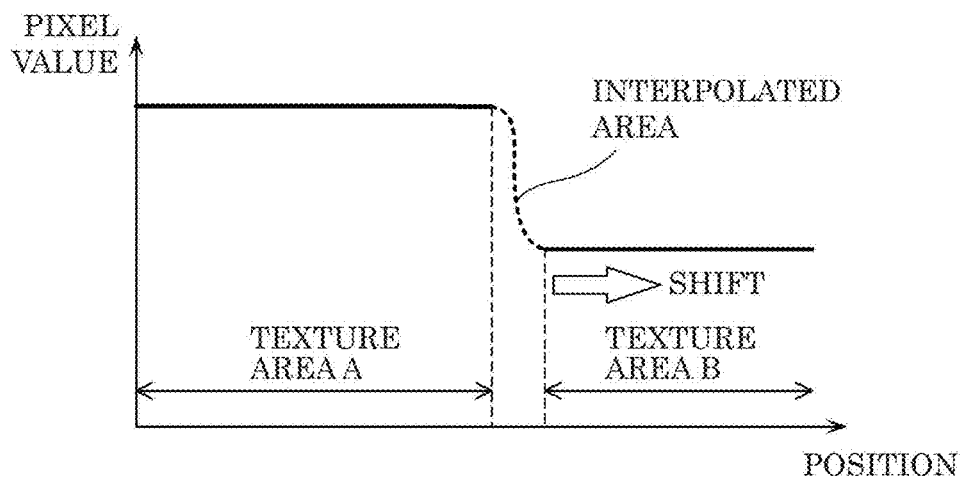

THREE-DIMENSIONAL
POINT CLOUD

ENCODE THREE-DIMENSIONAL
POINT CLOUD

BITSTREAM

FIG. 36
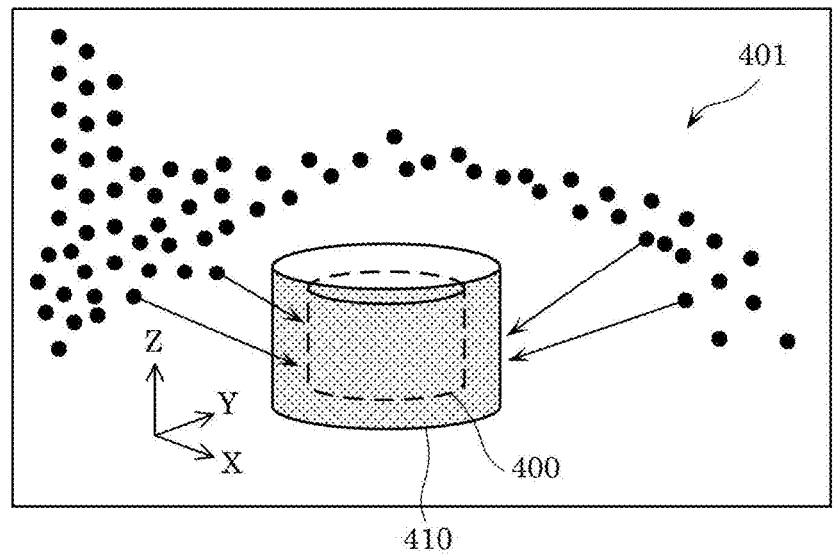
FIG. 37
THREE-DIMENSIONAL POINT CLOUD
 PROJECT THREE-DIMENSIONAL POINT CLOUD
DEPTH ON SENSOR
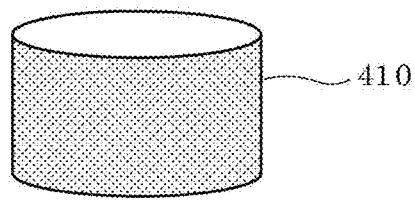
 GENERATE TWO-DIMENSIONAL IMAGE
TWO-DIMENSIONAL IMAGE 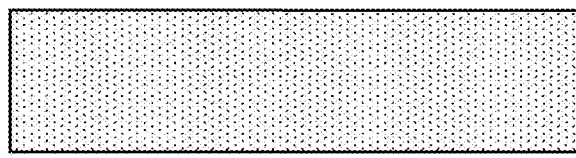
 ENCODE TWO-DIMENSIONAL IMAGE
BITSTREAM

FIG. 49

| HEADER | PROJECTING PLANE PARAMETERS | b0 | b1 | b2 | ... | ... | bn |

FIG. 50

| HEADER | PROJECTING PLANE PARAMETERS | SENSOR PARAMETERS | b0 | b1 | b2 | ... | ... | bn |

FIG. 52
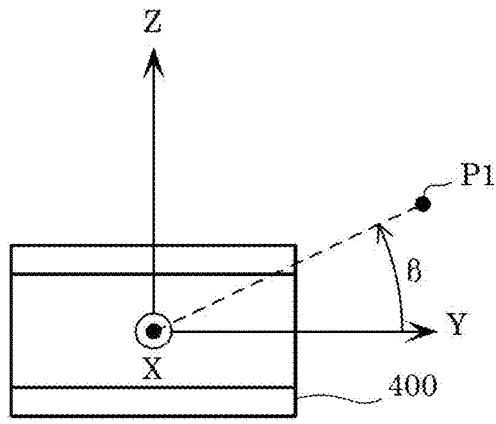
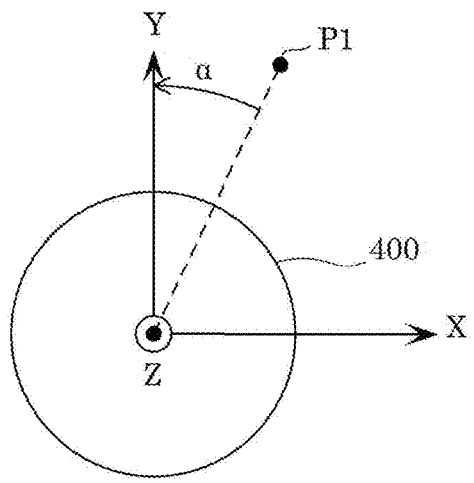
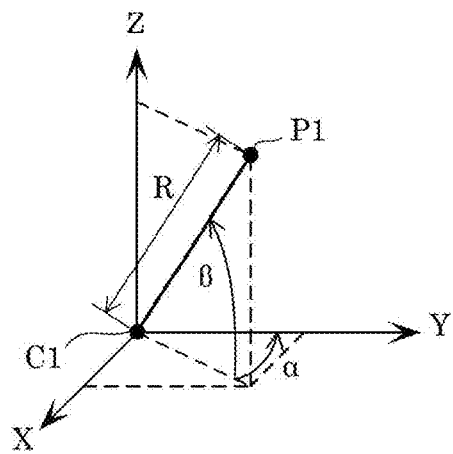

| HEADER | SENSOR PARAMETERS | b0 | b1 | b2 | ... | ... | bn |

THREE-DIMENSIONAL DATA ENCODING METHOD, THREE-DIMENSIONAL DATA DECODING METHOD, THREE-DIMENSIONAL DATA ENCODING DEVICE, AND THREE-DIMENSIONAL DATA DECODING DEVICE

CROSS REFERENCE TO RELATED APPLICATIONS

This application is a U.S. continuation application of PCT International Patent Application Number PCT/JP2020/004561 filed on Feb. 6, 2020, claiming the benefit of priority of U.S. Provisional Patent Application No. 62/801,841 filed on Feb. 6, 2019, the entire contents of which are hereby incorporated by reference.

BACKGROUND

1. Technical Field

The present disclosure relates to a three-dimensional data encoding method, a three-dimensional data decoding method, a three-dimensional data encoding device, and a three-dimensional data decoding device.

2. Description of the Related Art

Japanese Unexamined Patent Application Publication No. H09-237354 discloses a method of transferring three-dimensional data. In Japanese Unexamined Patent Application Publication No. H09-237354, three-dimensional data is transferred to a network for each element, for example, a polygon or a voxel. The three-dimensional data is captured by a receiving side and is expanded into an image displayed for each of the received elements.

SUMMARY

There has been a demand for improving encoding efficiency in encoding three-dimensional data.

The present disclosure has an object to provide a three-dimensional data encoding method, a three-dimensional data decoding method, a three-dimensional data encoding device, or a three-dimensional data decoding device which is capable of improving encoding efficiency.

In order to achieve the aforementioned object, a three-dimensional data encoding method according to an aspect of the present disclosure includes: obtaining a three-dimensional point cloud including first three-dimensional positions on a measurement target, the three-dimensional point cloud being generated by a measurer that radially emits an electromagnetic wave in a plurality of directions that are different and obtains a reflected wave which is the electromagnetic wave that is reflected by the measurement target; generating a two-dimensional image including first pixels corresponding to the plurality of directions, based on the three-dimensional point cloud; and encoding the two-dimensional image to generate a bitstream, wherein each of the first pixels has a pixel value indicating a first three-dimensional position or attribute information of a three-dimensional point which is included in the three-dimensional point cloud and corresponds to a direction to which the first pixel corresponds among the plurality of directions.

Furthermore, a three-dimensional data decoding method according to an aspect of the present disclosure includes: obtaining a bitstream generated by encoding a two-dimensional image including first pixels each corresponding to a different one of a plurality of directions which are different and extend radially from a measurer, the first pixels each having a pixel value indicating a first three-dimensional position or attribute information of a three-dimensional point in the direction to which the first pixel corresponds; decoding the bitstream to obtain the two-dimensional image; and restoring geometry information including first three-dimensional positions on a measurement target, using the two-dimensional image, the first three-dimensional positions including the first three-dimensional position.

Note that these general and specific aspects may be implemented as a system, a method, an integrated circuit, a computer program, or a computer-readable recording medium such as a CD-ROM, or as any combination of a system, a method, an integrated circuit, a computer program, and a computer-readable recording medium.

The present disclosure can provide a three-dimensional data encoding method, a three-dimensional data decoding method, a three-dimensional data encoding device, or a three-dimensional data decoding device which is capable of improving encoding efficiency.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 28F is a diagram showing another example correction according to Embodiment 7.

FIG. 36 is a diagram for describing an example of encoding a three-dimensional point cloud by using a second method according to Embodiment 8.

FIG. 37 is a diagram for describing an example of encoding a three-dimensional point cloud by using the second method according to Embodiment 8.

FIG. 49 is a diagram illustrating an example of the configuration of a bitstream according to Embodiment 8.

FIG. 50 is a diagram illustrating another example of the configuration of a bitstream according to Embodiment 8.

FIG. 52 is a diagram for describing three-dimensional polar coordinates according to Embodiment 8.

DETAILED DESCRIPTION OF THE EMBODIMENT

Figure 1:
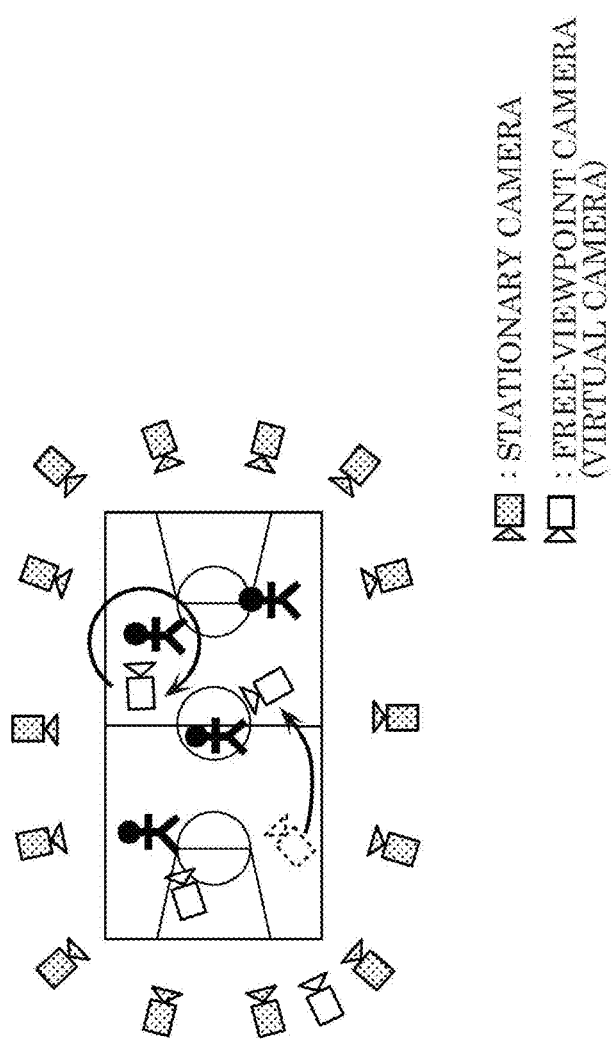
FIG. 1 is a block diagram illustrating the outline of a free-viewpoint video generating system according to Embodiment 1.

In a three-dimensional encoding device and a three-dimensional encoding method for encoding three-dimensional data, and a three-dimensional decoding device and a three-dimensional decoding method for decoding encoded data into three-dimensional data, being able to reduce an amount of data to be distributed is desired. Thus, in the three-dimensional encoding device and the three-dimensional encoding method for encoding three-dimensional data, improving compression efficiency of the three-dimensional data was deemed necessary.

The present disclosure has an object to provide a three-dimensional encoding device and a three-dimensional encoding method for encoding three-dimensional data, and a three-dimensional decoding device and a three-dimensional decoding method for decoding encoded data into the three-dimensional data, which are capable of improving compression efficiency of the three-dimensional data.

A three-dimensional data encoding method according to an aspect of the present disclosure includes: obtaining a three-dimensional point cloud including first three-dimensional positions on a measurement target, the three-dimensional point cloud being generated by a measurer that radially emits an electromagnetic wave in a plurality of directions that are different and obtains a reflected wave which is the electromagnetic wave that is reflected by the measurement target; generating a two-dimensional image including first pixels corresponding to the plurality of directions, based on the three-dimensional point cloud; and encoding the two-dimensional image to generate a bitstream, wherein each of the first pixels has a pixel value indicating a first three-dimensional position or attribute information of a three-dimensional point which is included in the three-dimensional point cloud and corresponds to a direction to which the first pixel corresponds among the plurality of directions.

Accordingly, the three-dimensional data encoding device generates a two-dimensional image based on geometry information including first three-dimensional positions and encodes the generated two-dimensional image to generate a bitstream, and thus can improve encoding efficiency.

For example, the pixel value indicating the first three-dimensional position may be a pixel value for calculating a distance from the measurer to the first three-dimensional position corresponding to the first pixel having the pixel value, in the direction to which the first pixel corresponds among the plurality of directions.

For example, the generating of the two-dimensional image may include projecting the first three-dimensional positions included in geometry information onto a projecting plane which is virtually disposed in a periphery of the measurer to generate the two-dimensional image which includes, as the first pixels, pixels corresponding to positions of the projecting plane onto which the first three-dimensional positions are projected.

For example, the generating of the two-dimensional image may include normalizing the first three-dimensional positions included in geometry information and projecting second two-dimensional positions obtained through the normalizing onto a projecting plane to generate the two-dimensional image which includes, as the first pixels, pixels corresponding to positions on the projecting plane onto which the second three-dimensional positions are projected.

For example, the projecting plane may include one or more planes, and the bitstream may include plane information indicating the one or more planes.

For example, the projecting plane may include a plurality of planes, and the generating of the two-dimensional image may include (i) projecting the first two-dimensional positions included in the geometry information onto the plurality of planes to generate sub-two-dimensional images, and (ii) combining the sub-two-dimensional images into one image to generate the two-dimensional image.

For example, the two-dimensional image may further include second pixels for which none of the first three-dimensional positions are projected, and the bitstream may include pixel information indicating whether each of pixels included in the two-dimensional image is one of the first pixels or one of the second pixels.

For example, the bitstream may include direction information indicating the plurality of directions in which the measurer emits the electromagnetic waves.

For example, each of the plurality of directions may be defined by a first angle and a second angle, the first angle being formed relative to a reference plane passing through the measurer, the second angle being formed relative to a reference direction centered on an axis which passes through the measurer and orthogonally intersects the reference plane.

For example, a vertical position in a vertical direction of each pixel of the two-dimensional image may indicate the first angle, and a horizontal position in a horizontal direction of each pixel of the two-dimensional image may indicate the second angle.

For example, each of the first three-dimensional positions may indicate three-dimensional coordinates in a three-dimensional space, and the generating of the two-dimensional image may include, for each of the first three-dimensional positions, converting the three-dimensional coordinates indicated by the first three-dimensional position into the first angle, the second angle, and the distance, and generating the two-dimensional image using results of the converting.

A three-dimensional data decoding method according to an aspect of the present disclosure includes: obtaining a bitstream generated by encoding a two-dimensional image including first pixels each corresponding to a different one of a plurality of directions which are different and extend radially from a measurer, the first pixels each having a pixel value indicating a first three-dimensional position or attribute information of a three-dimensional point in the direction to which the first pixel corresponds; decoding the bitstream to obtain the two-dimensional image; and restoring geometry information including first three-dimensional positions on a measurement target, using the two-dimensional image, the first three-dimensional positions including the first three-dimensional position.

Accordingly, a three-dimensional point cloud can be correctly decoded using a bitstream generated by encoding a two-dimensional image.

For example, the pixel value indicating the first three-dimensional position may be a pixel value for calculating a distance from the measurer to the first three-dimensional position corresponding to the first pixel having the pixel value, in the direction to which the first pixel corresponds among the plurality of directions.

For example, the two-dimensional image may include, as the first pixels obtained by projecting the first two-dimensional positions included in the geometry information onto a projecting plane which is virtually disposed in a periphery of the measurer, pixels corresponding to positions of the projecting plane onto which the first three-dimensional positions are projected, and the restoring may include re-arranging the first pixels included in the two-dimensional image, in a three-dimensional space in a periphery of the measurer, to restore the geometry information including the first three-dimensional positions.

For example, the distances may be represented by normalized information, and the restoring may include restoring the first three-dimensional positions based on the normalized information.

For example, the projecting plane may include one or more planes, the bitstream may include plane information indicating the one or more planes, and the restoring may include restoring the first three-dimensional positions by further using the plane information.

For example, the projecting plane may include one or more planes, the two-dimensional image may include sub-two-dimensional images each corresponding to a different one of the sub-two-dimensional images, and the restoring may include rearranging the first pixels included in the sub-two-dimensional images, in the three-dimensional space in the periphery of the measurer, to restore the geometry information including the first three-dimensional positions.

For example, the two-dimensional image may include the first pixels for which the first three-dimensional positions are projected, and second pixels for which none of the first three-dimensional positions are projected, and the bitstream may include pixel information indicating whether each of pixels included in the two-dimensional image is one of the first pixels or one of the second pixels.

For example, the bitstream may include direction information indicating the plurality of directions in which the measurer emits electromagnetic waves for measuring.

For example, each of the plurality of directions may be defined by a first angle and a second angle, the first angle being formed relative to a reference plane passing through the measurer, the second angle being formed relative to a reference direction centered on an axis which passes through the measurer and orthogonally intersects the reference plane.

For example, a vertical position in a vertical direction of each pixel of the two-dimensional image may indicate the first angle, and a horizontal position in a horizontal direction of each pixel of the two-dimensional image may indicate the second angle.

For example, the restoring may include, for each pixel included in the two-dimensional image, converting the first angle indicated by the vertical position of the pixel, the second angle indicated by the horizontal position of the pixel, and the distance indicated by the pixel value of the pixel, into three-dimensional coordinates in a three-dimensional space, to restore the first three-dimensional positions each indicated by a different set of the three-dimensional coordinates.

A three-dimensional data encoding device according to an aspect of the present disclosure includes: a processor; and memory, wherein using the memory, the processor: obtains geometry information including first three-dimensional positions on a measurement target from a measurer, the geometry information being generated by the measurer that radially emits an electromagnetic wave in a plurality of directions that are different and obtains a reflected wave which is the electromagnetic wave that is reflected by the measurement target; generates a two-dimensional image including first pixels corresponding to the plurality of directions, based on the geometry information; and encodes the two-dimensional image to generate a bitstream, and each of the first pixels has a pixel value indicating a first three-dimensional position or attribute information of a three-dimensional point which is included in the three-dimensional point cloud and corresponds to a direction to which the first pixel corresponds among the plurality of directions.

Accordingly, the three-dimensional data encoding device generates a two-dimensional image based on geometry information including first three-dimensional positions and encodes the generated two-dimensional image to generate a bitstream, and thus can improve encoding efficiency.

A three-dimensional data decoding device according to an aspect of the present disclosure includes: a processor; and memory, wherein using the memory, the processor: obtains a bitstream generated by encoding a two-dimensional image including first pixels each corresponding to a different one of a plurality of directions which are different and extend radially from a measurer, the first pixels each having a pixel value indicating a first three-dimensional position or attribute information of a three-dimensional point in the direction to which the first pixel corresponds; decodes the bitstream to obtain the two-dimensional image; and restores geometry information including first three-dimensional positions on a measurement target, using the two-dimensional image, the first three-dimensional positions including the first three-dimensional position.

Accordingly, a three-dimensional point cloud can be correctly decoded using a bitstream generated by encoding a two-dimensional image.

Note that these generic or specific aspects may be implemented as a system, a method, an integrated circuit, a computer program, or a computer-readable recording medium such as a CD-ROM, or may be implemented as any combination of a system, a method, an integrated circuit, a computer program, and a recording medium.

The following describes embodiments with reference to the drawings. Note that the following embodiments show exemplary embodiments of the present disclosure. The numerical values, shapes, materials, structural components, the arrangement and connection of the structural components, steps, the processing order of the steps, etc. shown in the following embodiments are mere examples, and thus are not intended to limit the present disclosure. Of the structural components described in the following embodiments, structural components not recited in any one of the independent claims that indicate the broadest concepts will be described as optional structural components.

Embodiment 1

The outline of the present embodiment will be first described below. The present embodiment will describe a method of generating and distributing a three-dimensional model in a three-dimensional space recognizing system, e.g., a next-generation wide area monitoring system or a free-viewpoint video generating system.

FIG. 1 illustrates the outline of a free-viewpoint video generating system. For example, the same space is shot using calibrated cameras (e.g., stationary cameras) from multiple viewpoints, so that the shot space can be three-dimensionally reconstructed (three-dimensional space reconstruction). Tracking, scene analysis, and video rendering are performed using the three-dimensionally reconstructed data, thereby generating video from any viewpoint (free viewpoint camera). This can achieve a next-generation wide area monitoring system and a free viewpoint video generating system.

In such a system, a three-dimensional model generated by three-dimensional reconstruction is distributed via a network or the like and processing such as tracking, scene analysis, and video rendering is performed by a receiving terminal. However, the three-dimensional model has quite a large amount of data and thus may cause an insufficient network band, so that it takes a long time to receive the model.

In the present embodiment, a foreground model and a background model that constitute a three-dimensional model are separately distributed in different distribution modes. For example, a network band can be suppressed during distribution by suppressing the number of times of distribution of background models that are updated only a few times. This can shorten the reception time of a terminal.

Figure 2:
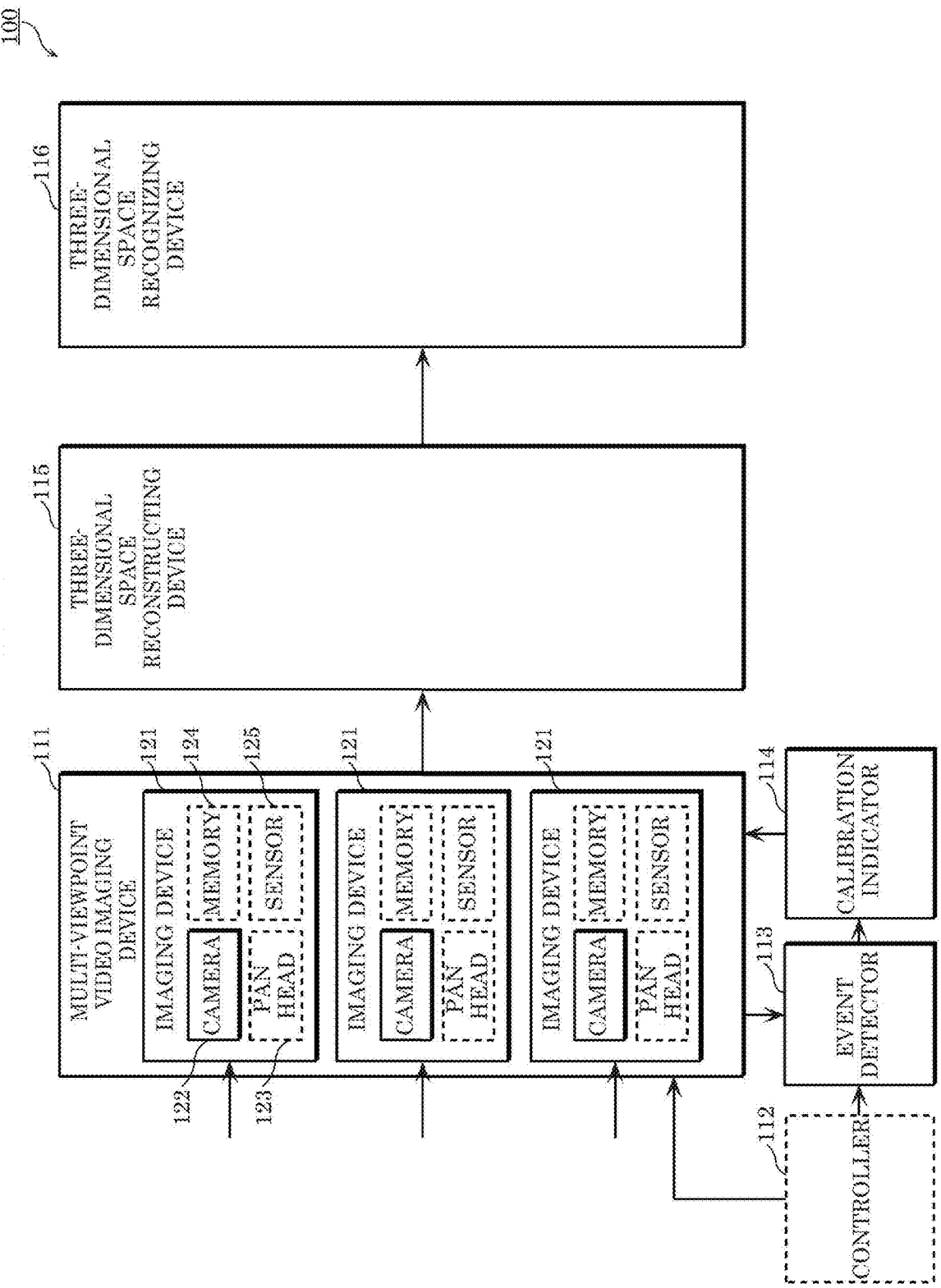
FIG. 2 is a block diagram illustrating the configuration of a three-dimensional space recognizing system according to Embodiment 1.

The configuration of three-dimensional space recognizing system 100 according to the present embodiment will be described below. FIG. 2 is a block diagram illustrating the configuration of three-dimensional space recognizing system 100. Three-dimensional space recognizing system 100 includes multi-viewpoint video imaging device 111, controller 112, event detector 113, calibration indicator 114, three-dimensional space reconstructing device 115, and three-dimensional space recognizing device 116.

Figure 3:
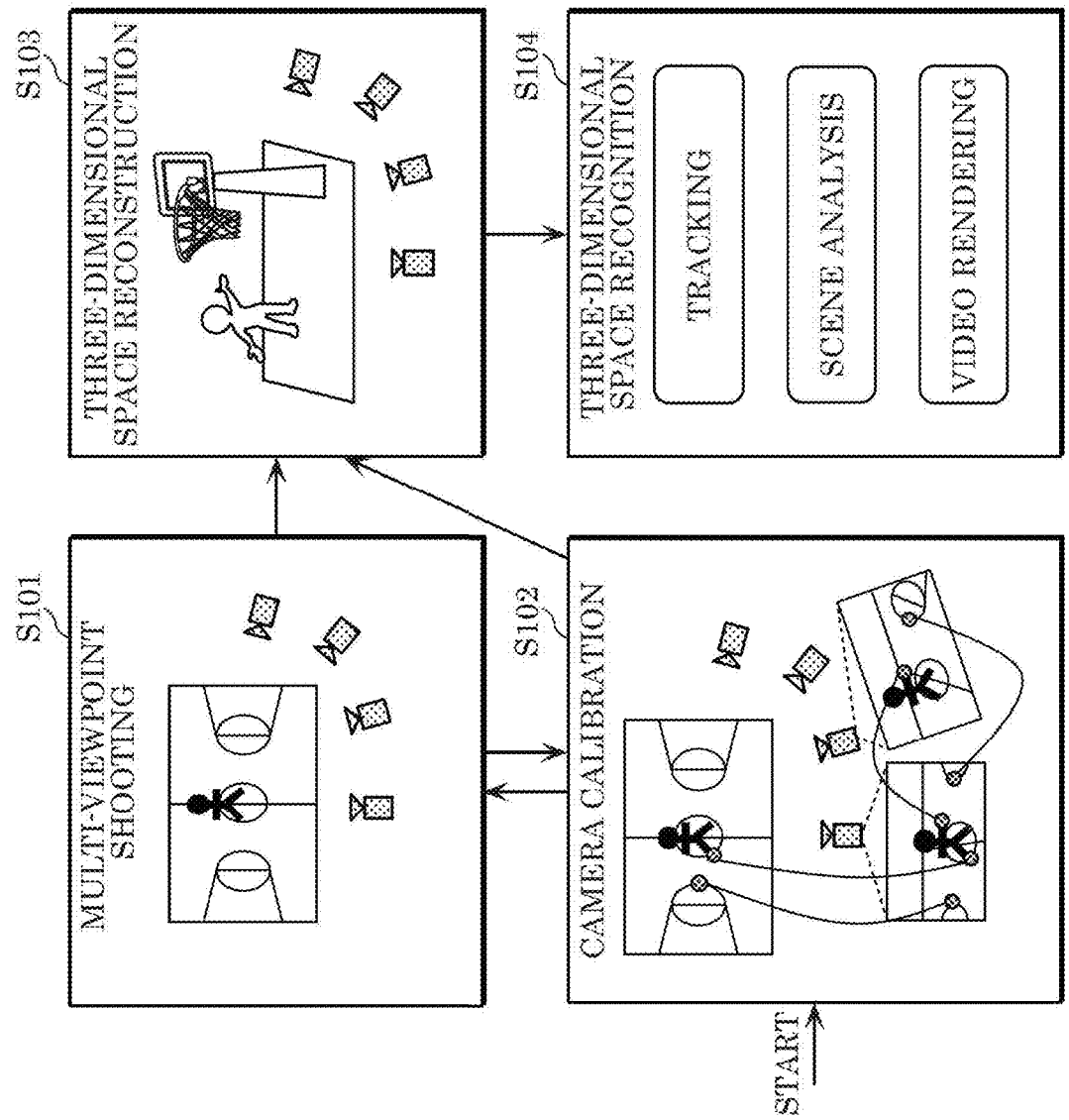
FIG. 3 illustrates the outline of the operations of the three-dimensional space recognizing system according to Embodiment 1.

FIG. 3 illustrates the outline of the operations of three-dimensional space recognizing system 100.

Multi-viewpoint video imaging device 111 generates multi-viewpoint video by shooting the same space (S101).

Correspondence between a point in a shooting environment and a point on video and point correspondence between videos are manually or automatically detected, enabling camera calibration in which the orientation of each camera (camera parameter) is estimated (S102).

Three-dimensional space reconstructing device 115 generates a three-dimensional model by performing three-dimensional space reconstruction in which a shooting space is three-dimensionally reconstructed using multi-viewpoint video and camera parameters (S103). For example, a foreground model and a background model are generated as three-dimensional models.

Finally, three-dimensional space recognizing device 116 performs three-dimensional space recognition by using the three-dimensional models (S104). Specifically, three-dimensional space recognizing device 116 performs tracking, scene analysis, and video rendering by using the three-dimensional models.

Figure 4:
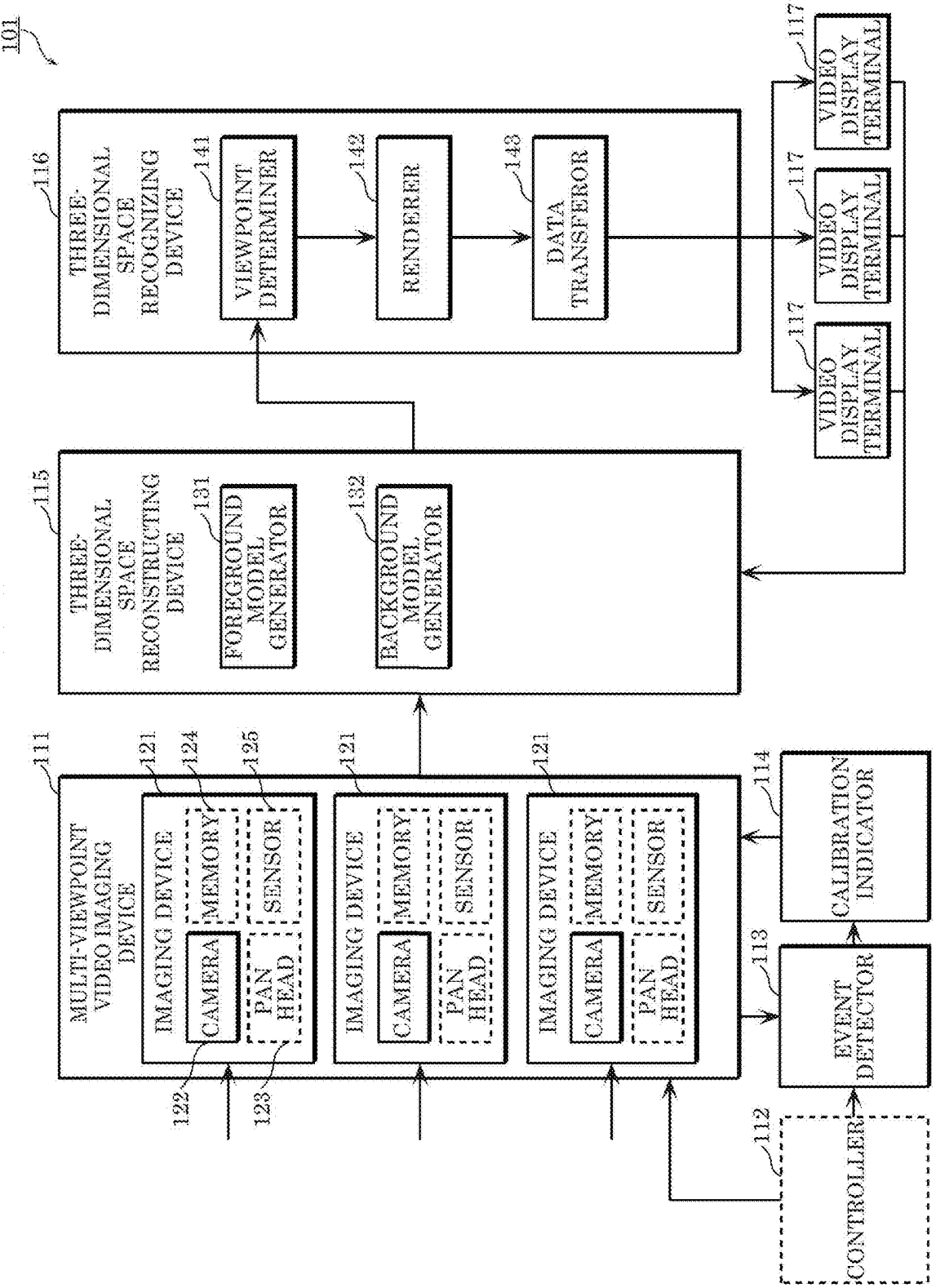
FIG. 4 is a block diagram illustrating the configuration of the free-viewpoint video generating system according to Embodiment 1.

Free-viewpoint video generating system 101 including three-dimensional space recognizing system 100 will be described below. FIG. 4 is a block diagram illustrating free-viewpoint video generating system 101 according to the present embodiment. Free-viewpoint video generating system 101 includes a plurality of video display terminals 117 as user terminals in addition to the configuration of three-dimensional space recognizing system 100. Moreover, three-dimensional space reconstructing device 115 includes foreground model generator 131 and background model generator 132. Three-dimensional space recognizing device 116 includes viewpoint determiner 141, renderer 142, and data transferor 143.

Figure 5:
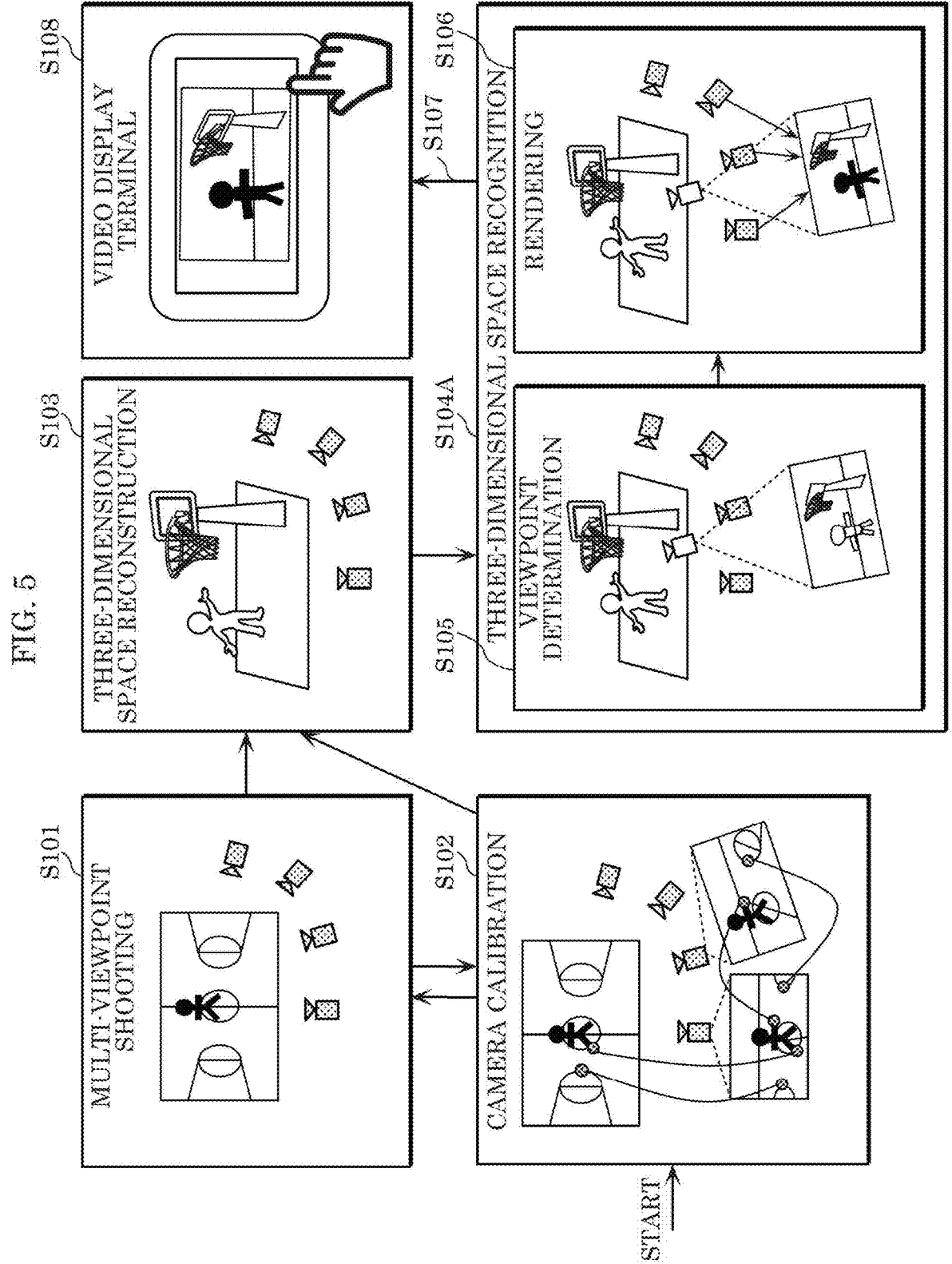
FIG. 5 illustrates the outline of the operations of the free-viewpoint video generating system according to Embodiment 1.
Figure 6:
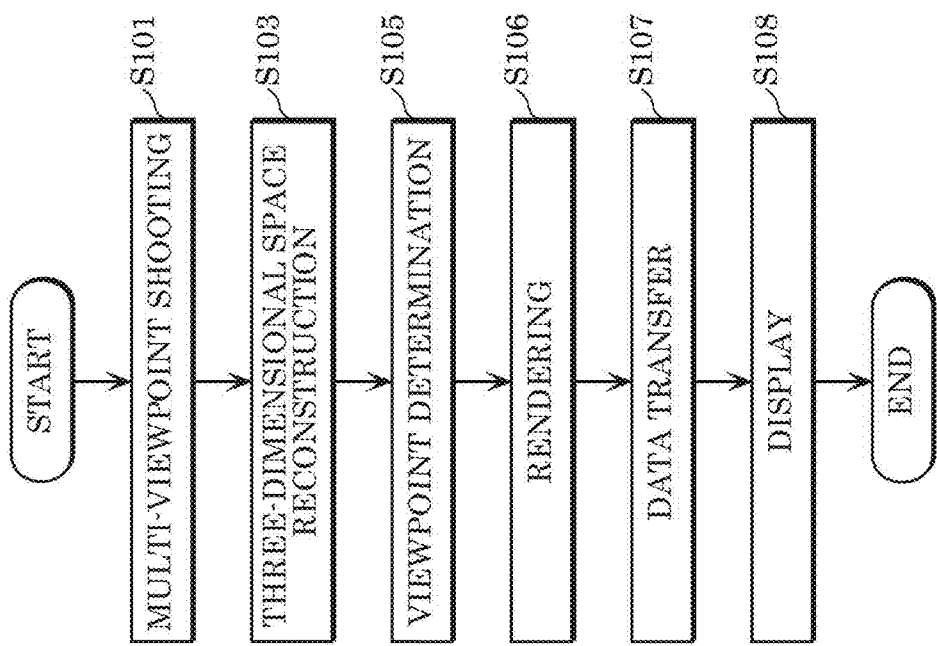
FIG. 6 is a flowchart showing the operations of the free-viewpoint video generating system according to Embodiment 1.

FIG. 5 shows the outline of the operations of free-viewpoint video generating system 101. FIG. 6 is a flowchart showing the operations of free-viewpoint video generating system 101.

First, multi-viewpoint video imaging device 111 generates multi-viewpoint video by performing multi-viewpoint shooting (S101). Multi-viewpoint video imaging device 111 includes multiple imaging devices 121. Imaging device 121 includes camera 122, pan head 123, memory 124, and sensor 125.

In response to a shooting start or a stop signal from controller 112, multi-viewpoint video imaging device 111 starts or stops shooting synchronized among imaging devices 121 according to the signal.

Imaging device 121 records a time stamp at the time of shooting while shooting video by means of camera 122. Moreover, imaging device 121 senses the shooting environment by using sensor 125 (a vibration sensor, an acceleration sensor, a magnetic field sensor, or a microphone) during the shooting and outputs the video, the time stamp, and sensing data to event detector 113.

When receiving calibration indication information from calibration indicator 114, multi-viewpoint video imaging device 111 adjusts imaging device 121 according to the calibration indication information, calibrates camera 122, and outputs a camera parameter obtained by the calibration to event detector 113.

Memory 124 in imaging device 121 temporarily stores video, time stamps, sensing data, and camera parameters or stores shooting settings (including a frame rate and a resolution).

Furthermore, camera calibration is performed at any time (S102). Specifically, event detector 113 detects a calibration event from at least one of video, a time stamp, and sensing information that are obtained from multi-viewpoint video imaging device 111, a three-dimensional model obtained from three-dimensional space reconstructing device 115, free-viewpoint video obtained from renderer 142, terminal information obtained from video display terminal 117, and control information obtained from controller 112, and then event detector 113 outputs calibration event information including the calibration event to calibration indicator 114. The calibration event information includes information indicating the calibration event, the significance of the calibration event, and imaging device 121 to be calibrated.

The calibration event acts as a trigger for calibrating imaging device 121. For example, when a displacement of camera 122 is detected, event detector 113 reaches a predetermined time, the accuracy of camera calibration increases, the accuracy of a model or free-viewpoint video decreases, free-viewpoint video is unnecessary, video from one imaging device 121 is unusable for generating free-viewpoint video, or a system administrator or a user provides an instruction, event detector 113 outputs the calibration event information.

Specifically, event detector 113 detects a displacement of camera 122 when the sensing information exceeds a threshold value, a background region in video is changed by the threshold value or more, or cheers rise. The predetermined time means a time when play is suspended, e.g., in a half time or at the bottom of the fifth inning, a time after the lapse of a certain time from the previous calibration, or the starting time of the system. The time when the accuracy of camera calibration increases means, for example, the time of extraction of at least a certain number of feature points from video. Moreover, event detector 113 determines the deterioration of accuracy in a model or free-viewpoint video according to, for example, the distortion of a wall or a ground in the model or free-viewpoint video.

The time when free-viewpoint video is unnecessary means a time when video display terminals 117 are all unused or when a scene recognized from sound or video is found to be negligible. The time when video from one imaging device 121 is unusable for generating free-viewpoint video means, for example, a time when a sufficient communication band is not obtained and the resolution or frame rate of video decreases, when synchronization is lost, or when an area shot by imaging device 121 does not receive attention because no athlete is shown.

The significance of the calibration event is calculated according to the calibration event or data observed when the calibration event is detected. For example, a displacement of the camera is more significant than other events. Moreover, for example, the larger the displacement of the camera, the higher the level of significance.

Moreover, event detector 113 may transmit the calibration event information to video display terminal 117 and notify a user of imaging device 121 being calibrated.

When receiving the calibration event information from event detector 113, calibration indicator 114 generates calibration indication information based on the calibration event information and outputs the generated calibration indication information to multi-viewpoint video imaging device 111.

The calibration indication information includes cameras 122 to be calibrated, the order of cameras 122 to be calibrated, control information on pan head 123, zoom magnification change information on camera 122, and a calibration method. The control information on pan head 123 indicates, for example, the amount of rotation of pan head 123 for returning camera orientation displaced by vibrations or the like to original orientation. The zoom magnification change information on the camera indicates, for example, a zoom-out amount required for covering the shooting area of camera 122 displaced by vibrations or the like.

The calibration method is a method of associating the three-dimensional coordinates of a specific point, line, or plane with two-dimensional coordinates on video or a method of associating two-dimensional coordinates on a specific point, line, or plane between at least two videos. The coordinates are associated with each other by at least one of a manual operation and an automatic operation. The accuracy of camera calibration may be improved by using a distance between at least two known points, lines, or planes or at least one stereo camera.

Subsequently, three-dimensional space reconstructing device 115 performs three-dimensional space reconstruction by using multi-viewpoint video (S103). Specifically, event detector 113 detects a model generation event from at least one of video, a time stamp, and sensing information that are obtained from multi-viewpoint video imaging device 111, terminal information obtained from video display terminal 117, and control information obtained from the controller, and then event detector 113 outputs model generation information including the model generation event to three-dimensional space reconstructing device 115.

The model generation information includes a model generation event and imaging device information. The imaging device information includes video, a background image, a camera parameter, the reliability of the camera parameter, and the calibration state of the camera. The model generation event is a trigger for generating the three-dimensional model of a shooting environment. Specifically, event detector 113 outputs the model generation information during the calibration of at least a certain number of cameras, at a predetermined time, or when free-viewpoint video is necessary.

The predetermined time is, for example, the time of a play or a time after the lapse of a certain time from previous model generation. A time when free-viewpoint video is necessary is, for example, when video display terminal 117 is used, when a scene recognized from sound or video is found to be significant, or when an instruction is provided from a system administrator or a viewing request is made from a user. The reliability of the camera parameter is determined by the result of camera calibration, the time of camera calibration, video, or sensing information. For example, the lower the reprojection error during camera calibration, the higher the reliability. The camera calibrated immediately before has higher reliability. The larger the number of feature points, the higher the reliability of the calibrated camera.

Three-dimensional space reconstructing device 115 generates the three-dimensional model of the shooting environment by using the model generation information obtained from event detector 113, and stores the generated three-dimensional model. According to the calibration state of the camera and the reliability of the camera parameter, three-dimensional space reconstructing device 115 during the model generation preferentially uses video shot by the calibrated reliable camera. Moreover, three-dimensional space reconstructing device 115 outputs model generation completion information to event detector 113 when the generation of the three-dimensional model of the shooting environment is completed.

When three-dimensional space recognizing device 116 acting as a free-viewpoint video generating device generates free-viewpoint video, three-dimensional space reconstructing device 115 outputs the three-dimensional model of the shooting environment to renderer 142.

Foreground model generator 131 generates a foreground model that is a model of a foreground making a motion change (large change) at each time. The foreground is, for example, a person or a ball. Background model generator 132 generates a background model that is a model of a background making no motion change (small change) at each time. The background is, for example, a venue or a goal. Hereinafter, a three-dimensional model means a model including a foreground model and a background model.

Foreground model generator 131 generates a foreground model according to a frame rate recorded by imaging device 121. For example, if the recorded frame rate is 30 frames per second, foreground model generator 131 generates a foreground model every ⅟₃₀ seconds.

Background model generator 132 generates a background model by using a background image not including a foreground, for example, a person or a ball that makes a motion change at each time. Background model generator 132 may reuse the generated background model in a certain period of time. Alternatively, background model generator 132 may generate another background model after a certain period of time and update the background model. This can reduce a throughput for generating a background model making only a few motions, thereby reducing a CPU usage and the amount of memory.

Figure 7:
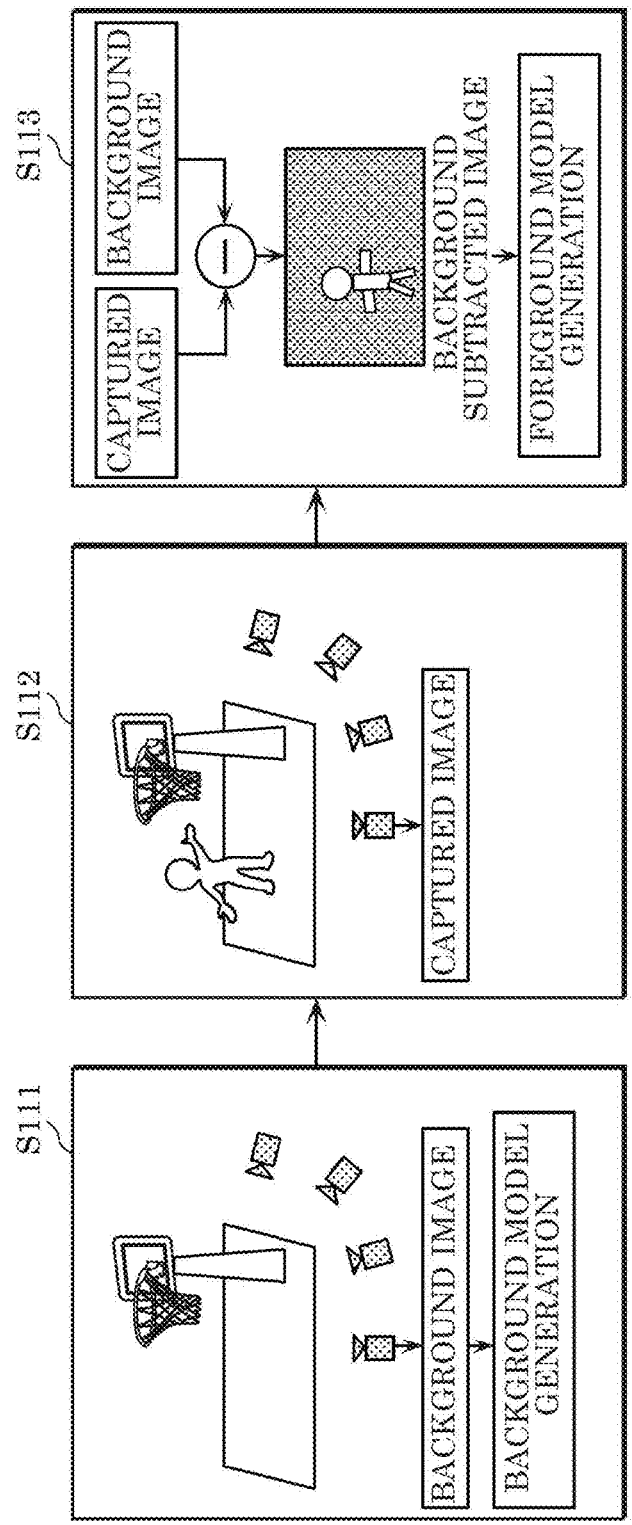
FIG. 7 illustrates a method of generating a foreground model according to Embodiment 1.

A method of generating the background model and the foreground model will be discussed below. FIG. 7 is an explanatory drawing of the processing.

First, background model generator 132 generates the background model (S111). For example, imaging devices 121 included in multi-viewpoint video imaging device 111 generate background images by shooting a background and then record the background images. Background model generator 132 generates the background model by using the background images. As a method of generating the background model, for example, the three-dimensional position of an object included in the background can be specified by calculating, from two or more stereo camera pairs, the depth of each pixel of the object included in a background image as in a multi-view stereo system. Alternatively, background model generator 132 may extract the feature of the background image and specify the three-dimensional position of the feature of the background image from the matching results of features between the cameras based on the principle of triangulation. Any method may be used as long as the three-dimensional model of an object included in a background is calculated.

The background model may be partially or entirely generated by a manual operation. For example, for an object such as a goal having a predetermined shape, a three-dimensional model may be generated in advance by computer graphics (CG) or the like. In other words, background model generator 132 may obtain a predetermined background model.

Moreover, background model generator 132 may generate a background image by using captured images including foregrounds and backgrounds. For example, background model generator 132 may calculate the background image by using the mean value image of the captured images. Thus, even if a background image not including a foreground cannot be captured in advance, a background image can be generated, enabling the generation of a background model.

Subsequently, imaging devices 121 included in multi-viewpoint video imaging device 111 generate captured images by shooting a person (foreground) and a background and record the captured images (S112).

After that, foreground model generator 131 generates a foreground model (S113). Specifically, foreground model generator 131 generates a background subtracted image by subtracting a background image from an image captured from the same viewpoint by the same imaging device 121. Foreground model generator 131 generates the foreground model by using the background subtracted images of multiple viewpoints. The foreground model can be generated by a method of specifying the three-dimensional model of a foreground object in a space by using multiple background subtracted images as in a visual hull method. Alternatively, foreground model generator 131 may extract the feature of the foreground image (background subtracted image) and specify the three-dimensional position of the feature of the foreground image from the matching results of features between the cameras based on the principle of triangulation. Any method may be used as long as the three-dimensional model of an object included in a foreground is calculated.

In this way, the foreground model and the background model are generated.

After that, three-dimensional space recognition is performed using the three-dimensional model (5104A). First, viewpoint determiner 141 determines a virtual viewpoint (S105).

Specifically, event detector 113 detects model generation completion information obtained from three-dimensional space reconstructing device 115, terminal information obtained from video display terminal 117, and a free-viewpoint generation event from control information obtained from controller 112, and then event detector 113 outputs free-viewpoint information including the free-viewpoint generation event to viewpoint determiner 141.

The free-viewpoint generation information includes a free-viewpoint generation event, a request viewpoint, and imaging device information. The request viewpoint is, for example, a user-requested viewpoint that is obtained from video display terminal 117 or a viewpoint that is obtained from the controller and is specified by a system administrator. The viewpoint may be a point or a line on a three-dimensional space. The free-viewpoint generation event is a trigger for generating the free-viewpoint video of a shooting environment. Specifically, event detector 113 outputs the free-viewpoint information when the three-dimensional model of the shooting environment is generated, a user requests viewing or distribution of free-viewpoint video at a time when the generated three-dimensional model is present, or a system administrator provides an instruction for the viewing or distribution of the free-viewpoint video.

Viewpoint determiner 141 determines a viewpoint for the generation of free-viewpoint video based on the free-viewpoint information obtained from event detector 113, and then outputs the viewpoint as viewpoint information to renderer 142 along with the free-viewpoint information. Viewpoint determiner 141 determines the viewpoint based on a requested viewpoint. When any viewpoint is not requested, viewpoint determiner 141 may automatically detect a viewpoint from video so as to provide a front view of an athlete or automatically detect a viewpoint near calibrated reliable imaging device 121 according to the reliability of the camera parameter or the calibration state of the camera.

When the virtual viewpoint is set, the structure of a shooting environment viewed from the virtual viewpoint and distance information are determined based on the three-dimensional model (including the foreground model and the background model). Renderer 142 performs rendering using the three-dimensional model, thereby generating free-viewpoint video that is video viewed from the virtual viewpoint (S106).

Specifically, renderer 142 generates viewpoint video according to the viewpoint information and the free-viewpoint information that are obtained from viewpoint determiner 141 and the three-dimensional model of the shooting environment, the three-dimensional model being obtained from three-dimensional space reconstructing device 115. Renderer 142 then outputs the generated video as free-viewpoint video to data transferor 143.

In other words, renderer 142 generates the free-viewpoint video by projecting the three-dimensional model at a virtual viewpoint position indicated by the viewpoint information. At this point, renderer 142 preferentially acquires, for example, video color and texture information from, for example, video obtained by imaging device 121 close to the virtual viewpoint position. However, if imaging device 121 close to the virtual viewpoint position is being calibrated or the camera parameter has low reliability, renderer 142 may preferentially acquire color information from the video of imaging device 121 other than imaging device 121 close to the virtual viewpoint position. Moreover, if imaging device 121 close to the virtual viewpoint position is being calibrated or the camera parameter has low reliability, renderer 142 may reduce the noticeability of deteriorated image quality to a user by blurring video or increasing a reproduction speed. In this way, it is not always necessary that renderer 142 preferentially acquires the video of imaging device 121 close to the virtual viewpoint position. Colors and textures on video may be acquired by any method. Alternatively, color information may be added to the three-dimensional model in advance.

Subsequently, data transferor 143 distributes the free-viewpoint video obtained from renderer 142 to video display terminal 117 (S107). Data transferor 143 may distribute different free-viewpoint videos to respective video display terminals 117 based on a viewpoint requested by each user or may distribute, to video display terminals 117, the same free-viewpoint video generated based on a viewpoint specified by a system administrator or a viewpoint automatically determined by viewpoint determiner 141.

Furthermore, data transferor 143 may compress the free-viewpoint video and distribute the compressed free-viewpoint video.

After that, video display terminal 117 displays the distributed free-viewpoint video (S108). In this configuration, video display terminal 117 includes a display, a radio, and a user input interface. The user transmits, to event detector 113 through video display terminal 117, a viewing request for viewing any region from any viewpoint at any time in a shooting environment. Video display terminal 117 receives the free-viewpoint video based on the viewing request from data transferor 143 and shows the free-viewpoint video to the user.

Moreover, video display terminal 117 receives the calibration event information obtained from event detector 113 and highlights the camera being calibrated on the display. This can notify the user that free-viewpoint video cannot be generated from a viewpoint near the imaging device or image quality may deteriorate.

The system administrator transmits a shooting start or stop signal from controller 112 to multi-viewpoint video imaging device 111 and causes multi-viewpoint video imaging device 111 to start or stop synchronous shooting.

If it is determined that camera calibration is necessary, the system administrator transmits the control information from controller 112 to event detector 113, enabling calibration of any camera.

If it is determined that the three-dimensional model of the shooting environment is necessary, the system administrator transmits the control information from controller 112 to event detector 113, enabling the generation of the three-dimensional model of the shooting environment at any time by means of any imaging device 121.

If it is determined that free-viewpoint video is necessary, the system administrator transmits the control information from controller 112 to event detector 113, so that free-viewpoint video at any time can be generated and distributed to video display terminal 117.

Embodiment 2

The function of generating free-viewpoint video may be used by a monitoring system. In this case, the estimated appearance of a suspect is viewed from a viewpoint having not been captured by an actual camera and can be shown to a security guard.

Figure 8:
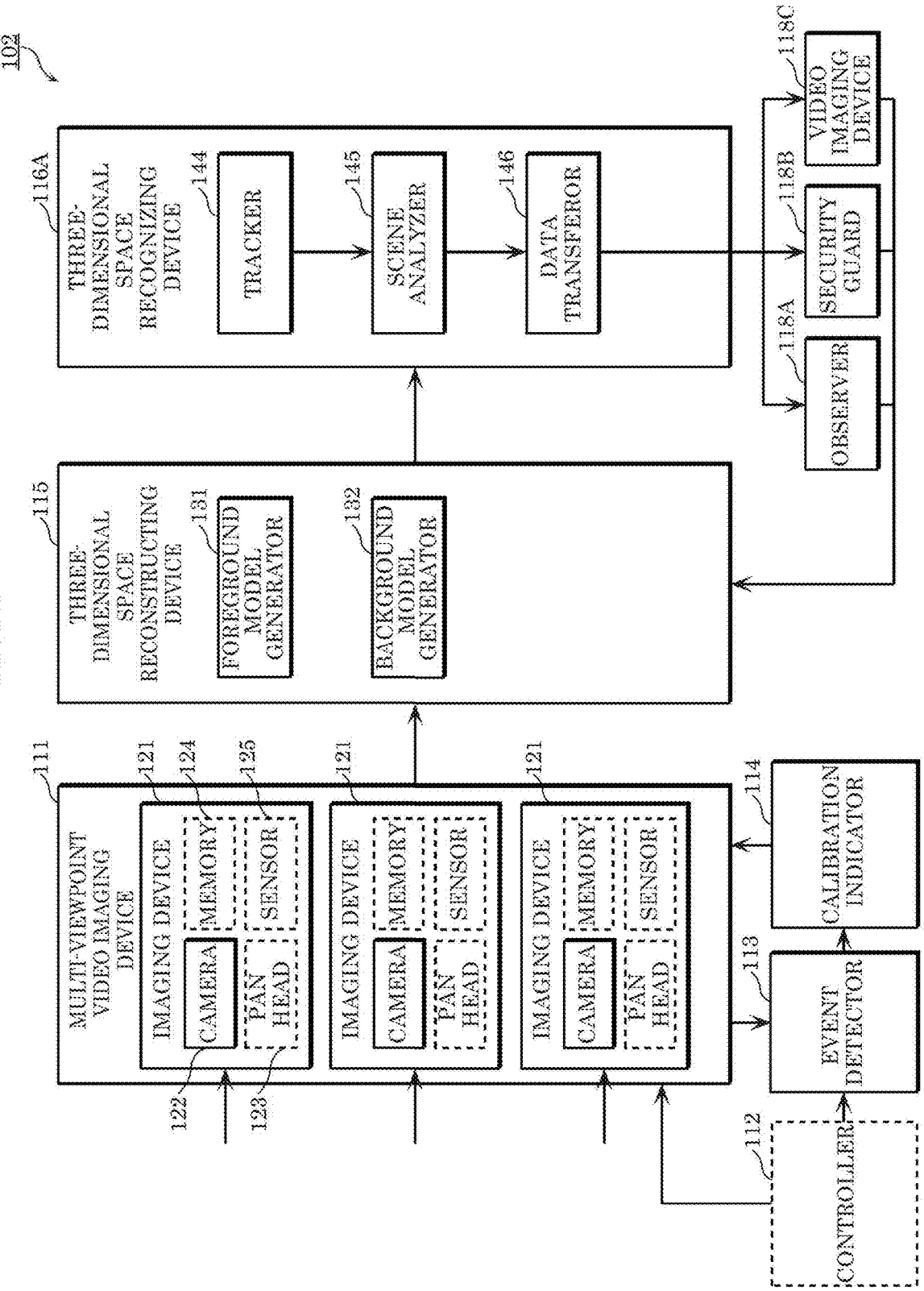
FIG. 8 is a block diagram illustrating the configuration of a next-generation monitoring system according to Embodiment 2.

FIG. 8 is a block diagram illustrating the configuration of next-generation monitoring system 102 according to the present embodiment. The configuration of three-dimensional space recognizing device 116A in next-generation monitoring system 102 in FIG. 8 is different from that of three-dimensional space recognizing device 116 in free-viewpoint video generating system 101 in FIG. 4. Moreover, next-generation monitoring system 102 includes observer 118A, security guard 118B, and video imaging device 118C instead of video display terminals 117.

Three-dimensional space recognizing device 116A includes tracker 144, scene analyzer 145, and data transferor 146.

Figure 9:
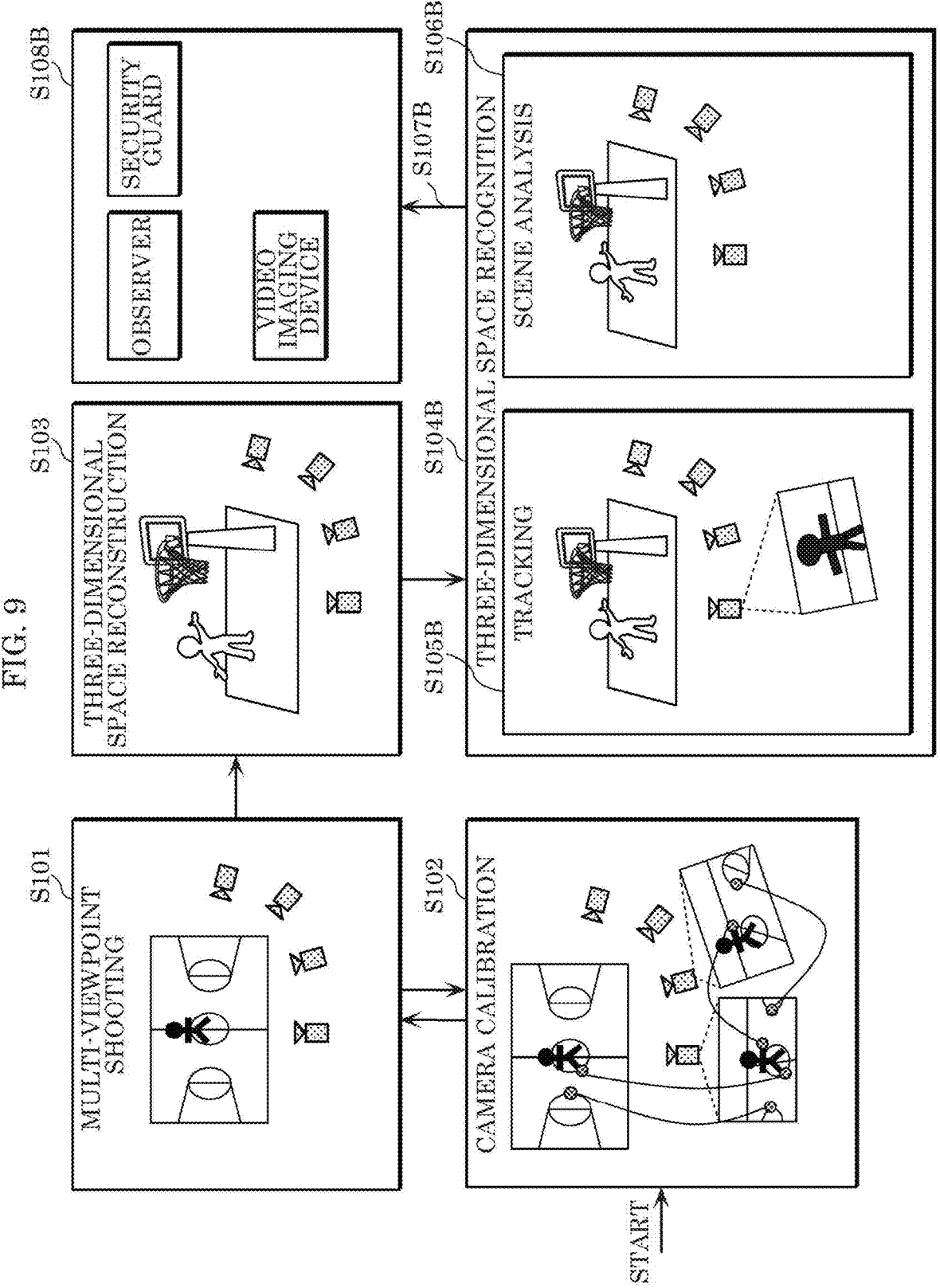
FIG. 9 illustrates the outline of the operations of the next-generation monitoring system according to Embodiment 2.
Figure 10:
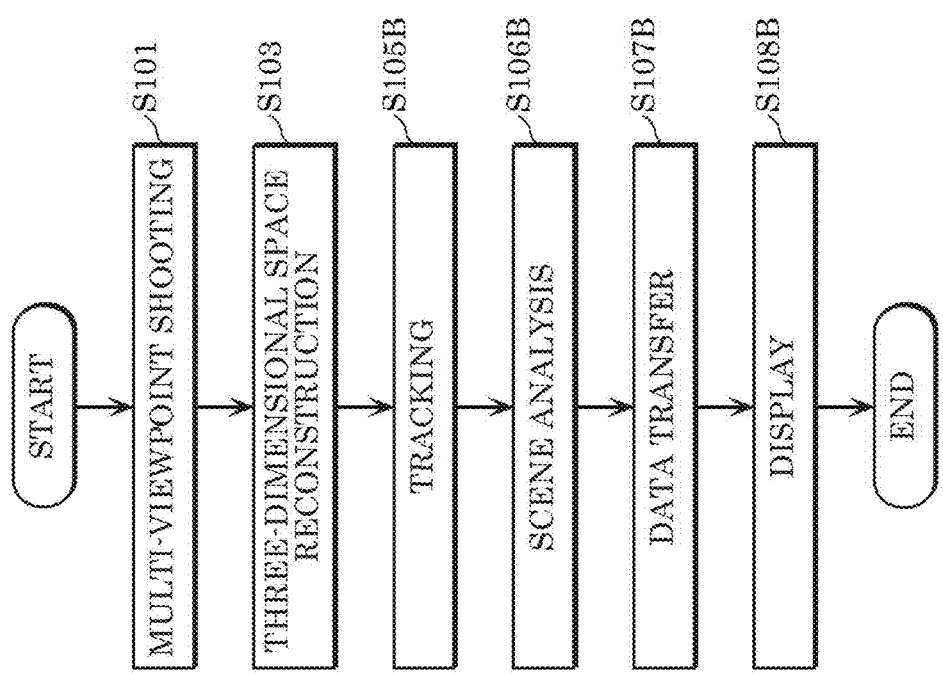
FIG. 10 is a flowchart showing the operations of the next-generation monitoring system according to Embodiment 2.

FIG. 9 illustrates the outline of the operations of next-generation monitoring system 102. FIG. 10 is a flowchart showing the operations of next-generation monitoring system 102. Multi-viewpoint shooting (S101), camera calibration (S102), and three-dimensional space reconstruction (S103) are similar to those of FIGS. 5 and 6.

Subsequently, three-dimensional space recognizing device 116A performs three-dimensional space recognition by using three-dimensional models (S104B). Specifically, tracker 144 tracks a person on a three-dimensional space (S105B). Furthermore, tracker 144 automatically extracts video including the person.

Scene analyzer 145 analyzes a scene (S106B). Specifically, scene analyzer 145 recognizes the state of the person or the scene and detects an abnormality from the three-dimensional space or multi-viewpoint video.

Data transferor 146 then transfers the result of three-dimensional space recognition to the terminals of observer 118A or security guard 118B or video imaging device 118C (S107B). Moreover, the result of three-dimensional space recognition is displayed on the terminal of observer 118A or security guard 118B or the display of video imaging device 118C (S108B).

The detail of the operations will be discussed below. As in the generation of free-viewpoint video, scene analyzer 145 and tracker 144 calculate the structure of each subject viewed from a virtual viewpoint in a shooting area and a distance from the virtual viewpoint based on a three-dimensional model generated by three-dimensional space reconstructing device 115. Furthermore, scene analyzer 145 and tracker 144 can preferentially acquire the color and texture of each subject from the video of imaging device 121 close to the virtual viewpoint and use the acquired information.

In scene analysis using two-dimensional video, video showing a state of each subject, e.g., a person or an object in a shooting area at a moment is analyzed by software or visual observation on a screen. The scene analysis is performed by scene analyzer 145 based on three-dimensional model data, enabling the observation of the three-dimensional posture of a person or the three-dimensional shape of an object in a shooting area. Thus, a state can be recognized and predicted with higher accuracy than in the use of two-dimensional video.

In tracking using two-dimensional video, for example, a subject in a shooting area is first identified by scene analysis on video captured by imaging device 121. Moreover, the same subject identified on video captured at a different moment by imaging device 121 is matched by software or a manual operation. Tracking is performed by the identification and matching of the subject along a time axis. However, in two-dimensional video or the like shot by imaging device 121, a target subject may be temporarily hidden behind another subject and may not be continuously identified. Also in this case, the subject can be continuously identified using three-dimensional position information or three-dimensional shape information on the subject according to the three-dimensional model.

The function of scene analysis and tracking using the three-dimensional model is employed by next-generation monitoring system 102. This can achieve early detection of a suspicious site and more accurate detection. Even if the number of installed cameras is limited at a site, a higher security level can be obtained than in the use of two-dimensional video.

Scene analyzer 145 analyzes data on a three-dimensional model and identifies, for example, a subject. The analysis result may be transferred to tracker 144 or displayed with free-viewpoint video on the display of a terminal or the like. Data on the analysis result of the free-viewpoint video may be stored in a storage device provided in a terminal or the like or in an external storage device. Moreover, according to the analysis result, the determination of a virtual viewpoint at another time or another position by a user may be requested from scene analyzer 145 via a terminal.

Tracker 144 tracks a specific subject based on the data on the three-dimensional model. The tracking result may be displayed with free-viewpoint video on the display of a terminal or the like. For example, if a specific subject cannot be tracked, the determination of a virtual viewpoint at another time or another position by a user may be requested from tracker 144 via a terminal.

Embodiment 3

Figure 11:
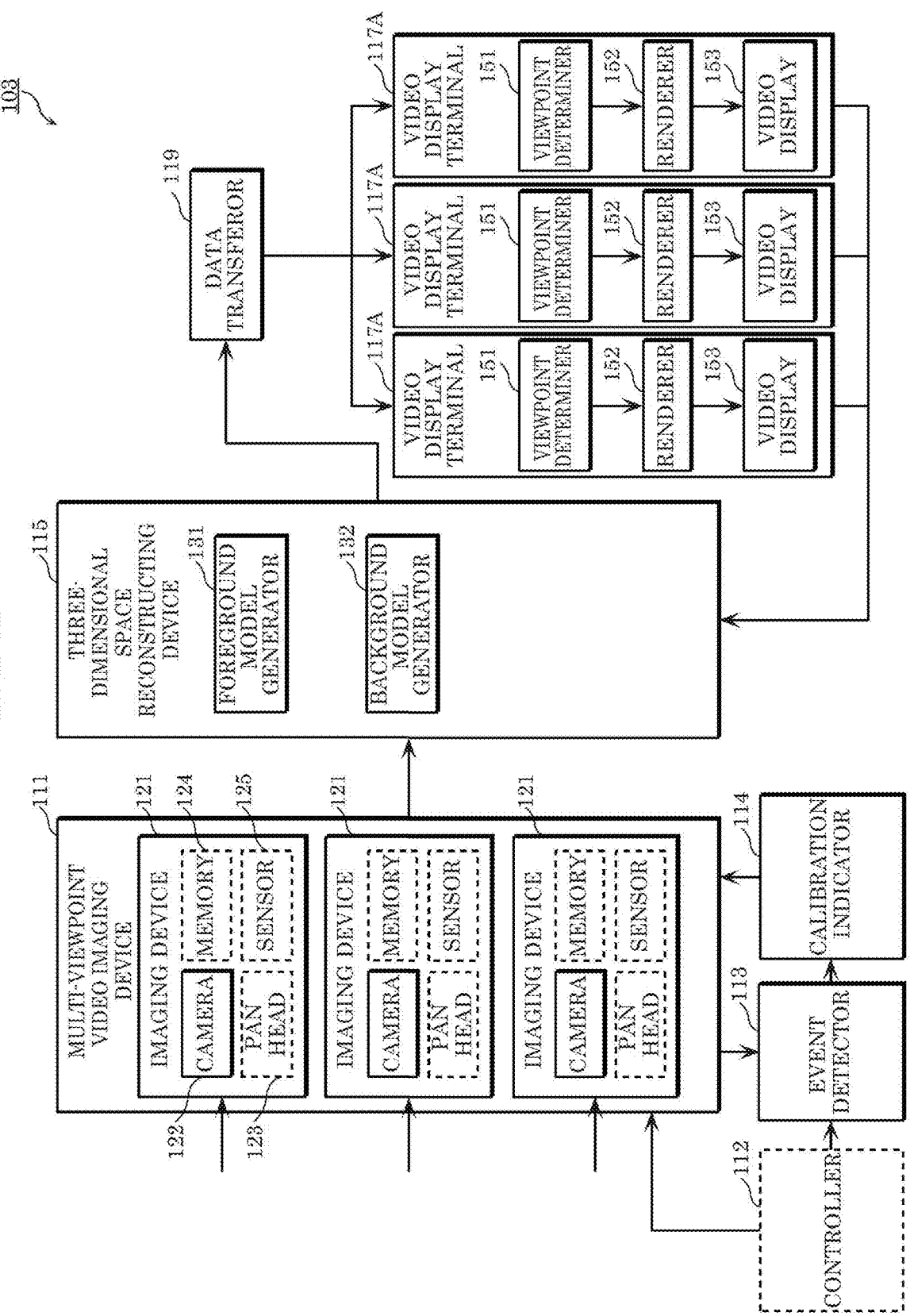
FIG. 11 is a block diagram illustrating the configuration of a free-viewpoint video generating system according to Embodiment 3.

In the present embodiment, a modification of free-viewpoint video generating system 101 according to Embodiment 1 will be described. FIG. 11 is a block diagram illustrating the configuration of free-viewpoint video generating system 103 according to the present embodiment. Free-viewpoint video generating system 103 in FIG. 11 is different from free-viewpoint video generating system 101 in FIG. 4 in that viewpoint determiner 151 and renderer 152 are provided in video display terminal 117A.

Data transferor 119 distributes a three-dimensional model (a foreground model and a background model) generated by three-dimensional space reconstructing device 115 to video display terminal 117A. Moreover, data transferor 119 may transmit video captured by multi-viewpoint video imaging device 111 and a camera parameter to video display terminal 117A.

During the generation of a three-dimensional model, three-dimensional space reconstructing device 115 may add color information to the three-dimensional model by using captured video or the like and data transferor 119 may distribute the three-dimensional model with the added color information to video display terminal 117A. In this case, data transferor 119 may not distribute captured video to video display terminal 117A.

Video display terminal 117A includes a display, a radio, and a user input interface. A user uses video display terminal 117A and transmits, to event detector 113, a viewing request for viewing any region at any time in a shooting environment. Moreover, the user receives a three-dimensional model, captured video, and a camera parameter from data transferor 119 based on the viewing request. By using viewpoint information specified by the user and the received three-dimensional model, video display terminal 117A generates video at a viewpoint corresponding to the viewpoint information and outputs the generated video as free-viewpoint video to a display.

Figure 12:
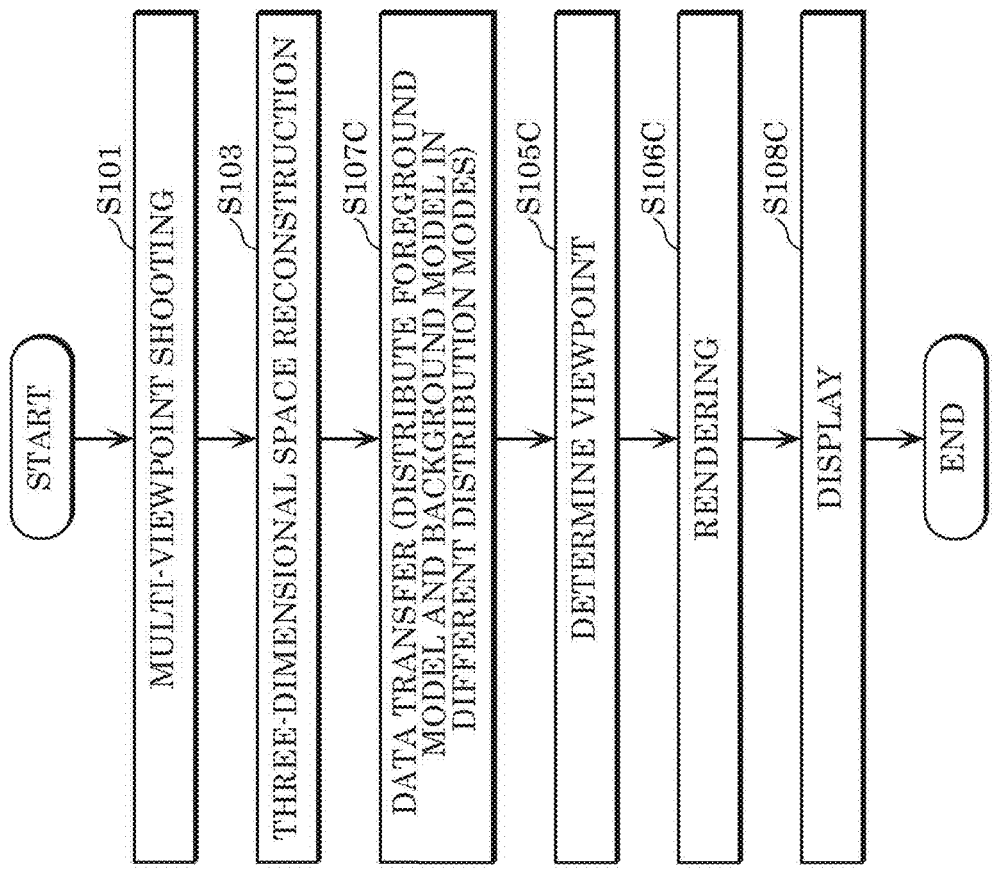
FIG. 12 is a flowchart showing the operations of the free-viewpoint video generating system according to Embodiment 3.

FIG. 12 is a flowchart showing the operations of free-viewpoint video generating system 103. Steps S101 and S103 are similar to processing in Embodiment 1 illustrated in FIG. 6.

Subsequently, data transferor 119 distributes a three-dimensional model (a foreground model and a background model) generated by three-dimensional space reconstructing device 115 to video display terminal 117A (S107C). At this point, data transferor 119 distributes the foreground model and the background model in different distribution modes.

For example, when the three-dimensional model is distributed to video display terminal 117A, data transferor 119 separately distributes the foreground model and the background model. At this point, data transferor 119 adds, for example, a flag or an identifier for discriminating between the foreground model and the background model, to header information or the like included in distributed data.

For example, the foreground model and the background model may have different distribution periods. The distribution period of the foreground model may be shorter than the distribution period of the background model. If the recorded frame rate of imaging device 121 is, for example, 30 frames per second, data transferor 119 distributes 30 foreground models per second according to the recorded frame rate of imaging device 121. Data transferor 119 distributes, for example, a single model as a background model. Moreover, during the distribution of the foreground model, data transferor 119 may generate a differential model as a difference between a foreground model at the current time and a foreground model at a previous time, and then data transferor 119 may distribute the generated differential model. Furthermore, data transferor 119 may predict a motion of the foreground model, generate a prediction model from the foreground model at the previous time, generate a differential model as a difference between the foreground model at the current time and the prediction model, and then distribute the generated differential model and motion information indicating the result of motion prediction. This can reduce the amount of information on the foreground model, thereby suppressing the band of a network. Moreover, data transferor 119 may compress the amount of information on transmitted data by performing variable-length coding or arithmetic coding on the differential model and the motion information.

During the distribution of the background model, data transferor 119 may distribute the single background model when a user starts viewing.

Alternatively, data transferor 119 may transmit the background model at predetermined regular intervals. At this point, data transferor 119 may generate a differential model as a difference between the current background model and the previously distributed background model, and then transmit the generated differential model. This can reduce the amount of information on the distributed background model, thereby suppressing the network band. Data transferor 119 may transmit both of the foreground model and the background model at random access points. Thus, video display terminal 117A can always generate free-viewpoint video by using proper foreground and background models when the user switches viewing times.

Figure 13:
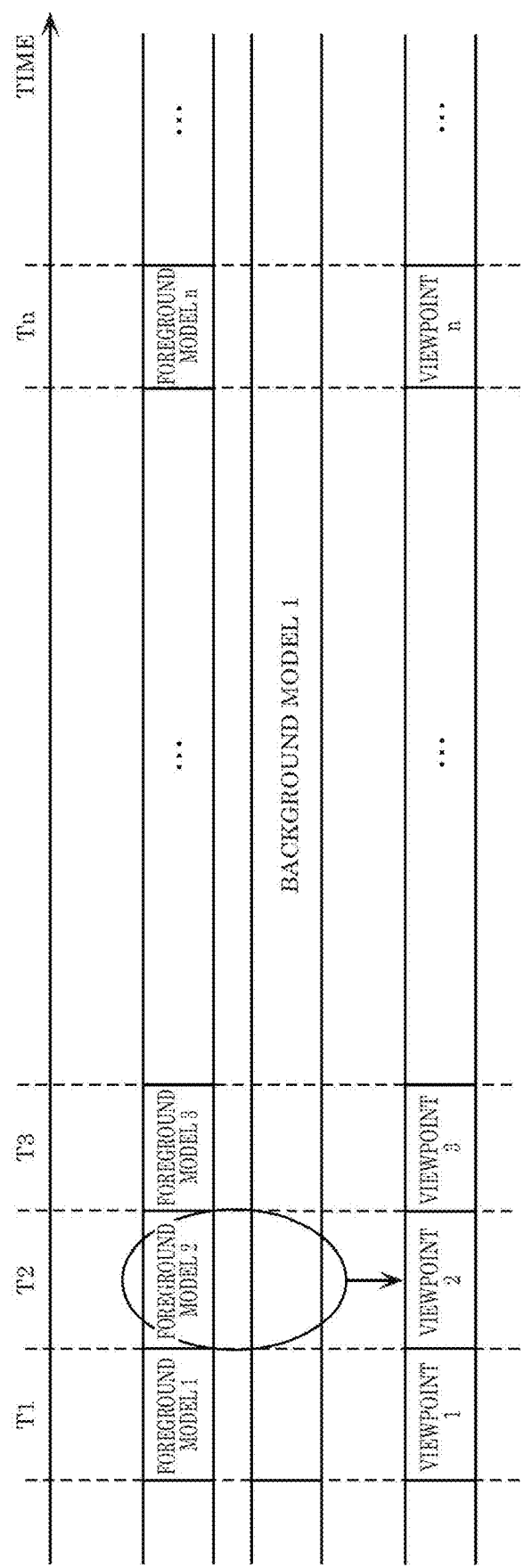
FIG. 13 shows a distribution example of a foreground model and a background model according to Embodiment 3.

FIG. 13 shows a distribution example of foreground models and a background model, the background model being distributed when the user starts viewing. As shown in FIG. 13, data transferor 119 distributes the background model when the user starts viewing. Video display terminal 117A generates free-viewpoint video by using the background model and the foreground model received at each time.

Figure 14:
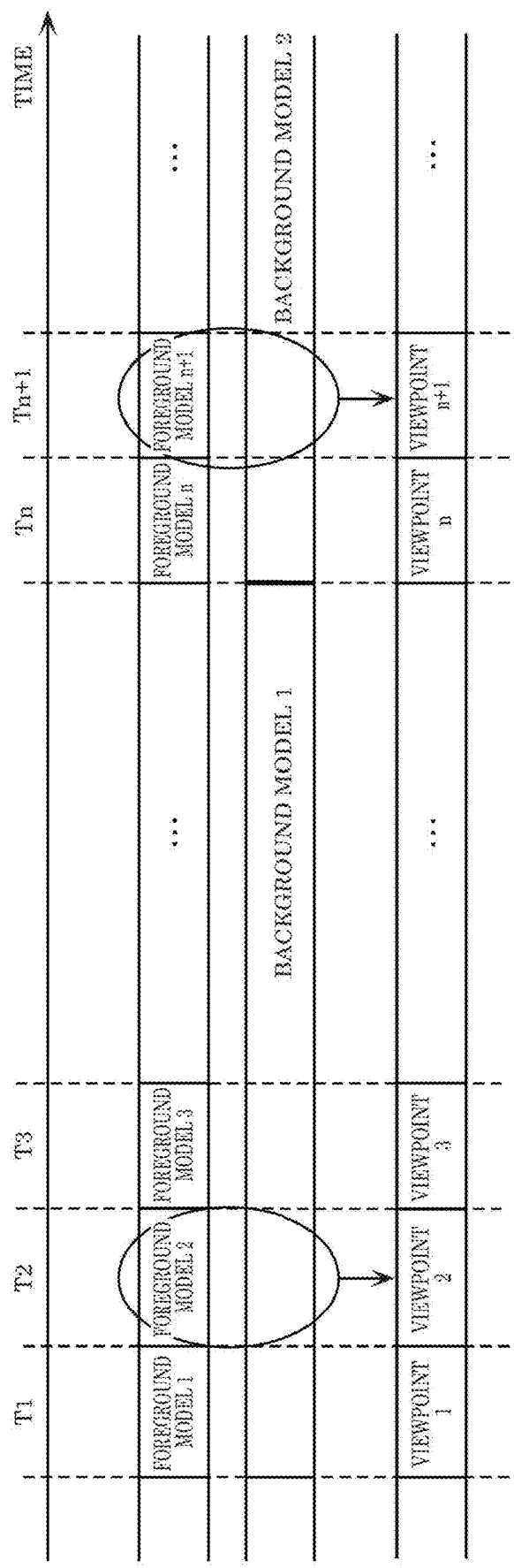
FIG. 14 shows a distribution example of the foreground model and the background model according to Embodiment 3.

FIG. 14 shows a distribution example of foreground models and background models, the background models being distributed at regular intervals. As shown in FIG. 14, data transferor 119 distributes the background models at predetermined regular intervals. In this case, the regular intervals are longer than the intervals for distributing the foreground models. Video display terminal 117A generates free-viewpoint video by using the previously received background model and the foreground model received at each time.

If the foreground models and the background models are encoded and distributed, data transferor 119 may switch an encoding method for each of the models. In other words, data transferor 119 may use different encoding methods for the foreground and background models. For example, for the foreground model, data transferor 119 uses an encoding method in which priority is placed on a low delay in order to perform instant replay on video display terminal 117A. For the background model, data transferor 119 uses an encoding method in which priority is placed on high efficiency in order to minimize the amount of information. Thus, a proper encoding method is selected according to the purpose of each model, thereby improving the functionality of the system while reducing the amount of data.

Data transferor 119 may use a high-efficient encoding method for the foreground model and a less efficient encoding method for the background model. For example, the background model is less frequently distributed and thus the use of the less efficient encoding method hardly increases a network load even when the amount of data increases. The use of the less efficient encoding method with a low throughput can suppress a processing load for the background model on a server or a terminal. The foreground model is frequently updated. Thus, even if the server or the terminal has a high processing load, the foreground model is encoded with maximum efficiency, thereby reducing the network load. Data transferor 119 may transfer the models without encoding according to the less efficient encoding method.

Alternatively, data transferor 119 may distribute the foreground model and the background model by using networks or protocols having different characteristics. For example, for the foreground model, data transferor 119 uses a high-speed network having a low packet loss and high reliability and a low-delay distribution protocol such as UDP (User Datagram Protocol) in order to perform instant replay on video display terminal 117A. For the background model, data transferor 119 uses a low-speed network and a protocol such as TCP (Transmission Control Protocol) having high error resistance in order to securely distribute the background model while obtaining the transmission band of the foreground model. Furthermore, the foreground model may be distributed with low delay by applying download distribution using HTTP (Hypertext Transfer Protocol) to the background model and stream distribution using RTP (Real-time Transport Protocol) to the foreground model.

Data transferor 119 may acquire viewpoint position information from video display terminal 117A during viewing of the user and switch the three-dimensional model to be distributed by using the information. For example, data transferor 119 may preferentially distribute the foreground model and the background model that are necessary for generating video from a viewpoint during viewing of the user. Moreover, data transferor 119 may distribute, with high precision (high density), the foreground model necessary for generating video from a viewpoint during viewing of the user, and distribute the other models with lower model precision (density) by thinning or the like. This can reduce the amount of distributed data. The background models may not be switched in this way.

Furthermore, data transferor 119 may change the density or the distribution period of the three-dimensional model to be distributed according to an available network band. For example, data transferor 119 may reduce the density of the three-dimensional model or increase the distribution period as the network band decreases. Video display terminal 117A may switch the resolution of rendering according to the density of the three-dimensional model distributed by data transferor 119. For example, in the case of a narrow network band, data transferor 119 distributes the three-dimensional model after reducing the density by thinning or the like. Moreover, video display terminal 117A displays video with a reduced rendering resolution.

As a method of reducing the density of the three-dimensional model, thinning may be evenly performed or the enabling and disabling of thinning or thinning methods may be switched depending on a target object. For example, data transferor 119 distributes an important subject with a dense three-dimensional model and distributes other subjects with sparse three-dimensional models. This can reduce the amount of distributed data while keeping the image quality of the important subject. In the case of a narrow network band, data transferor 119 may reduce the temporal resolution of the three-dimensional model to be distributed. For example, the distribution period of the foreground model may be increased.

FIG. 12 will be referred to again. Subsequently, video display terminal 117A performs three-dimensional space recognition by using the distributed three-dimensional model. First, viewpoint determiner 151 determines a virtual viewpoint (5105C). After that, renderer 152 performs rendering using the three-dimensional model, thereby generating free-viewpoint video that is video viewed from the virtual viewpoint (5106C). The processing is similar to that of steps S105 and S106 in Embodiment 1. Subsequently, video display 153 displays the generated free-viewpoint video (5108C).

When receiving the three-dimensional model from data transferor 119, video display terminal 117A may separately receive the foreground model and the background model. At this point, video display terminal 117A may analyze, for example, header information to acquire a flag or an identifier for identifying whether each model is a foreground model or a background model.

The foreground model and the background model may have different reception periods. The reception period of the foreground model may be shorter than that of the background model. If the recorded frame rate of imaging device 121 is, for example, 30 frames per second, video display terminal 117A receives 30 foreground models per second according to the recorded frame rate of imaging device 121. Moreover, video display terminal 117A receives one model as a background model.

During the reception of the foreground model, video display terminal 117A may receive a differential model as a difference between a foreground model at the current time and a foreground model at a previous time, and may generate the foreground model at the current time by adding the foreground model at the previous time and the differential model. Furthermore, video display terminal 117A may receive the differential model and motion information indicating the result of motion prediction, generate a prediction model from the received motion information and the foreground model at the previous time, and add the differential model and the prediction model so as to generate the foreground model at the current time. This can reduce the amount of information on the foreground model to be received, thereby suppressing the band of the network. If the differential model and the motion information are compressed by variable-length coding or arithmetic coding, video display terminal 117A may decode the differential model and the motion information by performing variable-length decoding or arithmetic decoding.

During the reception of the background model, video display terminal 117A may receive the single background model when the user starts viewing, and the background model may be used at all times. Alternatively, video display terminal 117A may receive the background model at predetermined regular intervals. At this point, video display terminal 117 receives a differential model as a difference between a previously received background model and a current background model and may generate the current background model by adding the previous background model and the differential model. This can reduce the amount of information on the received background model, thereby suppressing the network band.

Video display terminal 117A may receive both of the foreground model and the background model at random access points. Thus, video display terminal 117A can always generate free-viewpoint video by using proper foreground and background models when the user switches viewing times.

If the three-dimensional model cannot be received by a network error or the like, video display terminal 117A may perform rendering by using a received three-dimensional model. For example, if the foreground model cannot be received, video display terminal 117A may generate a prediction model by predicting a motion from the received foreground model and use the generated prediction model as a foreground model at the current time. If the background model cannot be received, video display terminal 117A may use the received background model or a CG model. If the background model or the foreground model cannot be received, video display terminal 117A may use a prepared model or rendering image, e.g., a CG image. Thus, even if the three-dimensional model cannot be received, video display terminal 117A can provide a rendering image for the user.

Data transferor 119 may distribute, to video display terminal 117A, at least one of a camera parameter, captured video, a background image, and a background subtracted image that are obtained by multi-viewpoint video imaging device 111, time information during the generation of each shot video or a three-dimensional model, viewpoint position information at the start of rendering, and time information for rendering.

If imaging device 121 is a stationary camera, data transferor 119 may distribute the camera parameter to video display terminal 117A only at the start of viewing. Alternatively, data transferor 119 may distribute the camera parameter to video display terminal 117A when calibration is performed by calibration indicator 114. If imaging device 121 is not stationary, data transferor 119 may distribute the camera parameter to video display terminal 117A each time the camera parameter is updated.

Moreover, data transferor 119 may encode and distribute shot video, a background image, or a background subtracted image that are obtained by multi-viewpoint video imaging device 111. This can reduce the amount of transmitted data. For example, data transferor 119 may use a multi-view codec (MVC) based on H.264 or H.265 according to a correlation between multi-viewpoint images. Alternatively, data transferor 119 may separately encode and distribute the videos of imaging devices 121 based on H.264 or H.265. This can reduce the amount of data distributed to video display terminal 117A.

The viewpoint position information at the start of rendering may be specified by the user through video display terminal 117A upon startup. Viewpoint determiner 151 may change a viewpoint position depending on the style of viewing through video display terminal 117A or the kind of video display terminal 117A. For example, in the case of viewing on television, viewpoint determiner 151 determines, as a starting viewpoint, a viewpoint recommended by the system, a viewpoint from imaging device 121 close to a ball, a viewpoint from imaging device 121 that shots the center of a field, or a viewpoint where a high rating is obtained. In the case of viewing on a personal terminal, e.g., a user's tablet or smartphone, viewpoint determiner 151 determines a viewpoint for viewing of a user's favorite player as a starting viewpoint. In the case of viewing on a head mounted display, viewpoint determiner 151 determines a recommended viewpoint for VR (Virtual Reality), e.g., an athlete's viewpoint on a field or a viewpoint from a bench as a starting viewpoint.

Embodiment 4

Figure 15:
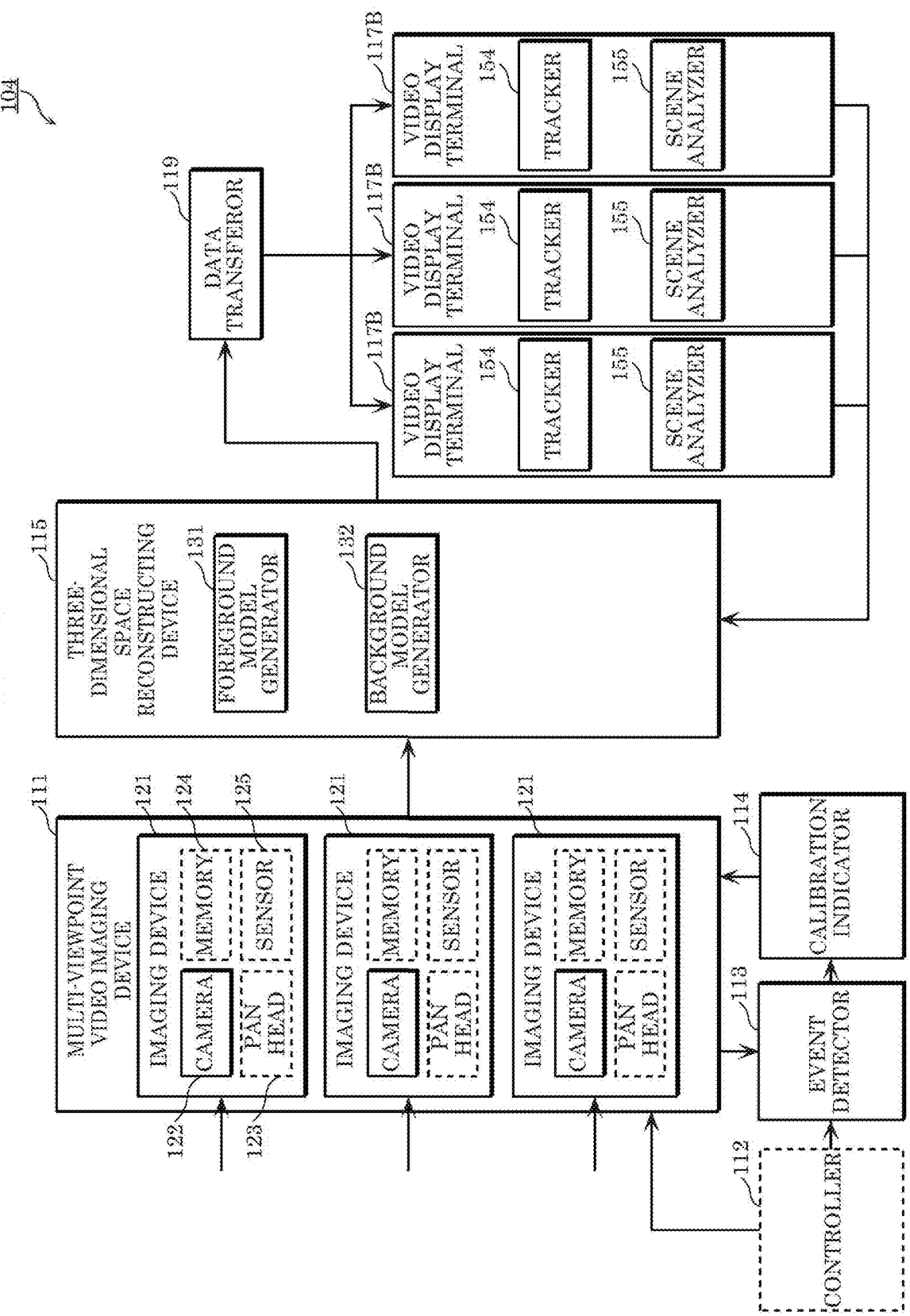
FIG. 15 is a block diagram illustrating the configuration of a next-generation monitoring system according to Embodiment 4.

In the present embodiment, a modification of next-generation monitoring system 102 according to Embodiment 2 will be described. FIG. 15 is a block diagram illustrating the configuration of next-generation monitoring system 104 according to the present embodiment. Next-generation monitoring system 104 in FIG. 15 is different from next-generation monitoring system 102 in FIG. 8 in that tracker 154 and scene analyzer 155 are provided in video display terminal 117B.

Figure 16:
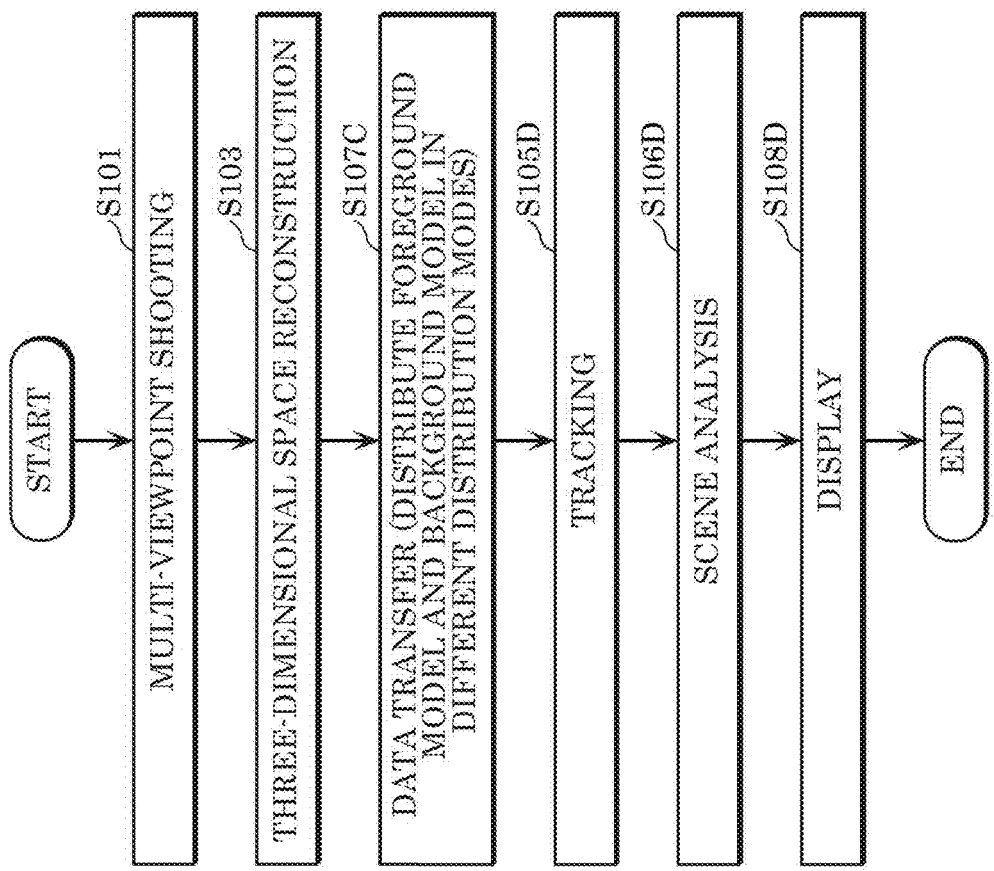
FIG. 16 is a flowchart showing the operations of the next-generation monitoring system according to Embodiment 4.

FIG. 16 is a flowchart showing the operations of next-generation monitoring system 104. Steps S101, S103, and S107C are similar to processing in Embodiment 3 illustrated in FIG. 12.

Subsequently, video display terminal 117B performs three-dimensional space recognition by using a three-dimensional model. Specifically, tracker 154 tracks a person on a three-dimensional space (5105D). Scene analyzer 155 analyzes a scene (5106D). Video display terminal 117B displays the result of three-dimensional space recognition (5108D). The processing is similar to that of steps S105B, S106B, and S108B in Embodiment 2.

Embodiment 5

The foregoing embodiments described examples in which the foreground model and the background model are included in the three-dimensional model. Models included in the three-dimensional model are not limited to the foreground model and the background model.

Figure 17:
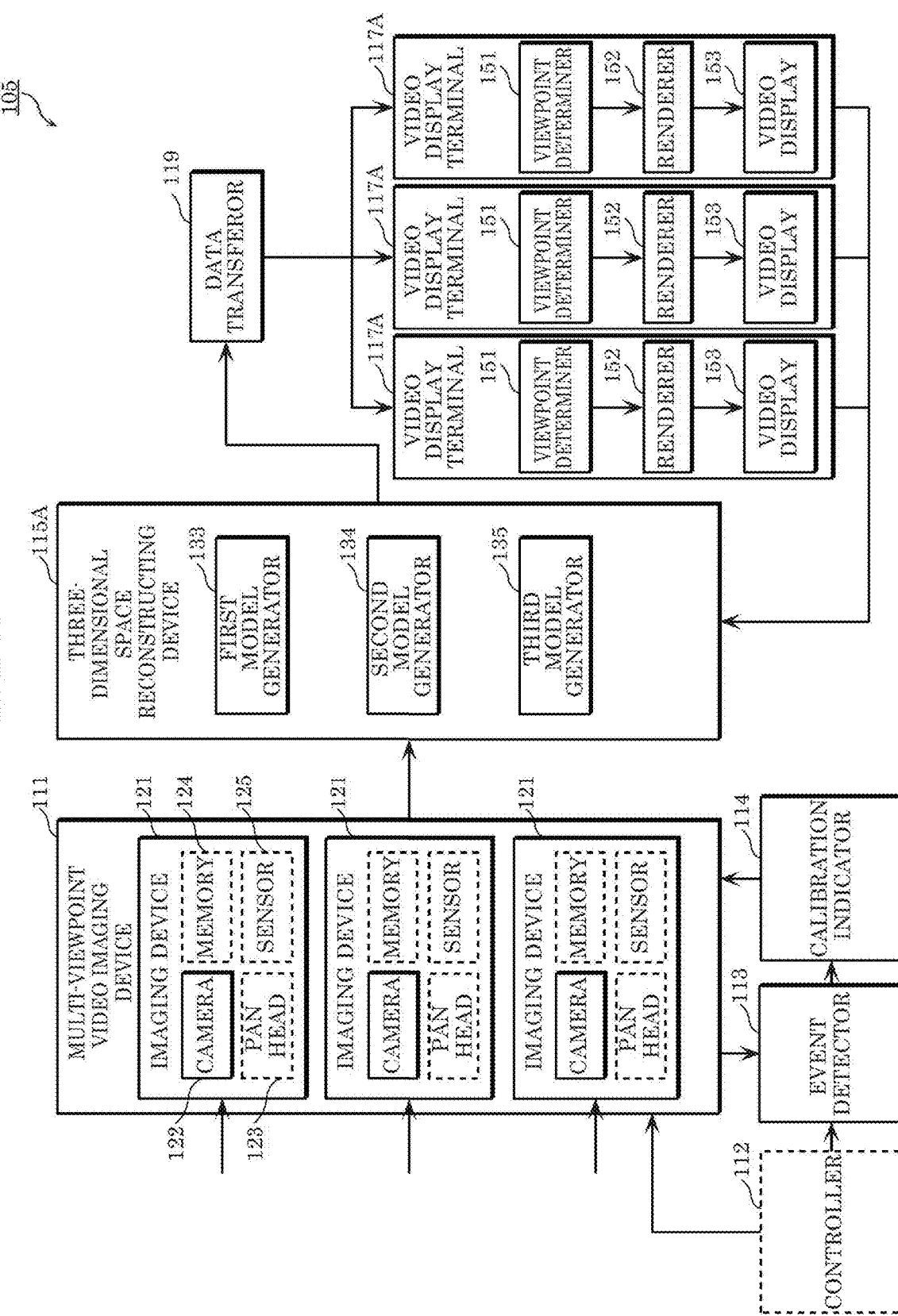
FIG. 17 is a block diagram illustrating a free-viewpoint video generating system according to Embodiment 5.

FIG. 17 is a block diagram illustrating the configuration of free-viewpoint video generating system 105 according to the present embodiment. Free-viewpoint video generating system 105 in FIG. 17 is different from free-viewpoint video generating system 103 in FIG. 11 in the configuration of the three-dimensional space reconstructing device 115A. Three-dimensional space reconstructing device 115A includes first model generator 133 for generating a first model, second model generator 134 for generating a second model, and third model generator 135 for generating a third model.

Three-dimensional space reconstructing device 115A generates a three-dimensional model including the first model, the second model, and the third model. Data transferor 119 distributes the first to third models to video display terminal 117A in different distribution modes. Three-dimensional space reconstructing device 115A updates the models with different frequencies. Data transferor 119 distributes the models to video display terminal 117A with different periods. For example, the first model is a foreground model, the second model is a part of a background model, and the third model is a background model other than the second model. In this case, if the recorded frame rate of imaging device 121 is, for example, 30 frames per second, data transferor 119 distributes 30 first models per second according to the recorded frame rate of imaging device 121. Moreover, data transferor 119 distributes the single second model per second and distributes one model as the third model at the start of viewing. Thus, regions updated with different frequencies in the background model can be distributed as different models with different periods, thereby suppressing a network band.

Data transferor 119 may add identifiers for identifying two or more models to the three-dimensional model. Thus, by analyzing the identifiers, video display terminal 117A can identify the model corresponding to the received three-dimensional model.

In this example, the three models are used. Four or more models may be used instead.

If two models are used, the two models may not be a foreground model or a background model. For example, three-dimensional data may include a first model frequently updated with a large amount of data and a second model less frequently updated with a small amount of data. Data transferor 119 may distribute the models to video display terminal 117A in different distribution modes. At this point, the models are updated with different frequencies and thus data transferor 119 distributes the models to video display terminal 117A with different periods. If the recorded frame rate of imaging device 121 is, for example, 30 frames per second, data transferor 119 distributes 30 first models per second according to the recorded frame rate of imaging device 121. Moreover, data transferor 119 distributes one model as the second model at the start of viewing. Thus, three-dimensional models with different amounts of data can be distributed with different periods, thereby suppressing the network band.

The first model and the second model may vary in significance. Data transferor 119 may distribute the models to video display terminal 117A in different distribution modes. At this point, the models vary in significance and thus data transferor 119 distributes the models to video display terminal 117A with different periods. For example, the first model is more significant while the second model is less significant. In this case, if the recorded frame rate of imaging device 121 is, for example, 30 frames per second, data transferor 119 distributes 30 first models per second and 15 second models per second according to the recorded frame rate of imaging device 121. Thus, the significant three-dimensional model can be preferentially distributed, thereby providing the user of video display terminal 117A with proper rendering video while suppressing the network band.

Data transferor 119 may switch, for example, densities other than the distribution periods according to the significance. For example, data transferor 119 may switch the densities of the models according to the priority. If data transferor 119 distributes a three-dimensional model in, for example, a soccer game, it is determined that the three-dimensional model of players playing in front of a goal is more significant while the three-dimensional model of a goal keeper near the other goal is less significant. Subsequently, data transferor 119 distributes the three-dimensional model of the goal keeper with a lower density than the more significant three-dimensional model. Data transferor 119 may not distribute the less significant three-dimensional model. Moreover, data transferor 119 determines the level of significance depending on, for example, whether the target model is close to a specific feature point or an object such as a ball or is close to a viewpoint position of many viewers. For example, a model close to a specific feature point or an object is significant and a model close to a viewpoint position viewed by many viewers is set to be significant.

Each of the models may be a set of at least one object (e.g., a person, a ball, or an automobile) identified by object recognition or the like or a set of regions such as a background and a foreground or objects that are identified according to motions.

Figure 18:
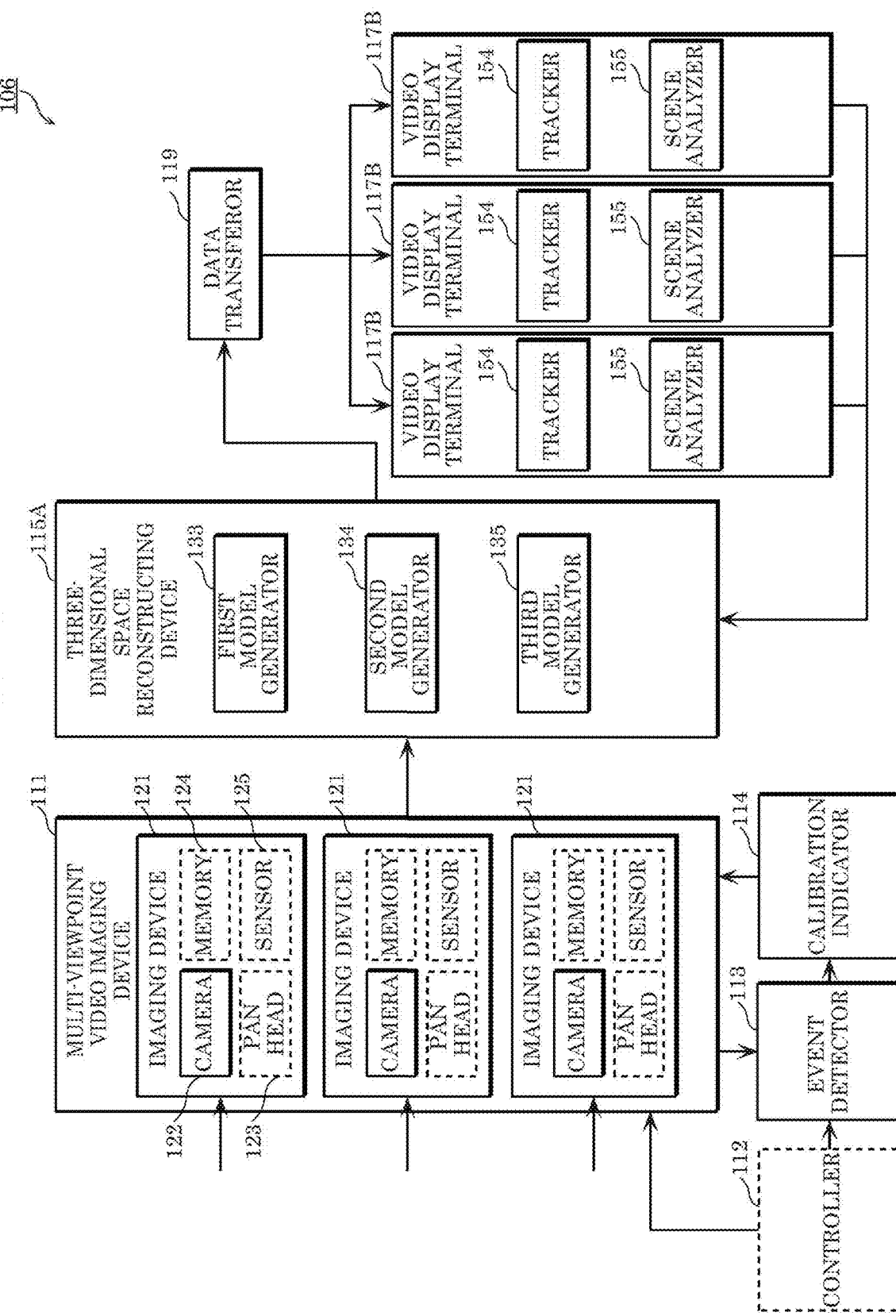
FIG. 18 is a block diagram illustrating the configuration of a next-generation monitoring system according to Embodiment 5.

The same modification is applicable to next-generation monitoring system 104 described in Embodiment 4. FIG. 18 is a block diagram illustrating the configuration of next-generation monitoring system 106 according to the present embodiment. Next-generation monitoring system 106 in FIG. 18 is different from next-generation monitoring system 104 in FIG. 15 in the configuration of three-dimensional space reconstructing device 115A. The functions of three-dimensional space reconstructing device 115A are similar to those of FIG. 17.

As described in Embodiments 1 to 4, the three-dimensional model distribution device (for example, data transferor 119) distributes a first model (e.g., a foreground model), which is a three-dimensional model of a target space in a target time period, in a first distribution mode and distributes a second model (e.g., a background model), which is a three-dimensional model of a target space in a target time period and makes a smaller change per unit time than the first model, in a second distribution mode different from the first distribution mode. In other words, the three-dimensional model distribution device separately transmits the foreground model and the background model.

For example, the transmission periods of the first model and the second model are different from each other. For example, the distribution period of the first distribution mode is shorter than that of the second distribution mode. The three-dimensional model distribution device transmits the first model at predetermined regular intervals. At this point, the three-dimensional model distribution device may transmit a differential model as a difference between the first model at the current time and the first model at a previous time. Furthermore, for the first model at the current time, the three-dimensional model distribution device may transmit motion information from the first model at the previous time.

For example, the three-dimensional model distribution device transmits the second model at the start of viewing. Moreover, the three-dimensional model distribution device transmits the second model at predetermined regular intervals. Furthermore, the three-dimensional model distribution device may transmit a differential model as a difference between the current second model and the previously transmitted second model. The three-dimensional model distribution device may transmit the second model at each random access point.

The three-dimensional model distribution device may transmit information such as a flag for discriminating between the first model and the second model.

The three-dimensional model distribution device may transmit both of the first model and the second model at random access points.

The three-dimensional model distribution device may generate the first model and the second model according to different methods. Specifically, the three-dimensional model distribution device generates the first model according to a first generating method and generates the second model according to a second generating method having different accuracy from the first generating method. For example, the three-dimensional model distribution device generates the first model according to the first generating method and generates the second model according to the second generating method having higher accuracy than the first generating method. Alternatively, the three-dimensional model distribution device generates the first model according to the first generating method and generates the second model according to the second generating method having lower accuracy than the first generating method. For example, if it is necessary to render the first model (foreground model) of a player or a criminal with maximum image quality, the three-dimensional model distribution device generates the first model with high accuracy even when the amount of data increases. In the meantime, the three-dimensional model distribution device suppresses the amount of data by reducing the accuracy of the second model of audience or a background image that is a less significant region than a foreground.

For example, from a third model that is a three-dimensional model of a plurality of objects included in a target space in a target time period and the second model (background model) that is a three-dimensional model of some of the objects included in the target space in the target time period, the three-dimensional model distribution device generates the first model (foreground model) as a difference between the third model and the second model.

For example, the three-dimensional model distribution device generates a third multi-viewpoint image (background subtracted image) as a difference between a first multi-viewpoint image (shot image) of a plurality of objects included in a target space in a target time period and a second multi-viewpoint image (background image) of some of the objects and generates the first model (foreground model) by using the third multi-viewpoint image (background subtracted image).

Alternatively, the three-dimensional model distribution device may generate the first model according to a visual hull method by using the second multi-viewpoint image (captured image) or the third multi-viewpoint image (background subtracted image) and generate the second model by using the matching results of feature points between cameras. This can reduce a throughput for generating the first model and improve the accuracy of the second model. The three-dimensional model distribution device may manually generate the second model.

The three-dimensional model distribution device may distribute data other than the three-dimensional model. For example, the data other than the three-dimensional model includes at least one of a camera parameter, a multi-viewpoint image, a background subtracted image, time information, and a starting viewpoint position.

Alternatively, the three-dimensional model distribution device may distribute the camera parameter of a stationary camera at the start of viewing and distribute the camera parameter of an unfixed camera each time the camera parameter is changed.

The viewpoint position at the start of viewing may be specified by a user at the start of viewing. The viewpoint position at the start of viewing may be changed depending on the style of viewing or the kind of a terminal. For example, in the case of viewing on television, a recommended viewpoint is selected, one of stationary cameras (e.g., near a ball or at the center of a field) is selected, or a viewpoint having a high rating is selected. In the case of viewing on a personal tablet or smartphone, a viewpoint for viewing a favorite player is selected. In the case of viewing on a head mounted display, a recommended viewpoint for VR (e.g., a viewpoint on a field) is selected.

The first model and the second model are not limited to the foreground model and the background model. Alternatively, two or more models may be generated and distributed in different distribution modes. In this case, the models are updated with different frequencies (the frequency of updating varies among regions on the background) and thus the three-dimensional model distribution device distributes the models with different periods. Moreover, the three-dimensional model distribution device adds identifiers for identifying two or more models.

Furthermore, the three-dimensional model distribution device switches an encoding method for each of the models.

For example, a first encoding method is used in the first distribution mode used for the first model. A second encoding method is used in the second distribution mode used for the second model. The first encoding method and the second encoding method vary in at least one of processing delay and encoding efficiency. For example, the second encoding method has a larger processing delay than the first encoding method. Moreover, the second encoding method has higher encoding efficiency than the first encoding method. Alternatively, the second encoding method has lower encoding efficiency than the first encoding method.

The first distribution mode may have a lower delay than the second distribution mode. For example, the three-dimensional model distribution device distributes the first model with a low delay via a reliable line (for example, UDP is used). Moreover, the three-dimensional model distribution device distributes the second model via a low-speed line (e.g., TCP is used). Alternatively, the three-dimensional model distribution device may distribute the second model in a downloadable manner (e.g., HTTP) and stream the first model (e.g., RTP).

If the three-dimensional model cannot be received by a network error or the like, a received three-dimensional model may be used by a three-dimensional model receiver (e.g., video display terminal 117A). For example, if the first model cannot be received, the three-dimensional model receiver generates a prediction model by predicting a motion from the received first model and uses the generated prediction model as a first model at the current time.

If the second model cannot be received, the three-dimensional model receiver uses the received second model. Alternatively, the three-dimensional model receiver uses a prepared model or a rendering image, e.g., a CG model or a CG image. In other words, the three-dimensional model receiver may perform error concealment on the first model and the second model in different ways.

The three-dimensional model distribution device may preferentially distribute the first model and the second model that are necessary for generating video from a user's viewpoint. For example, the three-dimensional model distribution device may distribute a first model necessary for generating video from a user's viewpoint with high accuracy and thin other first models. In other words, terminals (e.g., video display terminal 117A) at the distribution destinations of the first model and the second model generate free-viewpoint video from selected viewpoints by using the first model and the second model. The three-dimensional model distribution device preferentially distributes the first model necessary for generating free-viewpoint video.

The three-dimensional model distribution device may change the quality of a three-dimensional model to be distributed according to a usable network band. For example, the three-dimensional model distribution device changes the density or rendering resolution of the three-dimensional model according to the network band. In the case of a strict band, the three-dimensional model distribution device reduces the density of the three-dimensional model so as to lower the rendering resolution. The density of the three-dimensional model can be changed by, for example, uniform thinning or switching densities according to a target object. In the case of a strict band, the three-dimensional model distribution device reduces the temporal resolution of the three-dimensional model to be distributed. For example, the distribution period of the first model is increased.

In the examples of the foregoing description, the three-dimensional model is generated using multi-viewpoint video obtained by multi-viewpoint video imaging device 111. The method of generating the three-dimensional model (the foreground model and the background model) is not limited to the foregoing description. For example, the three-dimensional model may be generated using information obtained by means other than a camera, e.g., LiDAR (Light Detection and Ranging) or TOF (Time of Flight). Moreover, the information may be used to generate multi-viewpoint video used for generating the three-dimensional model.

The three-dimensional model may be generated in any form as long as the information indicates the three-dimensional position of a target object. For example, the three-dimensional model may be generated in the forms of point clouds, voxels, meshes, polygons, or depth information.

Embodiment 6

In the present embodiment, three-dimensional space reconstructing device 115C generates at least one depth image from a three-dimensional model, compresses the generated depth image, and distributes the depth image to video display terminal 117C. Video display terminal 117C restores the three-dimensional model from the received depth image. The depth image is efficiently compressed and distributed so as to suppress a network band during the distribution.

Figure 19:
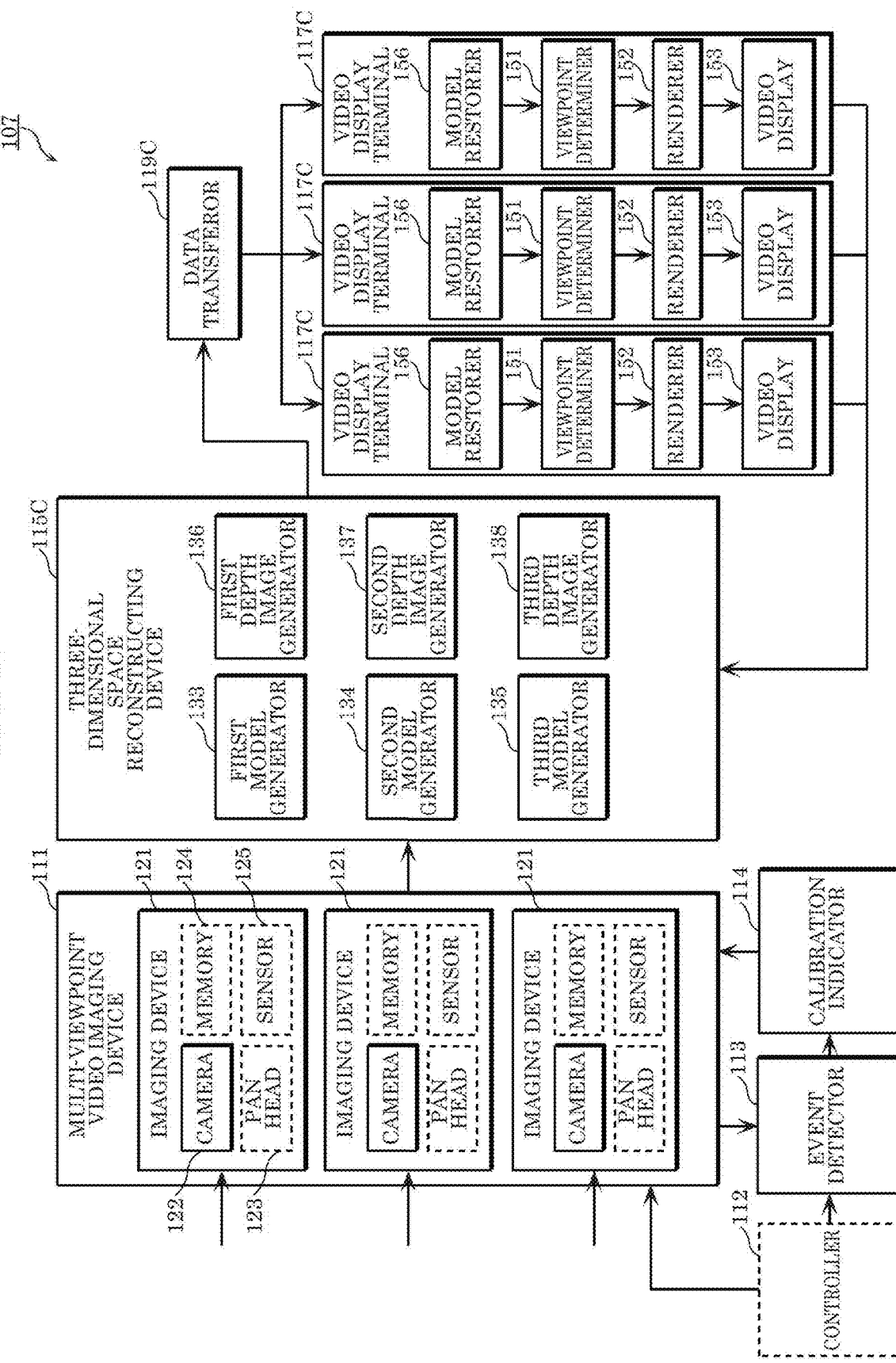
FIG. 19 is a block diagram illustrating the configuration of a free-viewpoint video generating system according to Embodiment 6.

FIG. 19 is a block diagram illustrating the configuration of free-viewpoint video generating system 107 according to the present embodiment. Free-viewpoint video generating system 107 in FIG. 19 is different from free-viewpoint video generating system 105 in FIG. 17 in the configurations of the three-dimensional space reconstructing device 115C, data transferor 119C, and video display terminal 117C. Three-dimensional space reconstructing device 115C includes first depth image generator 136, second depth image generator 137, and third depth image generator 138 in addition to the configuration of three-dimensional space reconstructing device 115A. Video display terminal 117C includes model restorer 156 in addition to the configuration of video display terminal 117A.

Three-dimensional space reconstructing device 115C does not distribute a three-dimensional model but generates at least one depth image (distance image) from a created three-dimensional model. Data transferor 119C distributes at least one generated depth image to video display terminal 117C. In this case, video display terminal 117C receives at least one depth image, restores (generates) the three-dimensional model, and generates a rendering image by using the restored three-dimensional model and a received captured image.

Figure 20:
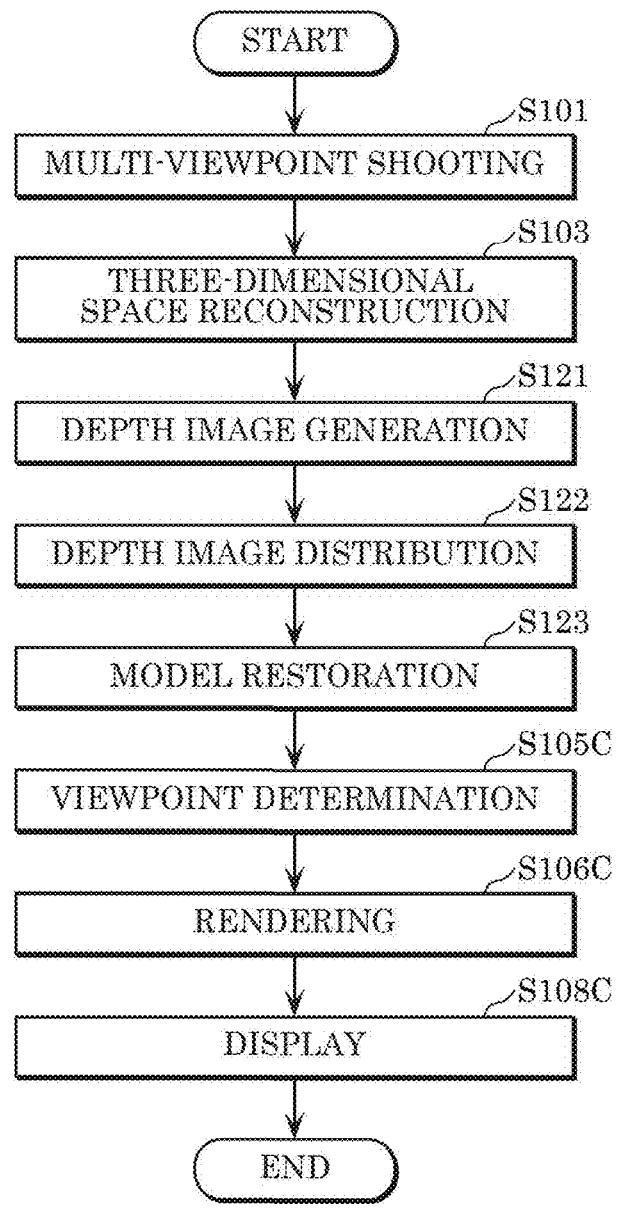
FIG. 20 is a flowchart showing the operations of the free-viewpoint video generating system according to Embodiment 6.

FIG. 20 is a flowchart showing the operations of free-viewpoint video generating system 107. The processing in FIG. 20 is different from that of FIG. 12 in that step S107C is replaced with steps S121 to S123.

In steps S101 and S103, first model generator 133, second model generator 134, and third model generator 135 generate a first model, a second model, and a third model as in embodiment 5.

Subsequently, first depth image generator 136 generates at least one first depth image from the first model, second depth image generator 137 generates at least one second depth image from the second model, and third depth image generator 138 generates at least one third depth image from the third model (S121).

Data transferor 119C then performs, for example, two-dimensional image compression on the generated first depth image, second depth image, and third depth image, thereby reducing the data amount of the depth images. Thereafter, data transferor 119C distributes the compressed first depth image, second depth image, and third depth image to video display terminal 117C (S122).

Model restorer 156 of video display terminal 117C then decodes the received first depth image, second depth image, and third depth image. Model restorer 156 restores (generates) the first model by using the first depth image, restores (generates) the second model by using the second depth image, and restores (generates) the third model by using the third depth image (S123).

Thereafter, viewpoint determiner 151 determines a viewpoint requested by a user as in embodiment 5 (S105C). Renderer 152 generates a rendering image, which is an image viewed from the determined viewpoint, by using the restored first to third models and a received captured image (S106C). Video display 153 displays the rendering image (S108C).

As described above, data transferor 119C distributes the depth images, which are two-dimensional images, instead of a three-dimensional model. Thus, data transferor 119C can transmit compressed depth images according to a standard image compression scheme such as H.264 or H.265, thereby suppressing the amount of transferred data.

The first to third models may be configured in the forms of points (point clouds), meshes, or polygons.

In this example, the first to third models are generated as in embodiment 5. The same method is applicable to the generation of a foreground model and a background model as in embodiments 1 to 4. Moreover, the same method is applicable to the generation of a three-dimensional model.

The free-viewpoint video generating system was described in this example. The same method is also applicable to a next-generation monitoring system.

In addition to a depth image, three-dimensional space reconstructing device 115C may distribute a camera parameter corresponding to the depth image. For example, the camera parameter is a camera parameter at the viewpoint of the depth image. The camera parameter includes an internal parameter indicating the focal length of a camera and an image center or the like and an external parameter indicating the orientation of the camera (three-dimensional position and orientation) or the like. Three-dimensional space reconstructing device 115C generates a depth image from a three-dimensional model by using the camera parameter.

Information to be transmitted is not limited to the camera parameter and may be any parameter used when a depth image is generated from a three-dimensional model. In other words, the parameter may be any parameter for projecting a three-dimensional model to a predetermined viewpoint (the viewpoint of a depth image) imaging plane. For example, the parameter may be a projection matrix calculated using the camera parameter.

Video display terminal 117C generates a three-dimensional model by projecting the pixels of at least one depth image by using the received camera parameter.

Three-dimensional space reconstructing device 115C may generate a plurality of depth images captured by projecting a three-dimensional model on the same plane as the imaging planes of imaging devices 121. This aligns the viewpoint positions of a captured image and the depth images. Therefore, for example, if data transferor 119C compresses images captured from multiple viewpoints of multi-viewpoint video imaging device 111 through multi-view encoding that is an extension standard of H.264 or H.265, parallax information between the captured images can be calculated using the depth images and a predicted image between the viewpoints can be generated using the parallax information. This can reduce the code amount of the captured image.

Alternatively, three-dimensional space reconstructing device 115C may generate a depth image by projecting a three-dimensional model on the same plane as the imaging plane of a viewpoint different from that of imaging device 121. In other words, the viewpoint of the depth image may be different from that of a captured image. For example, three-dimensional space reconstructing device 115C generates a depth image by projecting a three-dimensional model to a viewpoint position where the three-dimensional model is easily restored by video display terminal 117C. Thus, video display terminal 117C can generate a three-dimensional model with few errors. The viewpoint where a three-dimensional model is easily restored by video display terminal 117C is, for example, a viewpoint from which more objects are viewable.

Furthermore, data transferor 119C may compress and transmit a depth image. For example, data transferor 119C may compress (encode) a depth image according to a two-dimensional image compression scheme such as H.264 or H.265. Data transferor 119C may compress the depth images of different viewpoints according to dependence between the depth images as in a multi-view encoding mode. For example, data transferor 119C may generate a predicted image between viewpoints by using the parallax information calculated from the camera parameter.

Three-dimensional space reconstructing device 115C may determine a bit length, which indicates the value of each pixel of a depth image, such that an error between a three-dimensional model generated by three-dimensional space reconstructing device 115C and a three-dimensional model restored by video display terminal 117C is not larger than a constant value. For example, three-dimensional space reconstructing device 115C may set the bit length of a depth image at a first bit length (e.g., 8 bits) at a short distance to a subject or set the bit length at a second bit length (e.g., 16 bits), which is longer than the first bit length, at a long distance to a subject. Moreover, three-dimensional space reconstructing device 115C may adaptively change the bit length according to a distance to a subject. For example, three-dimensional space reconstructing device 115C may shorten the bit length as a distance to a subject increases.

As described above, three-dimensional space reconstructing device 115C controls the bit length of a depth image to be distributed, according to the error of a three-dimensional model restored by video display terminal 117C. Thus, the error of the three-dimensional model restored by video display terminal 117C can be suppressed within a permissible range; meanwhile, the network load can be reduced by cutting the amount of information on the distributed depth image. For example, in the case of an 8-bit depth image in comparison with in the case of a 16-bit depth image, the error of the three-dimensional model restored by video display terminal 117C increases; meanwhile, the distributed network load can be reduced.

If color information is added to points constituting a three-dimensional model, three-dimensional space reconstructing device 115C may generate a depth image and a texture image including the color information by projecting the points and the color information to the same plane as the imaging plane of at least one viewpoint. In this case, data transferor 119C may compress and distribute the depth image and the texture image. Furthermore, video display terminal 117C decodes the compressed depth image and texture image and generates a three-dimensional model and color information on points included in the three-dimensional model by using the at least one obtained depth image and texture image. Thereafter, video display terminal 117C generates a rendering image by using the generated three-dimensional model and color information.

The depth image and the texture image may be compressed by data transferor 119C or three-dimensional space reconstructing device 115C.

Three-dimensional space reconstructing device 115C or data transferor 119C may distribute the foregoing background subtracted image that is generated by subtracting a background image from a captured image. In this case, video display terminal 117C may generate a three-dimensional model by using the background subtracted image and generate a rendering image by using the generated three-dimensional model.

Three-dimensional space reconstructing device 115C or data transferor 119C may distribute position information on the position of each model on a three-dimensional space. Thus, video display terminal 117C can easily combine models by using the received position information after the models are generated. For example, three-dimensional space reconstructing device 115C calculates the position information on the models by detecting points or the like on the three-dimensional space when the models are generated. Moreover, three-dimensional space reconstructing device 115C may detect a specific subject, e.g., an athlete in advance on a two-dimensionally captured image and specify the three-dimensional position of the subject (model) by using captured images and subject detection information.

The depth image is two-dimensional image information on a distance to a subject from a viewpoint. The pixels of the depth image store values indicating information on distances to the points of a three-dimensional model projected to the pixels. Information on depths does not always include images. Any information may be used as long as the information indicates distances to points constituting a three-dimensional model.

In the forgoing example, three-dimensional space reconstructing device 115C generates a depth image by temporarily generating a three-dimensional model from a background subtracted image or the like and projecting the three-dimensional model to each viewpoint. The present disclosure is not limited to this example. For example, three-dimensional space reconstructing device 115C may generate a three-dimensional model from an object other than an image by using LiDAR or the like and then generate a depth image from the three-dimensional model. Alternatively, three-dimensional space reconstructing device 115C may acquire, for example, a generated three-dimensional model from the outside and then generate a depth image from the acquired three-dimensional model.

Furthermore, three-dimensional space reconstructing device 115C may set a bit length in a depth image at a different value for each model. For example, three-dimensional space reconstructing device 115C may set the bit lengths of the first depth image and the second depth image at different values. Data transferor 119C may distribute information on the bit lengths of the first depth image and the second depth image to video display terminal 117C. For example, if the first model is a foreground model and the second model is a background model, three-dimensional space reconstructing device 115C sets the bit length of the first depth image of the foreground model, which requires higher model precision, at 16 bits and sets the bit length of the second depth image of the background model, which does not require high model precision, at 8 bits. This can preferentially allocate a bit length to the depth image of a part where models such as a foreground model need to be restored with high precision on video display terminal 117C; meanwhile, the amount of information on the distributed depth image is suppressed.

The depth image of a model that requires high precision may be distributed to video display terminal 117C by data transferor 119C, whereas the depth image of a model that does not require high precision may not be distributed to video display terminal 117C by data transferor 119C. For example, data transferor 119C distributes the first depth image of the foreground model to video display terminal 117C and does not distribute the second depth image of the background model to video display terminal 117C. In this case, a prepared background model is used by video display terminal 117C. This can reduce the amount of information on the distributed depth image, thereby suppressing the network load.

Video display terminal 117C may determine whether to use a three-dimensional model restored from a distributed depth image or a prepared three-dimensional model. For example, if video display terminal 117C is a high-performance terminal, video display terminal 117C restores three-dimensional models from the depth image of the distributed foreground model and the depth image of the background model and uses the obtained three-dimensional models for rendering, thereby generating a rendering image with a foreground and a background of high quality. If video display terminal 117C is a smartphone that is a low-performance terminal requiring suppressed power consumption, video display terminal 117C restores a foreground model from a distributed depth image and uses a prepared background model instead of a depth image distributed as a background model. This can generate a rendering image with a high-quality foreground while suppressing the throughput. In this way, three-dimensional models to be used are switched according to the throughput of video display terminal 117C, achieving balance between the quality of the rendering image and power consumption with a reduced throughput.

Figure 21:
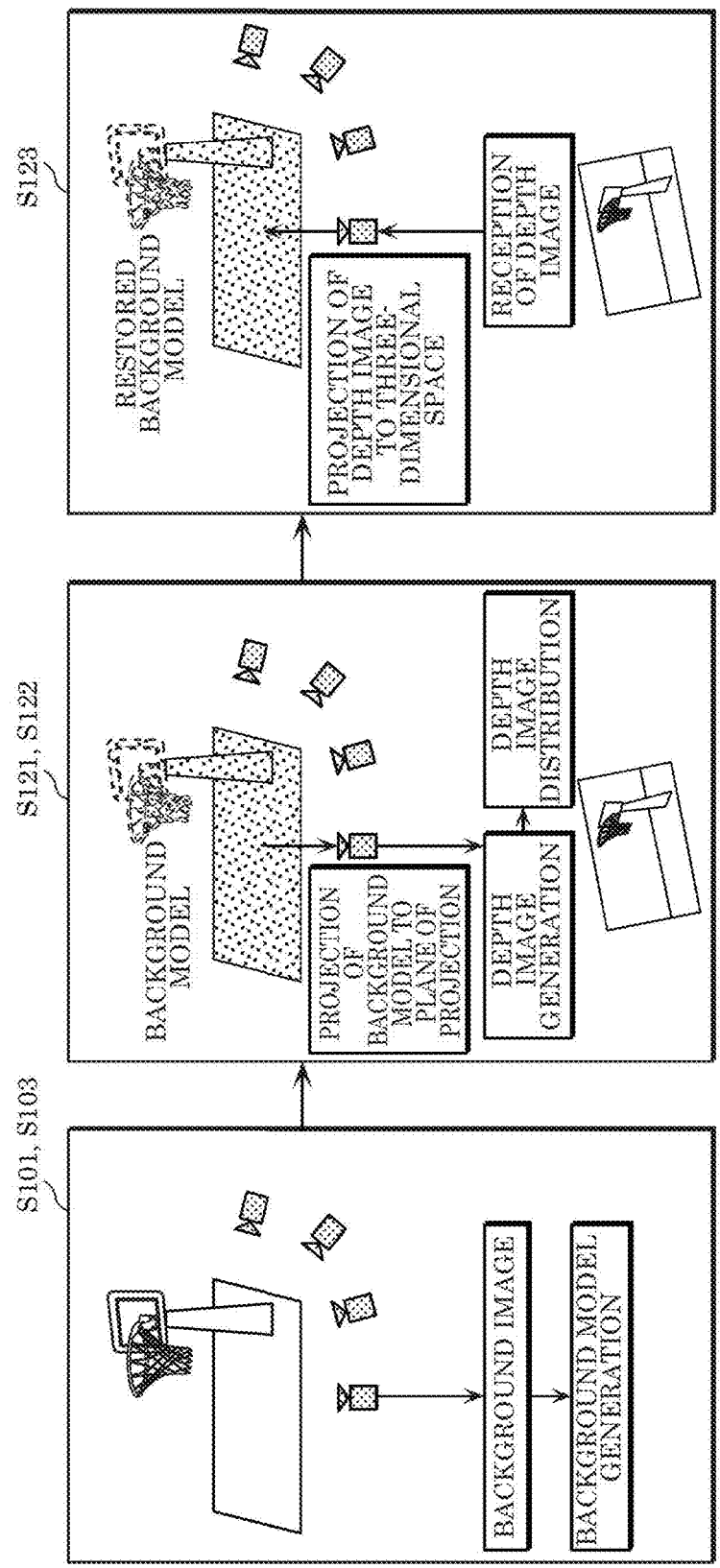
FIG. 21 is an explanatory drawing of the generation and restoration of a three-dimensional model according to Embodiment 6.

A specific example of a method of generating and restoring a three-dimensional model will be described below. FIG. 21 is an explanatory drawing of the generation and restoration of a background model as a three-dimensional model.

First, three-dimensional space reconstructing device 115C generates the background model from a background image (S101, S103). For example, the detail of the processing is similar to that of step S111 shown in FIG. 7.

Subsequently, three-dimensional space reconstructing device 115C generates the depth image of viewpoint A from the points of the background model (S121). Specifically, three-dimensional space reconstructing device 115C calculates projection matrix A by using the camera parameter of viewpoint A. Three-dimensional space reconstructing device 115C then creates a depth image (distance image) by projecting the points of the background model to the plane of projection of viewpoint A by using projection matrix A.

At this point, two or more points may be projected to the same pixel in the depth image. In this case, for example, three-dimensional space reconstructing device 115C uses a value at a minimum distance from the plane of projection of viewpoint A as the pixel value of the depth image. This can prevent the entry of the depth value of a subject hidden behind a subject from viewpoint A, thereby correctly generating the depth image.

Data transferor 119C distributes the generated depth image (S122). At this point, data transferor 119C reduces the amount of data by applying standard two-dimensional image compression of H.264 or H.265 to the depth image. Data transferor 119C may compress the depth image according to the multi-view encoding mode in which a parallax between viewpoints is used.

Moreover, data transferor 119C distributes the camera parameter with the depth image. The camera parameter is used when the depth image is generated from the three-dimensional model. Data transferor 119C may distribute projection matrix A calculated using the camera parameter, instead of or in addition to the camera parameter.

Video display terminal 117C then restores the points of the background model by projecting the depth images of multiple viewpoints to a three-dimensional space (S123). At this point, video display terminal 117C may confirm whether the restored points and the viewpoints are free from error in a geometric positional relationship, and may optionally readjust the positions of the points. For example, video display terminal 117C matches feature points by using images between the viewpoints and adjusts the positions of the points so as to match the points for the respective matched feature points on a three-dimensional space. Thus, video display terminal 117C can precisely restore the three-dimensional model.

In this example, the background model is generated and restored. The same method is also applicable to other models such as a foreground model.

Figure 22:
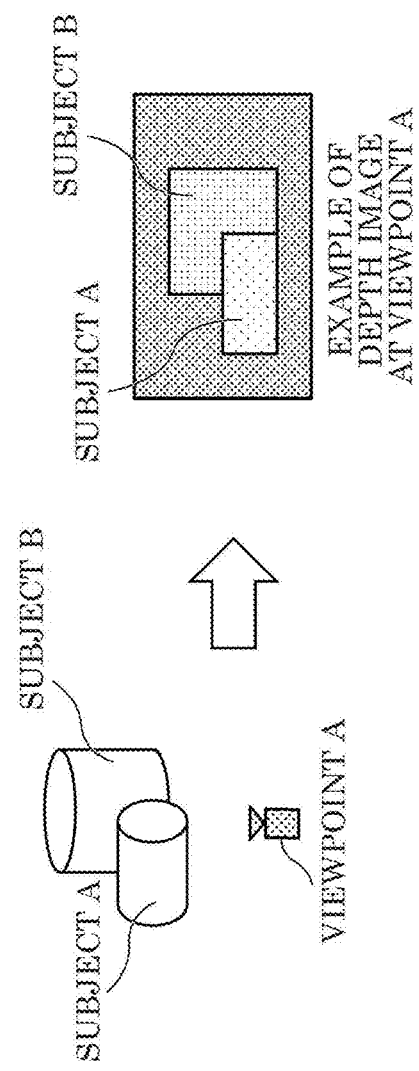
FIG. 22 shows an example of a depth image according to Embodiment 6.

An example of the depth image will be described below. FIG. 22 shows an example of the depth image. Each pixel of the depth image indicates information on a distance to a subject. For example, the depth image is expressed by an 8-bit monochrome image. In this case, the shorter the distance from viewpoint A, the brighter the allocated value (a value close to 255), whereas the longer the distance from viewpoint A, the darker the allocated value (a value close to 0). In the example of FIG. 22, a bright value is allocated to subject A near viewpoint A, whereas a darker value is allocated to subject B remote from viewpoint A. The background is more remote than subject B and thus a value darker than that of subject B is allocated to the background.

In the depth image, a brighter value (a value close to 255) may be allocated as the distance from viewpoint A increases, whereas a darker value (a value close to 0) may be allocated as the distance from viewpoint A decreases. In the example of FIG. 22, information on distances to the subjects is expressed as the depth image. The information to be transmitted is not limited to this and may be in any format as long as distances to the subjects can be expressed. For example, information on distances to subjects A and B may be represented as text information or the like instead of images. In this example, the depth image has a length of 8 bits. The bit length is not limited to this and may be larger or smaller than 8 bits. If a value larger than 8 bits, for example, a 16-bit value is used, information on distances to the subjects can be more minutely reproduced. This can improve the accuracy of restoring a three-dimensional model on video display terminal 117C. Therefore, a three-dimensional model close to the three-dimensional model generated by three-dimensional space reconstructing device 115C can be restored on video display terminal 117C. The amount of information on the distributed depth image is increased, thereby increasing the network load.

If a value smaller than 8 bits, for example, a 4-bit value is used, information on distances to the subjects is roughly reproduced. This reduces the accuracy of restoring a three-dimensional model on video display terminal 117C. Therefore, an error increases between the restored three-dimensional model and the three-dimensional model generated by three-dimensional space reconstructing device 115C. The amount of information on the distributed depth image can be reduced, thereby suppressing the network load.

Three-dimensional space reconstructing device 115C may determine the bit length of the depth image based on whether a target application requires a three-dimensional model with high accuracy on video display terminal 117C. For example, if the target application does not depend on the quality of video after rendering, three-dimensional space reconstructing device 115C reduces the bit length of the depth image and preferentially suppresses the distributed network load. For example, if the target application depends on the quality of video, three-dimensional space reconstructing device 115C increases the bit length of the depth image. Three-dimensional space reconstructing device 115C preferentially improves the quality of the image after rendering even if the distributed network load increases.

Moreover, three-dimensional space reconstructing device 115C may adaptively change the bit length of the depth image according to the distributed network load. For example, in the case of a high network load, three-dimensional space reconstructing device 115C sets a short bit length so as to suppress the network load while reducing the accuracy of a three-dimensional model. In the case of a low network load, three-dimensional space reconstructing device 115C sets a long bit length so as to more minutely generate a three-dimensional model on video display terminal 117C. At this point, three-dimensional space reconstructing device 115C may store information on the bit length of the depth image in header information or the like and distribute the information with the depth image to video display terminal 117C. Thus, video display terminal 117C can be notified of the bit length of the depth image. Three-dimensional space reconstructing device 115C may add the information on the bit length of the depth image to each depth image, for a change of the bit length, or for each period, e.g., each random access point. The information may be added only to the first depth image or may be distributed at other timings.

Figure 23A:
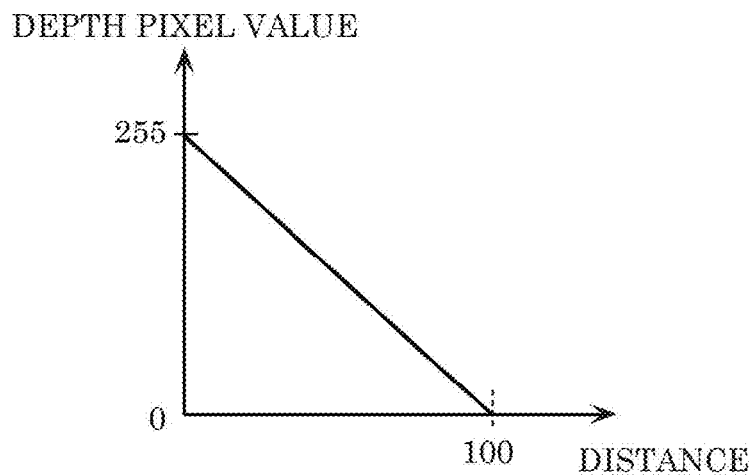
FIG. 23A shows an allocation example of an image value in the depth image according to Embodiment 6.
Figure 23B:
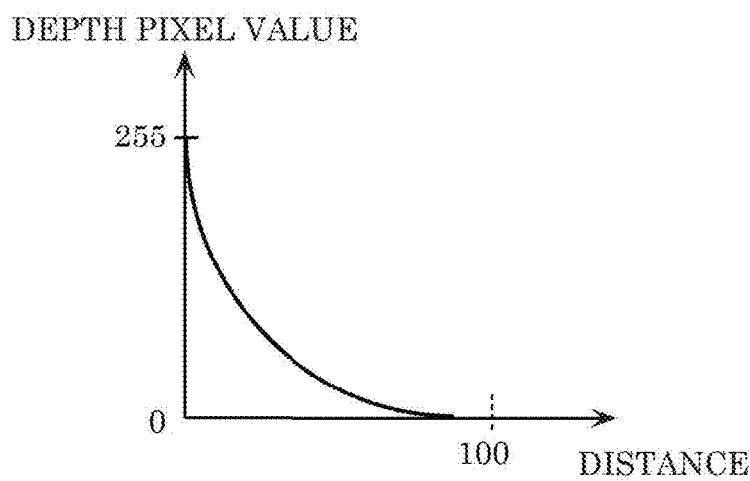
FIG. 23B shows an allocation example of an image value in the depth image according to Embodiment 6.
Figure 23C:
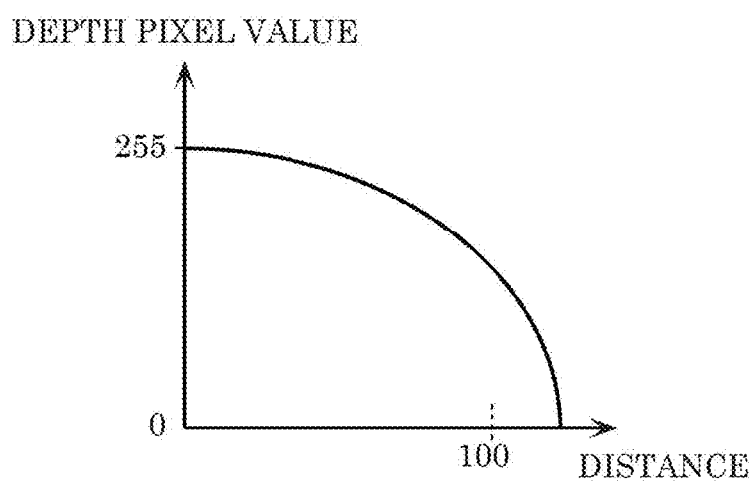
FIG. 23C shows an allocation example of an image value in the depth image according to Embodiment 6.

Examples of the allocation of image values in the depth image will be described below. FIGS. 23A, 23B, and 23C show first to third examples of the allocation of pixel values in the depth image.

In the first allocation method in FIG. 23A, values are linearly allocated to the pixel values (depth pixel values) of the depth image having an 8-bit length according to the distance.

In the second allocation method in FIG. 23B, values are allocated to the pixel values of the depth image having an 8-bit length preferentially for a subject at a short distance. This can improve the distance resolution of a subject at a short distance. Thus, the accuracy of the foreground model can be increased by using the second allocation method for the depth image of the foreground model. Three-dimensional space reconstructing device 115C may distribute information on the second allocation method (information on a pixel value corresponding to a distance) such that the information is included in header information or the like. Alternatively, the information may be determined in advance based on standards or the like and the same information may be used on the transmitting side and the receiving side.

In the third allocation method in FIG. 23C, values are allocated to the pixel values of the depth image having an 8-bit length preferentially for a subject at a long distance. This can improve the distance resolution of a subject at a long distance. Thus, the accuracy of the background model can be increased by using the third allocation method for the depth image of the background model. Three-dimensional space reconstructing device 115C may distribute information on the third allocation method (information on a pixel value corresponding to a distance) such that the information is included in header information or the like. Alternatively, the information may be determined in advance based on standards or the like and the same information may be used on the transmitting side and the receiving side.

Furthermore, three-dimensional space reconstructing device 115C may switch the allocation methods for each of the models. For example, three-dimensional space reconstructing device 115C may apply the second allocation method to the foreground model and the third allocation method to the background model.

At this point, three-dimensional space reconstructing device 115C may add information on which one of the first to third allocation methods is to be used, to header information or the like for each of the distributed models. Alternatively, the application of the allocation methods to the models may be determined in advance based on standards or the like.

Three-dimensional space reconstructing device 115C may add information on which one of the allocation methods determined in advance based on standards is to be used, to header information or the like.

As described above, three-dimensional space reconstructing device 115C or data transferor 119C generates a depth image from a three-dimensional model and distributes, to video display terminal 117C, the depth image and information for restoring the three-dimensional model from the depth image.

Video display terminal 117C receives the depth image generated from the three-dimensional model and the information for restoring the three-dimensional model from the depth image and restores the three-dimensional model from the depth image by using the information.

In this way, the three-dimensional model is not distributed as it is but the depth image generated from the three-dimensional model is distributed instead, thereby suppressing the amount of distributed data.

In the generation of the depth image, three-dimensional space reconstructing device 115C generates the depth image by projecting the three-dimensional model to the imaging plane of a predetermined viewpoint. For example, the information for restoring the three-dimensional model from the depth image includes a parameter for projecting the three-dimensional model to the imaging plane from the predetermined viewpoint.

For example, the information for restoring the three-dimensional model from the depth image is a camera parameter. Specifically, in the generation of the depth image, three-dimensional space reconstructing device 115C generates the depth image by projecting the three-dimensional model to the imaging plane of the viewpoint by using the camera parameter of the predetermined viewpoint. The information includes the camera parameter.

Moreover, the information includes a parameter for projecting the three-dimensional model to the imaging plane of the depth image. In the restoration, video display terminal 117C restores the three-dimensional model from the depth image by using the parameter.

For example, the information includes the camera parameter of the viewpoint of the depth image. In the restoration, video display terminal 117C restores the three-dimensional model from the depth image by using the camera parameter.

The information for restoring the three-dimensional model from the depth image may be a projection matrix. Specifically, in the generation of the depth image, three-dimensional space reconstructing device 115C calculates the projection matrix by using the camera parameter of the predetermined viewpoint and generates the depth image by projecting the three-dimensional model to the imaging plane of the viewpoint by using the projection matrix. The information includes the projection matrix.

The information includes the projection matrix. In the restoration, video display terminal 117C restores the three-dimensional model from the depth image by using the projection matrix.

For example, three-dimensional space reconstructing device 115C further compresses the depth image according to the two-dimensional image compression scheme and distributes the compressed depth image in the distribution. The depth image compressed according to the two-dimensional image compression scheme is decoded by video display terminal 117C.

Thus, in the distribution of the three-dimensional model, data can be compressed according to the two-dimensional image compression scheme. This eliminates the need for constructing another compression scheme for three-dimensional models, thereby easily reducing the amount of data.

For example, in the generation of the depth image, three-dimensional space reconstructing device 115C generates a plurality of depth images from different viewpoints from the three-dimensional model. In the compression, three-dimensional space reconstructing device 115C compresses the depth images according to the relationship between the depth images.

In the reception, video display terminal 117C receives the depth images. In the decoding, video display terminal 117C decodes the depth images according to the relationship between the depth images.

This can further reduce the amount of data of the depth images according to, for example, the multi-view encoding mode in the two-dimensional image compression scheme.

For example, three-dimensional space reconstructing device 115C further generates a three-dimensional model by using a plurality of images captured by imaging devices 121 and distributes the images to video display terminal 117C. The viewpoint of the depth image is the viewpoint of one of the images.

Video display terminal 117C receives the images and generates a rendering image by using the three-dimensional model and the images. The viewpoint of the depth image is the viewpoint of one of the images.

In this way, the viewpoint of the depth image is matched with the viewpoint of the captured image, allowing three-dimensional space reconstructing device 115C to calculate parallax information between the captured images by using the depth image and generate a predicted image between the viewpoints by using the parallax information if the captured images are compressed by multi-view encoding. This can reduce the code amount of the captured image.

For example, three-dimensional space reconstructing device 115C further determines the bit length of each pixel included in the depth image and distributes information on the bit length.

Video display terminal 117C then receives the information on the bit length of each pixel included in the depth image.

This can switch bit lengths according to the subject or the purpose of use, thereby properly reducing the amount of data.

For example, three-dimensional space reconstructing device 115C determines the bit length according to a distance to a subject.

For example, three-dimensional space reconstructing device 115C further determines the relationship between a pixel value expressed by the depth image and a distance and distributes information on the determined relationship to video display terminal 117C.

Video display terminal 117C further receives the information on the relationship between a pixel value expressed by the depth image and a distance.

This can change the relationship between a pixel value and a distance according to the subject or the purpose of use, thereby improving the accuracy of the restored three-dimensional model.

For example, the three-dimensional model includes a first model (e.g., a foreground model) and a second model (e.g., a background model) that makes a smaller change per unit time than the first model. The depth image includes the first depth image and the second depth image. In the generation of the depth image, three-dimensional space reconstructing device 115C generates the first depth image from the first model and the second depth image from the second model. In the determination of the relationship, three-dimensional space reconstructing device 115C determines a first relationship between a pixel value expressed by the first depth image and a distance and a second relationship between a pixel value expressed by the second depth image and a distance. In the first relationship, a distance resolution in a first distance range (short distance region) is higher than a distance resolution in a second distance range (long distance region) that is more remote than the first distance range (FIG. 23B). In the second relationship, a distance resolution in the first distance range (short distance region) is lower than a distance resolution in the second distance range (long distance region) (FIG. 23C).

For example, color information is added to the three-dimensional model. Three-dimensional space reconstructing device 115C further generates a texture image from the three-dimensional model, compresses the texture image according to the two-dimensional image compression scheme, and distributes the compressed texture image in the distribution.

Video display terminal 117C further receives the compressed texture image according to the two-dimensional image compression scheme, decodes the compressed texture image, and restores the three-dimensional model with the added color information by using the decoded depth image and the decoded texture image in the restoration.

Embodiment 7

In the present embodiment, a three-dimensional encoding device and a three-dimensional encoding method for encoding three-dimensional data, and a three-dimensional decoding device and a three-dimensional decoding method for decoding encoded data into three-dimensional data will be described.

Figure 24:
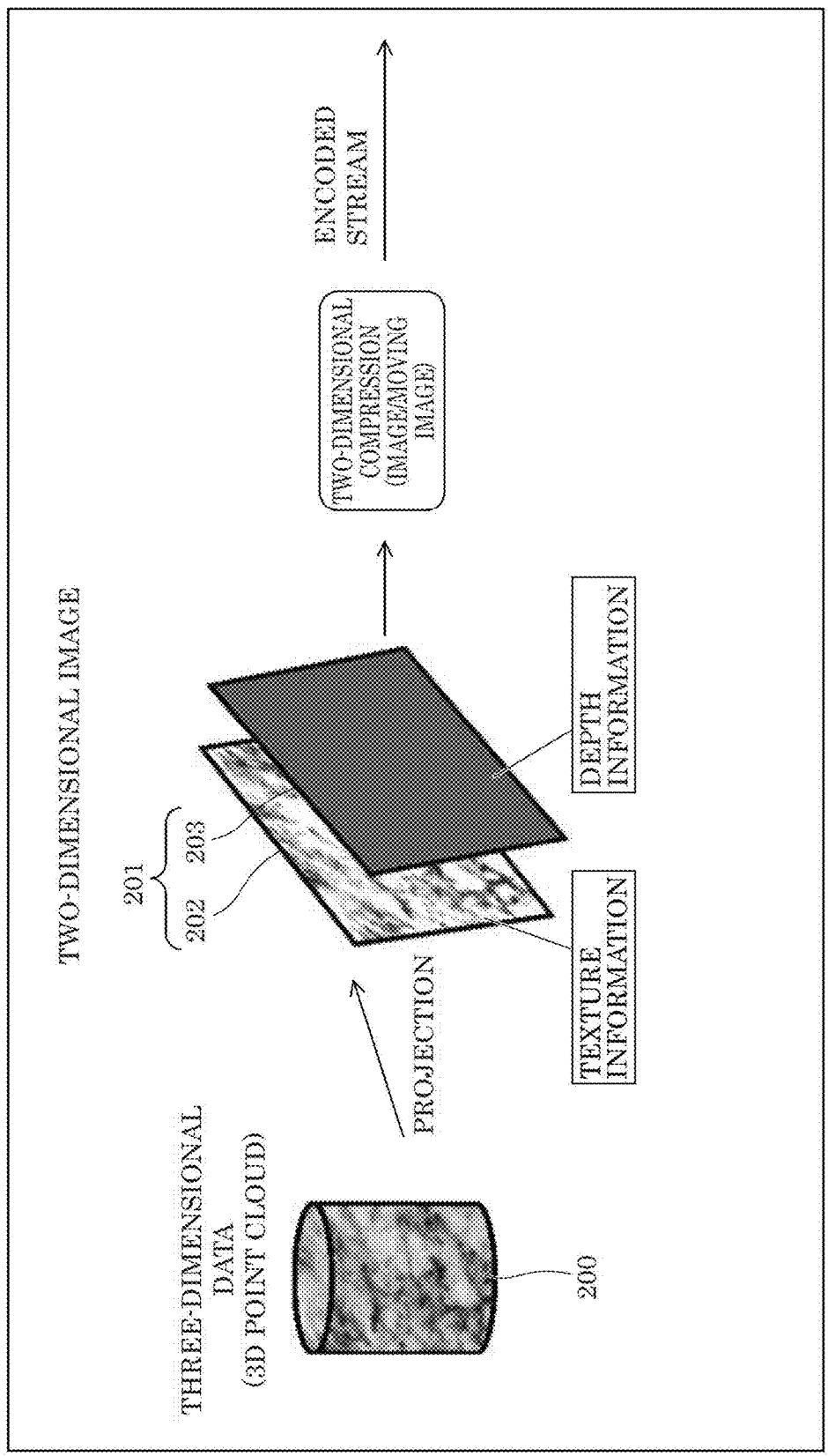
FIG. 24 is a diagram showing an outline of a three-dimensional data encoding method for encoding three-dimensional data according to Embodiment 7.

FIG. 24 is a diagram showing an outline of the three-dimensional data encoding method for encoding three-dimensional data.

In the three-dimensional encoding method for encoding three-dimensional data 200 such as a three-dimensional point group (three-dimensional point cloud or three-dimensional model), two-dimensional compression such as image encoding or moving image encoding is applied to two-dimensional image 201 obtained by projecting three-dimensional data 200 to a two-dimensional plane. Two-dimensional image 201 obtained through projection includes texture information 202 indicating a texture or a color, and depth information (distance information) 203 indicating a distance up to the three-dimensional point group along a projection direction.

Such a two-dimensional image obtained through the projection possibly includes a hole area in which there is no texture information or depth information, due to an occlusion area. The hole area indicates a pixel to which the three-dimensional data has not been projected or a set of pixels to which the three-dimensional data has not been projected, from among a plurality of pixels forming the two-dimensional image obtained by projecting the three-dimensional data to a two-dimensional plane. Such a hole area is caused by, for example, a discontinuity or a sharp edge in the two-dimensional image obtained through the projection. Since a high spatial frequency component increases in a two-dimensional image including such a discontinuity, sharp edge, or the like, a bit rate for encoding also increases. Accordingly, it is desirable to limit sharp edges around the hole area to a minimum in order to improve encoding efficiency.

For example, it is conceivable to perform correction by changing a pixel value of the hole area so that sharp edges do not occur around the hole area. A correction by changing the pixel value of the hole area will be described next.

Figure 25A:
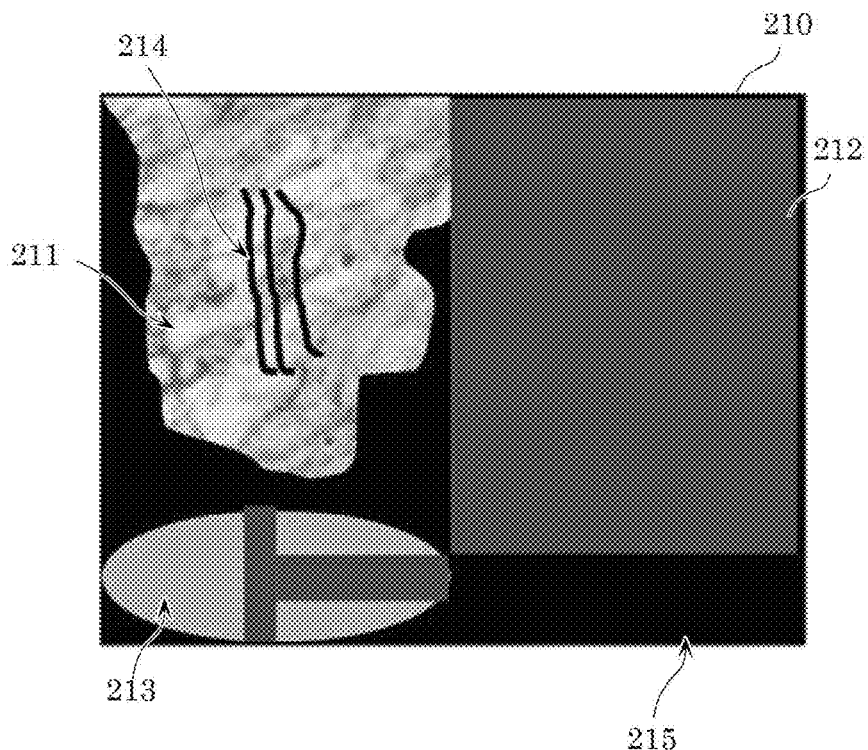
FIG. 25A is a diagram showing an example of a two-dimensional image including a hole area according to Embodiment 7.
Figure 25B:
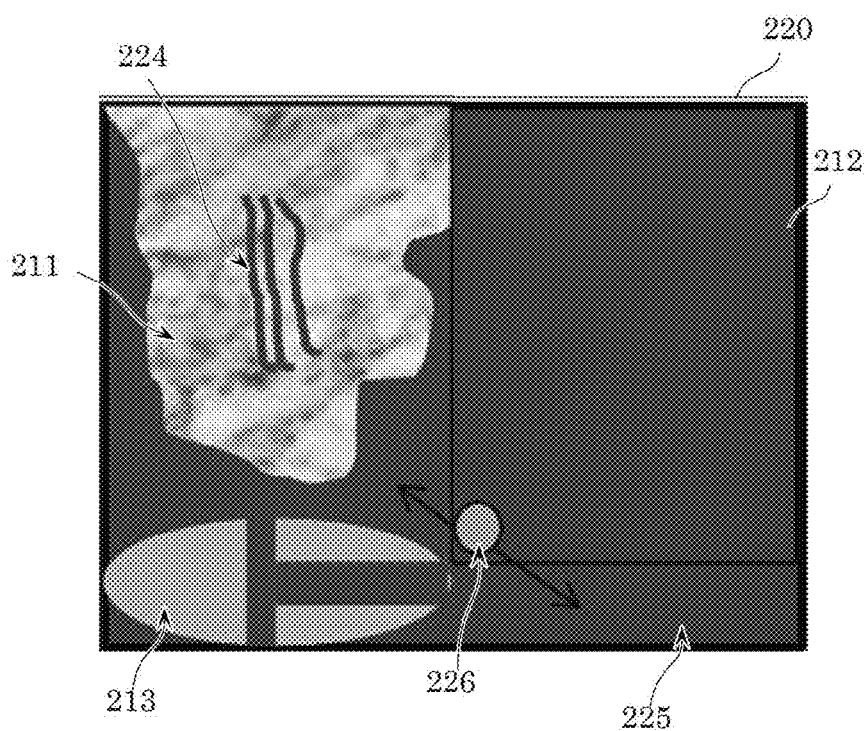
FIG. 25B is a diagram showing an example of a corrected image in which the hole area has been corrected according to Embodiment 7.

FIG. 25A is a diagram showing an example of a two-dimensional image including hole areas. FIG. 25B is a diagram showing an example of a corrected image in which the hole areas have been corrected.

Two-dimensional image 210 shown in FIG. 25A is obtained by projecting three-dimensional data to a predetermined two-dimensional plane. Two-dimensional image 210 includes hole areas 214 and 215 that are inactive areas to which the three-dimensional data is not projected. Two-dimensional image 210 also includes texture areas 211, 212, and 213 that are active areas to which the three-dimensional data is projected.

As stated above, it is desirable to appropriately fill hole areas 214 and 215 using a different pixel value in order to improve encoding efficiency of such a two-dimensional image 210. For example, it is desirable to limit discontinuities in a texture (or depth) between hole areas 214 and 215 and texture areas 211, 212, and 213 to a minimum in order to improve encoding efficiency. In a three-dimensional model encoding method according to an aspect of the present disclosure, a correction is performed in which a difference between hole areas 214 and 215 and texture areas 211, 212, and 213 is reduced, and sharp edges of these areas 211-215 are reduced, by interpolating hole areas 214 and 215 using a pixel value of a pixel of texture regions 211-213. It is possible to use, for example, at least one of linear interpolation and non-linear interpolation for the correction of hole areas 214 and 215.

A one-dimensional filter or a two-dimensional filter may be used as the linear interpolation and non-linear interpolation for such a correction.

In the correction, hole areas 214 and 215 may be interpolated by assigning (changing) a pixel value (first pixel value) at a boundary between one of texture areas 211-213 in two-dimensional image 210 and hole areas 214 and 215 to a pixel value of each pixel of hole areas 214 and 215. In this manner, in the correction, one or more pixels forming the inactive area are corrected. In the correction, the inactive area may be corrected using a first pixel value of a first pixel in a first active area that is one active area, the first active area being adjacent to the inactive area. In the correction, in the two-dimensional image, the inactive area may be further corrected using a second pixel value of a second pixel in a second active area that is an active area opposite to the first active area, the inactive area being interposed between the first active area and the second active area. For example, the first pixel may be in the first active area and adjacent to the inactive area. Similarly, the second pixel may be in the second active area and adjacent to the inactive area.

With this, as illustrated in FIG. 25B, two-dimensional image 220 is generated including hole areas 224 and 225 whose pixel values have been changed to a pixel value of a pixel in texture areas 211-213 (e.g. pixel 226). Two-dimensional image 220 is an example of the corrected image.

The pixel value to be assigned to hole areas 214 and 215 may be a pixel value of a pixel in a texture area, among texture areas 211-213, including the most pixels directly adjacent to hole areas 214 and 215. For example, when the hole area is surrounded by a plurality of texture areas, pixel values of a plurality of pixels forming the hole area may be replaced with pixel values of pixels in a texture region associated with the longest boundary line among boundary lines associated with each of the plurality of texture areas. Note that one is not limited to using the pixel values of the pixels in the texture area adjacent to the hole area for interpolating the hole area as-is, and an average value or an intermediate value of the pixel values of the plurality of pixels in the texture area and directly adjacent to the hole area may also be used.

The present embodiment is not limited to the means shown above and any other method may be used, as long as it is possible to set the value of the hole area to be close to the value of the texture area. For example, the average value or the intermediate value of all pixel values of the plurality of pixels forming the texture region may be the pixel values of the plurality of pixels forming the hole area.

Figure 26A:
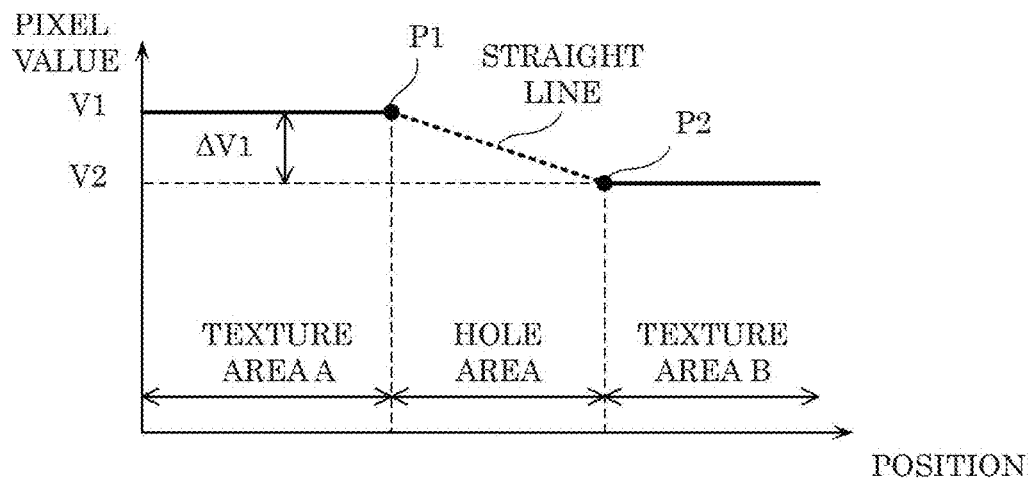
FIG. 26A is a diagram showing an example correction of the hole area through linear interpolation according to Embodiment 7.
Figure 26B:
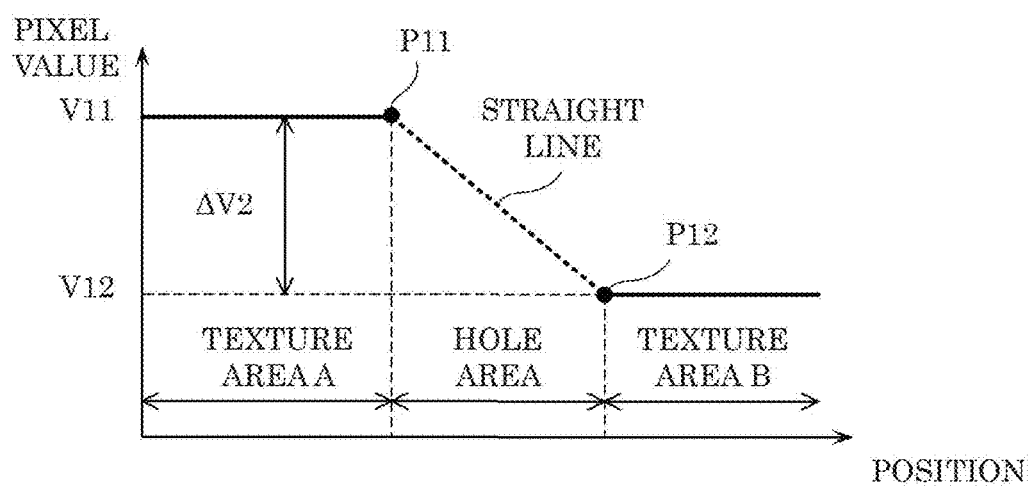
FIG. 26B is a diagram showing an example correction of the hole area through linear interpolation according to Embodiment 7.

FIG. 26A and FIG. 26B are diagrams showing example corrections of the hole area through linear interpolation. In FIG. 26A and FIG. 26B, the vertical axis indicates pixel value and the horizontal axis indicates pixel position. FIG. 26A and FIG. 26B show one-dimensional examples, but may also be applied two-dimensionally. The pixel value is, for example, a brightness value, a color difference value, an RGB value, a depth value, etc.

Linear interpolation is one of correction methods in which an inactive area is corrected using a first pixel value and a second pixel of respectively two texture areas A and B adjacent to a hole area. The hole area here is an example of the inactive area, texture area A is an example of a first active area, and texture area B is an example of a second active area.

In the correction through linear interpolation, using first pixel value V1 of first pixel P1 in texture area A and second pixel value V2 of second pixel P2 in texture area B, the hole area is corrected by changing a pixel value of each of a plurality of pixels spanning the hole area from first pixel P1 to second pixel P2 to a pixel value that satisfies a relationship in which the pixel value is changed linearly from first pixel value V1 to second pixel value V2, the relationship being between a position and the pixel value of each of the plurality of pixels. In other words, in the correction through linear interpolation, when connecting, with a straight line, a first point indicated by a position of first pixel P1 and first pixel value V1, and a second point indicated by a position of second pixel P2 and second pixel value V2, a plurality of pixel values associated with the plurality of pixels forming the hole area between texture area A and texture area B are changed to pixel values specified by the points on the straight line associated with the position of each of the plurality of pixels.

Figure 27A:
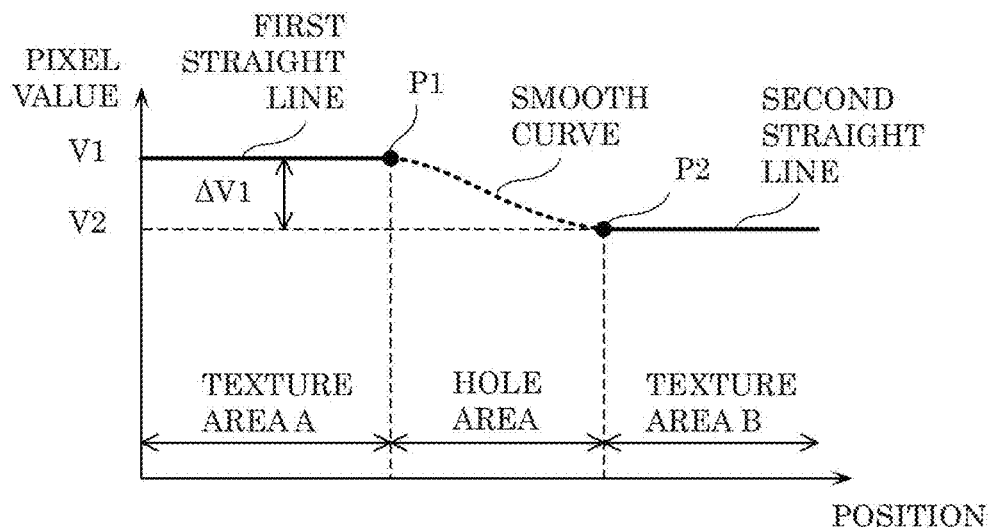
FIG. 27A is a diagram showing an example correction of the hole area through non-linear interpolation according to Embodiment 7.
Figure 27B:
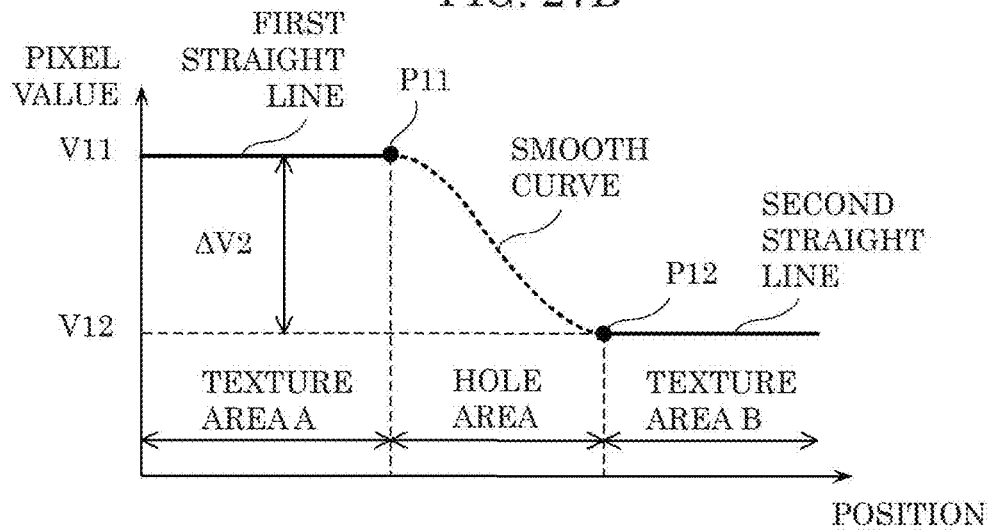
FIG. 27B is a diagram showing an example correction of the hole area through non-linear interpolation according to Embodiment 7.

Note that in the correction through linear interpolation, as illustrated in FIG. 26B, when difference ΔV2 between first pixel value V11 of first pixel P11 and second pixel value V12 of second pixel P12 is greater than a predetermined value, there are cases where encoding efficiency does not improve that much even when replacing the hole area with first pixel value V11 and second pixel value V12, since there is a discontinuity between texture areas A and B, and the hole area, and a surrounding area of the hole area includes a high spatial frequency component. As such, correction may be performed through, for example, a non-linear interpolation as shown in FIG. 27A and FIG. 27B. This makes it possible to reduce discontinuities between texture areas A and B, and the hole area.

FIG. 27A and FIG. 27B are diagrams showing example corrections of the hole area through non-linear interpolation. In FIG. 27A and FIG. 27B, the vertical axis indicates pixel value and the horizontal axis indicates pixel position. FIG. 27A and FIG. 27B show one-dimensional examples, but may also be applied two-dimensionally.

In the correction through non-linear interpolation, using first pixel value V1 of first pixel P1 in texture area A and second pixel value V2 of second pixel P2 in texture area B, the hole area is corrected by changing a pixel value of each of a plurality of pixels spanning the hole area from first pixel P1 to second pixel P2 to a pixel value that satisfies a relationship in which the pixel value is changed using a smooth curve from first pixel value V1 to second pixel value V2, the relationship being between a position and the pixel value of each of the plurality of pixels. The smooth curve here is a curve that is smoothly connected to (i) a first straight line, which indicates that the pixel value in a position of texture area A is first pixel value V1, at a position of first pixel P1, and (ii) a second straight line, which indicates that the pixel value in a position of texture area B is first pixel value V2, at a position of second pixel P2. For example, the smooth curve is a curve that has two inflection points and whose pixel value monotonically changes from first pixel value V1 to second pixel value V2, in accordance with a position of the pixel. For example, as illustrated in FIG. 27A, when first pixel value V1 is greater than second pixel value V2, the smooth curve is a curve whose pixel value monotonically decreases from first pixel value V1 to second pixel value V2, in accordance with the position of the pixel.

In the correction through non-linear interpolation, as illustrated in FIG. 27B, it is possible to effectively reduce discontinuities between texture areas A and B, and the hole area, even when difference ΔV2 between first pixel value V11 of first pixel P11 and second pixel value V12 of second pixel P12 is greater than the predetermined value, since the pixel values of the plurality of pixels forming the hole area are replaced with the pixel values associated with the smooth curve, as is also the case with the texture areas A and B, and the hole area corresponding to FIG. 26B. As such, it is possible to improve encoding efficiency.

The present embodiment is not limited to the above correction methods described with reference to FIGS. 26A-27B, and correction may be performed using other correction methods.

FIGS. 28A-28F are diagrams showing other example corrections.

Figure 28A:
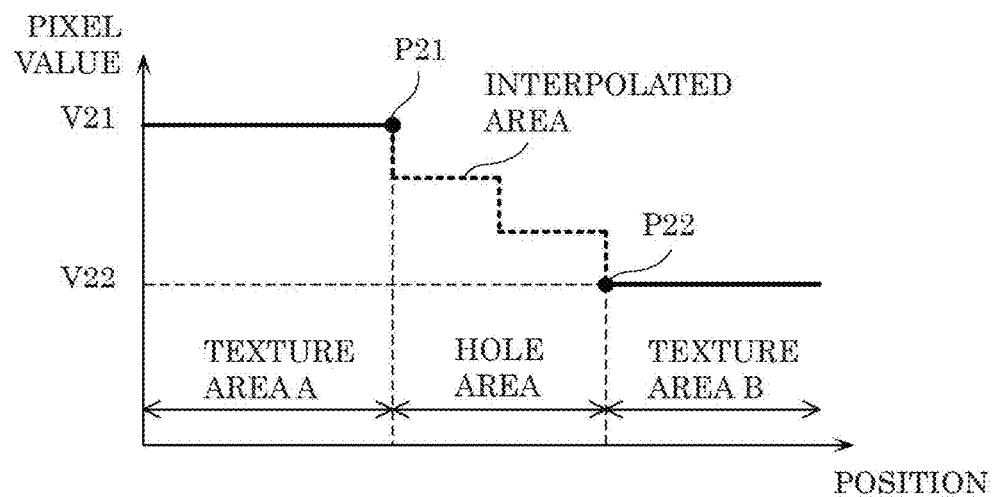
FIG. 28A is a diagram showing another example correction according to Embodiment 7.

As in the correction shown in FIG. 28A, the hole area may be corrected by replacing the plurality of pixel values associated with the plurality of pixels forming the hole area between texture area A and texture area B with pixel values incrementally changed from first pixel value V21 of first pixel P21 of texture area A to second pixel value V22 of second pixel P22 of texture area B.

Figure 28B:
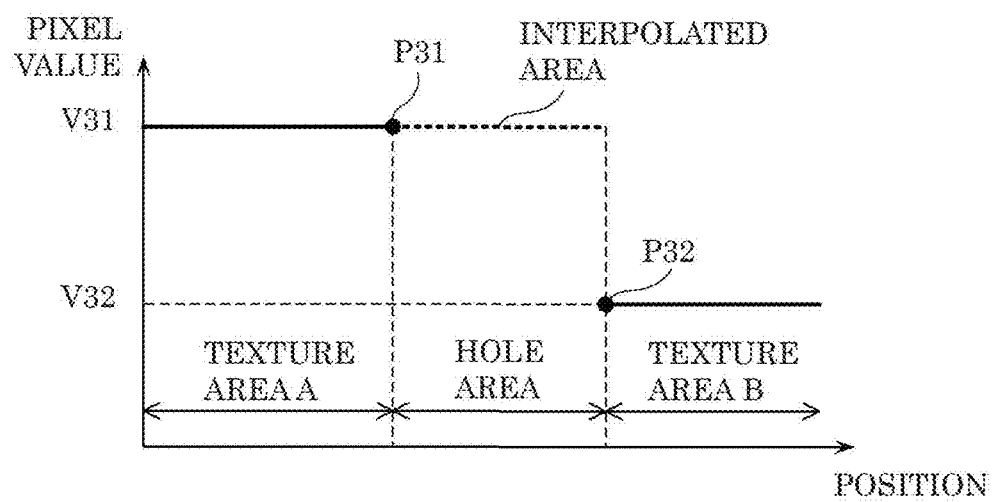
FIG. 28B is a diagram showing another example correction according to Embodiment 7.

As in the correction shown in FIG. 28B, the hole area may be corrected by replacing the plurality of pixel values associated with the plurality of pixels forming the hole area between texture area A and texture area B with pixel values at a boundary between texture area A or texture area B and the hole area. With this, all of the plurality of pixel values forming the hole area are matched with the pixel value of the pixel in texture area A or texture area B. In this correction, the hole area is corrected by, for example, replacing all pixel values of the plurality of pixels forming the hole area with first pixel value V31 of first pixel P31 at the boundary between texture area A and the hole area.

Figure 28C:
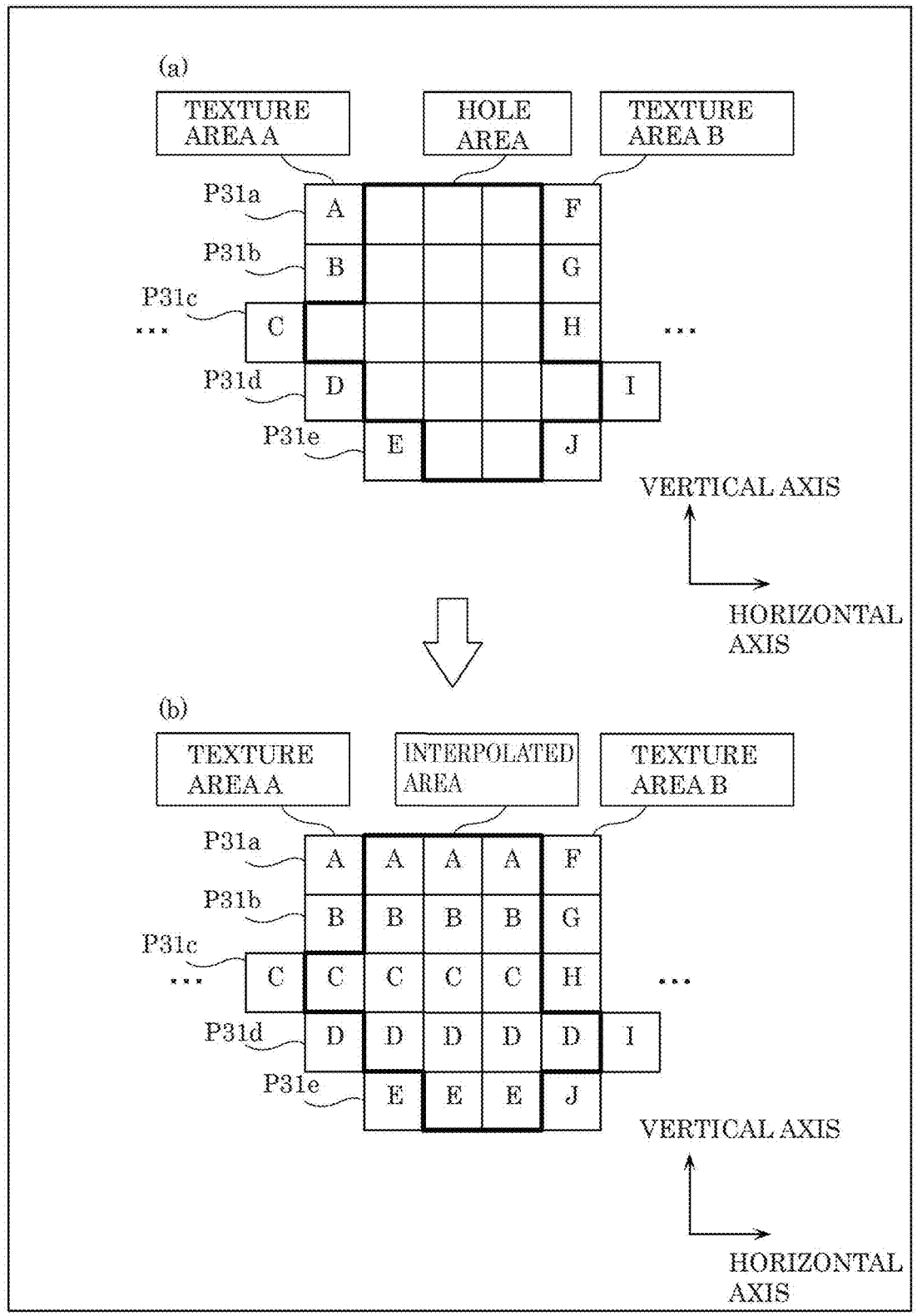
FIG. 28C is a diagram showing an example of the correction in FIG. 28B represented as a two-dimensional image according to embodiment 7.

FIG. 28C is a diagram showing an example of the correction in FIG. 28B represented as a two-dimensional image. As illustrated in (a) of FIG. 28C, when first pixels P31a-P31e at the boundary between texture area A and the hole area respectively have pixel values A-E, each pixel of the hole area is corrected by assigning the first pixel value of the first pixel in a position having the same vertical axis value as the pixel being corrected, as illustrated in (b) of FIG. 28C. In other words, in the correction, pixel value A of first pixel P31a is assigned to pixels of the hole area in positions having the same horizontal axis value as first pixel P31a. Similarly, in the correction, pixel values B-E of first pixels P31b-P31e are each assigned to pixels of the hole area in positions respectively having the same horizontal axis value as first pixels P31b-P31e.

Note that in FIG. 28C, the vertical axis may be read as the horizontal axis, and the horizontal axis as the vertical axis. In other words, as illustrated in (b) of FIG. 28C, each pixel of the hole area is corrected by assigning the first pixel value of the first pixel in a position having the same first axis value. In other words, in the correction, the pixel value of the first pixel is assigned to pixels of the hole area in positions having the same second axis value, the second axis being orthogonal to the first axis.

In the methods of FIGS. 26A-27B, 28A, and FIGS. 28D-28F, too, each pixel of the hole area is corrected by assigning a pixel value calculated in each method using the first pixel value of the first pixel as reference, the first pixel being in a position having the same vertical axis value.

Figure 28D:
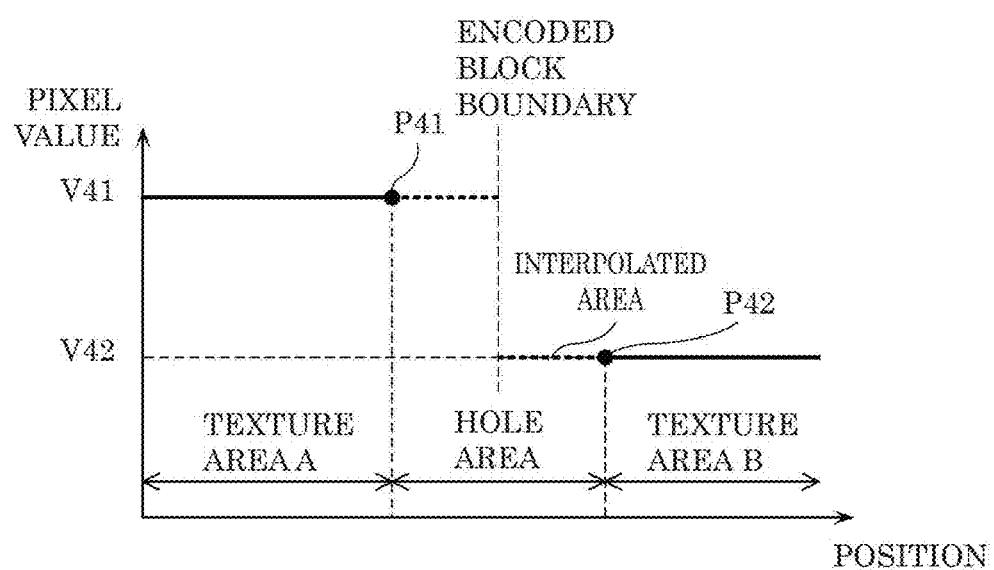
FIG. 28D is a diagram showing another example correction according to Embodiment 7.

As in the correction shown in FIG. 28D, when a boundary between the blocks in the two-dimensional encoding is in the hole area, an area in the hole area between the boundary of the encoded block and texture area A is corrected using a pixel value at a boundary between texture area A and the hole area. In other words, in this correction, a pixel value of each of a plurality of first inactive pixels from first pixel P41 to the boundary is changed to first pixel value V41. An area in the hole area between the boundary of the encoded block and texture area B is corrected using a pixel value at a boundary between texture area B and the hole area. In other words, in this correction, a pixel value of each of a plurality of second inactive pixels from second pixel P42 to the boundary is changed to second pixel value V42. The hole area may be corrected in this manner. The encoded block here is, for example, a macroblock when the encoding method is H.264, and a coding tree unit (CTU) or coding unit (CU) when the encoding method is H.265.

Figure 28E:
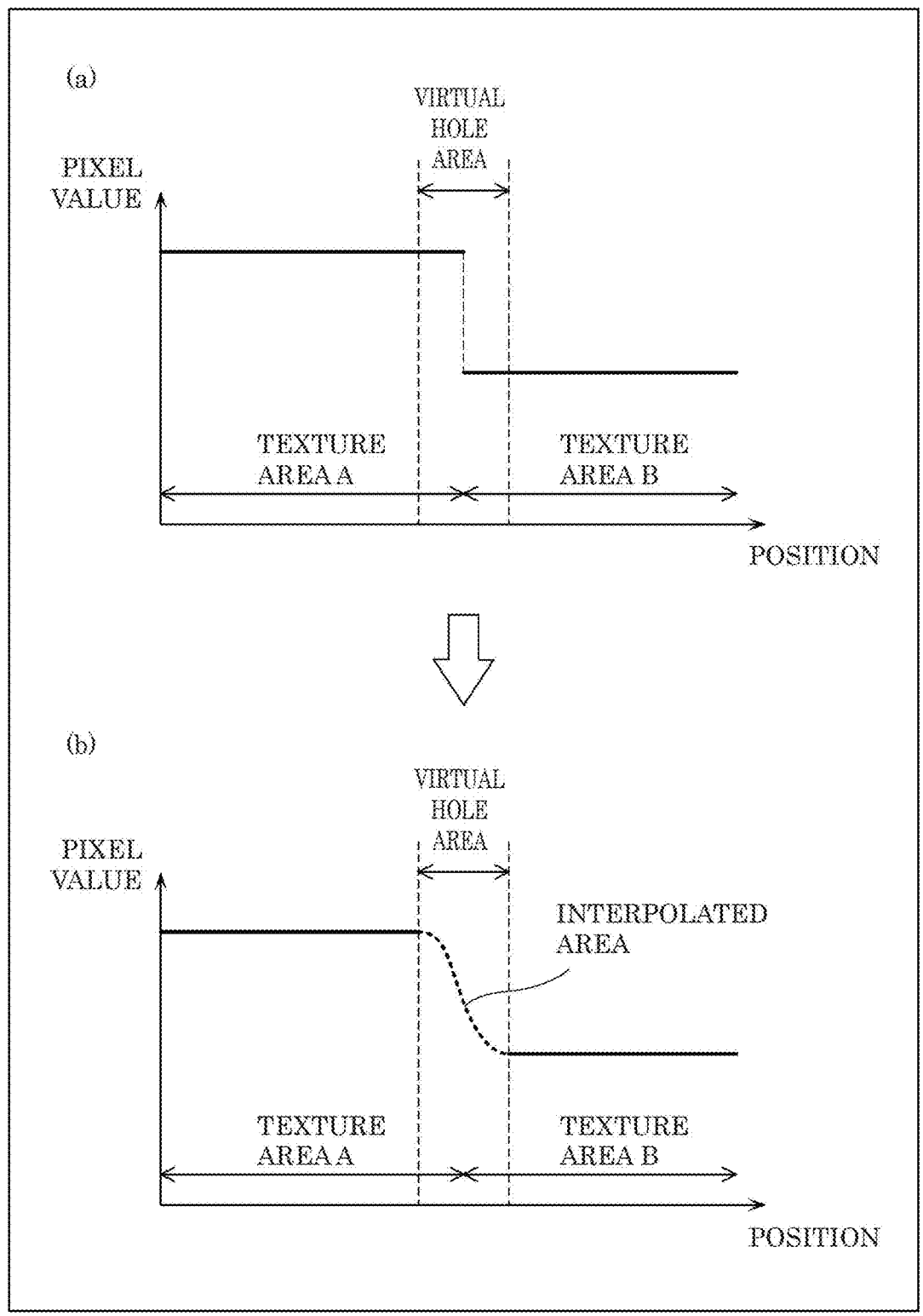
FIG. 28E is a diagram showing another example correction according to Embodiment 7.

As illustrated in (a) of FIG. 28E, when there is no hole area between texture area A and texture area B, and the difference between the pixel values of texture area A and texture area B is greater than the predetermined value, a virtual hole area may be assumed to exist at the border between texture area A and texture area B, and the virtual hole area may be corrected using the methods in FIGS. 26A-28D. For example, (b) of FIG. 28E is an example in which correction through non-linear interpolation as described in FIG. 27A and FIG. 27B has been applied. This makes it possible to reduce sharp edges between texture areas A and B, and to effectively reduce a code amount, by performing the above correction, when there is a sharp edge present between texture area A and texture area B, even when there is no hole area.

FIG. 28F is an example of correcting an edge using a different method, in a case similar to (a) of FIG. 28E.

(a) of FIG. 28F is a diagram similar to (a) of FIG. 28E. In this manner, as illustrated in (a) of FIG. 28F, when there is no hole area between texture area A and texture area B, and the difference between the pixel values of texture area A and texture area B is greater than the predetermined value, a virtual hole area may be generated by causing texture area B to shift away from texture area A, and the generated virtual hole area may be corrected using the methods in FIGS. 26A-28D. For example, (b) of FIG. 28F is an example in which correction through non-linear interpolation as described in FIG. 27A and FIG. 27B has been applied. Similar to the case in FIG. 28E, this makes it possible to reduce sharp edges between texture areas A and B, and to effectively reduce a code amount, by performing the above correction, when there is a sharp edge present between texture area A and texture area B, even when there is no hole area.

Note that in the correction, a smoothing filter such as a Gaussian filter, a median filter, or the like may be applied to the two-dimensional image obtained through projection of the three-dimensional model regardless of texture areas or hole areas, texture areas may then be reassigned to the filtered image, and values of the texture areas may approach values of the hole areas.

With this, it is no longer necessary to identify filtered images, making it possible to correct values of hole areas using a low processing amount.

In the shifting process of the texture area during the correction of FIG. 28F, a hole area may be generated by horizontally and vertically moving each of a plurality of texture areas in units of pixels in a two-dimensional image, after creating the two-dimensional image obtained through projection. It may also be possible to generate a hole area between a plurality of texture areas during the process of projecting a three-dimensional point group to a two-dimensional plane and generating a two-dimensional image.

Figure 29:
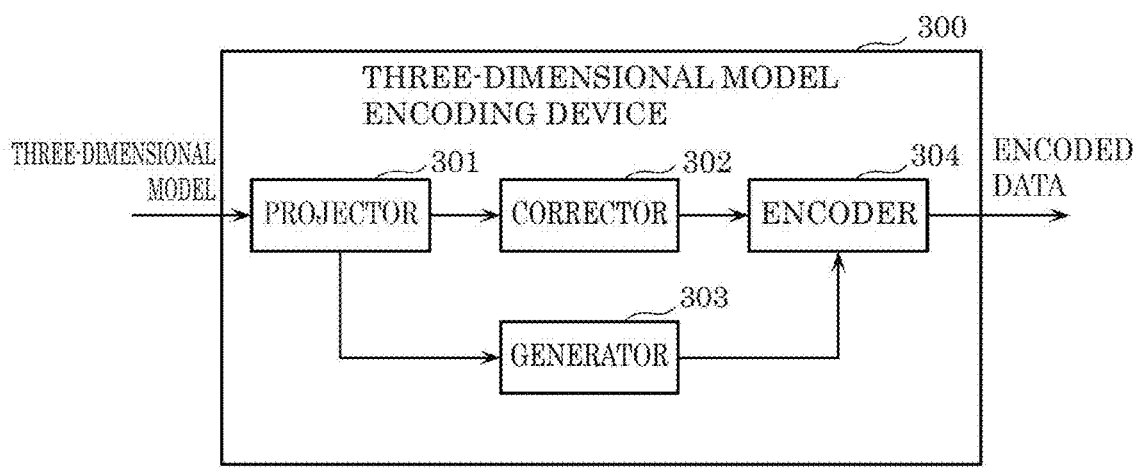
FIG. 29 is a block diagram showing an example of a functionality structure of a three-dimensional model encoding device according to an embodiment according to Embodiment 7.
Figure 30:
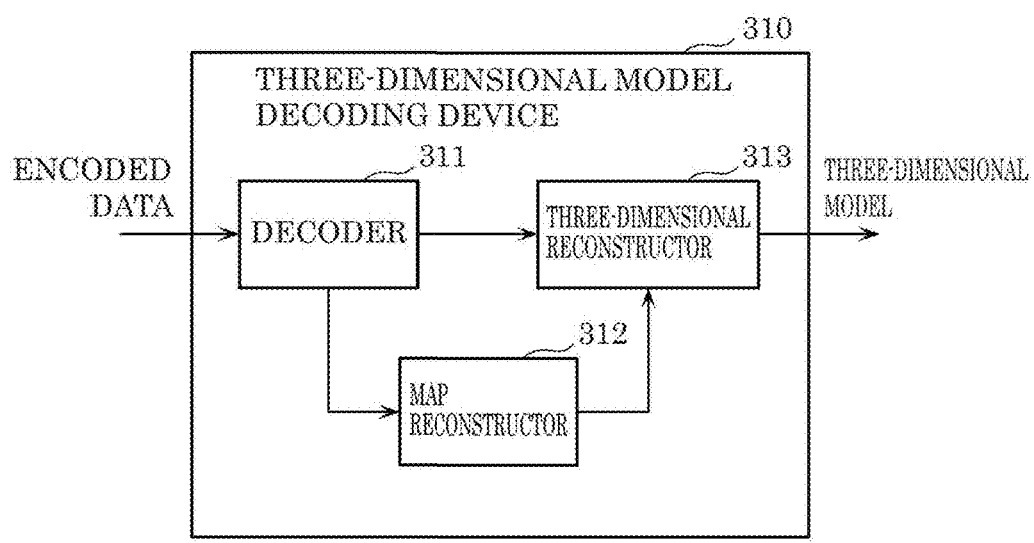
FIG. 30 is a block diagram showing an example of a functionality structure of a three-dimensional model decoding device according to the embodiment according to Embodiment 7.
Figure 31:
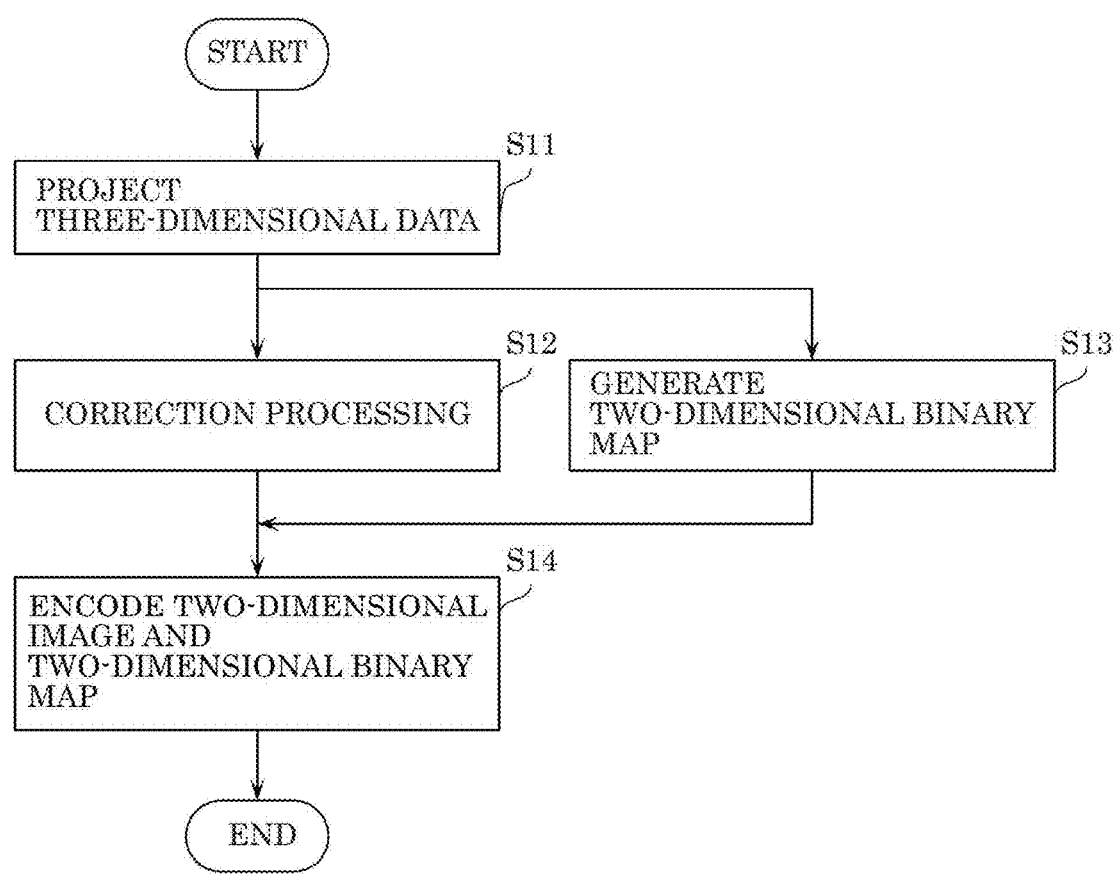
FIG. 31 is a flowchart of an example of a three-dimensional model encoding method performed by the three-dimensional model encoding device according to the embodiment according to Embodiment 7.
Figure 32:
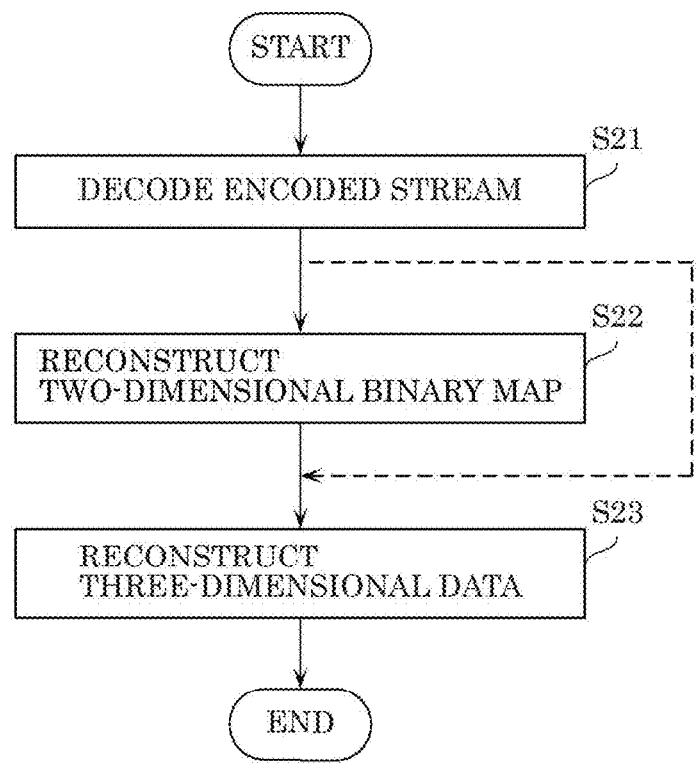
FIG. 32 is a flowchart of an example of a three-dimensional model decoding method performed by the three-dimensional model decoding device according to the embodiment according to Embodiment 7.

FIG. 29 is a block diagram showing an example of a functionality structure of a three-dimensional model encoding device according to the embodiment. FIG. 30 is a block diagram showing an example of a functionality structure of a three-dimensional model decoding device according to the embodiment. FIG. 31 is a flowchart of an example of a three-dimensional model encoding method performed by the three-dimensional model encoding device according to the embodiment. FIG. 32 is a flowchart of an example of a three-dimensional model decoding method performed by the three-dimensional model decoding device according to the embodiment.

Three-dimensional model encoding device 300 and the three-dimensional model encoding method will be described with reference to FIG. 29 and FIG. 31.

Three-dimensional model encoding device 300 includes projector 301, corrector 302, and encoder 304. Three-dimensional model encoding device 300 may further include generator 303.

Projector 301 first generates a two-dimensional image by projecting a three-dimensional model to at least one two-dimensional plane (S11). The generated two-dimensional image includes texture information and depth information.

Corrector 302 generates, using the two-dimensional image, a corrected image by correcting one or more pixels forming an inactive area (i.e., hole area) to which the three-dimensional model is not projected, the inactive area being included in the two-dimensional image (S12). Corrector 302 performs any of the above corrections described in FIGS. 25A-28F as the correction.

On the other hand, generator 303 generates a two-dimensional binary map indicating whether each of a plurality of areas forming a two-dimensional area associated with the two-dimensional image is the inactive area or the active area (S13). The two-dimensional binary map enables three-dimensional model decoding device 310, which has received encoded data, to readily discern inactive areas and active areas in the two-dimensional image.

Encoder 304 generates a bitstream as the encoded data by performing two-dimensional encoding on the corrected image (S14). Encoder 304 may generate the encoded data by encoding the corrected image and the two-dimensional binary map. Encoder 304 may generate encoded data by encoding projection information and parameters relating to the projection when the two-dimensional image is generated.

Note that each of projector 301, corrector 302, and encoder 304 may be implemented through a processor and memory, and may also be implemented through a dedicated circuit. In other words, these processors may be implemented through software and may be implemented through hardware.

Three-dimensional model decoding device 310 and the three-dimensional model decoding method will be described next with reference to FIG. 30 and FIG. 32.

Three-dimensional model decoding device 310 includes decoder 311, map reconstructor 312, and three-dimensional reconstructor 313.

Decoder 311 first obtains the encoded data, and obtains the corrected image and the two-dimensional binary map by decoding the obtained encoded data (S21). The encoded data is outputted by three-dimensional model encoding device 300. In other words, the encoded data is encoded data into which a corrected image has been encoded, the corrected image being (i) a two-dimensional image that is generated by projecting a three-dimensional model to at least one two-dimensional plane and has been corrected, and (ii) an image in which one or more pixels in an inactive area to which the three-dimensional model is not projected have been corrected, the inactive area being included in the two-dimensional image.

Map reconstructor 312 obtains an original map indicating active pixels and inactive pixels, by reconstructing the decoded two-dimensional binary map (S22).

Three-dimensional reconstructor 313 reconstructs the three-dimensional data from the corrected image using the projection information and the reconstructed two-dimensional binary map (S23). Note that three-dimensional reconstructor 313 obtains three-dimensional points by reprojecting the three-dimensional model in a three-dimensional space using the decoded depth information, and obtains a color of the three-dimensional points using the decoded texture information. As such, three-dimensional reconstructor 313 does not reproject the inactive pixels of the inactive area indicated in the two-dimensional binary map. The depth information is a distance image indicating a distance corresponding to each pixel of the two-dimensional image. The texture information is a two-dimensional color image indicating a texture or color corresponding to each pixel of the two-dimensional image. In this manner, since three-dimensional reconstructor 313 reconstructs the three-dimensional points using the active areas in the corrected image, the pixels in the active areas in the corrected image are not affected, in the decoder, by the pixels of the inactive areas in the corrected image.

Note that in the three-dimensional model decoding method, the process of step S22 performed by map reconstructor 312 does not necessarily need to be performed. In other words, three-dimensional model decoding device 310 does not need to include map reconstructor 312.

Note that each of decoder 311, map reconstructor 312, and three-dimensional reconstructor 313 may be implemented through a processor and memory, and may also be implemented through a dedicated circuit. In other words, these processors may be implemented through software and may be implemented through hardware.

In three-dimensional model encoding device 300 according to the present embodiment, it is possible to improve encoding efficiency, through two-dimensional encoding of the corrected image generated due to corrector 302 correcting the inactive area.

Corrector 302 corrects the inactive area using a first pixel value of a first pixel in a first active area that is an active area to which the three-dimensional model is projected, the first active area being adjacent to the inactive area. As such, it is possible to effectively improve encoding efficiency, since it is possible to reduce a difference between the first active area and the inactive area.

Corrector 302 may correct, in the two-dimensional image, the inactive area further using a second pixel value of a second pixel in a second active area that is an active area opposite to the first active area, the inactive area being interposed between the first active area and the second active area. As such, it is possible to effectively improve encoding efficiency, since it is possible to reduce a difference between the first active area and the second active area, and the inactive area.

Corrector 302 is capable of reducing a processing load required to determine the pixel value for interpolation, due to linear interpolation of the inactive area.

Corrector 302 is capable of effectively reducing processing load and improving encoding efficiency, by correcting the inactive area taking into consideration the boundary between the blocks in the two-dimensional encoding.

As such, corrector 302 is capable of effectively reducing a difference between the pixel values of the first active area and the second active area, and the inactive area, and effectively improving encoding efficiency, since the correction is performed through non-linear interpolation.

Three-dimensional model encoding device 300 generates the two-dimensional binary map, and outputs the encoded data obtained by encoding the two-dimensional binary map together with the corrected image. As such, it is possible to reduce a processing amount during decoding, since it possible to decode, among the active area and the inactive area, only the active area during the decoding performed by three-dimensional model decoding device 310, using the two-dimensional binary map.

This enables three-dimensional model decoding device 310 according to the present embodiment to reconstruct the three-dimensional model by obtaining a small amount of the encoded data.

Three-dimensional model encoding device 300 may append, to the encoded data, filter information (includes filter application ON/OFF information, filter type, filter coefficient, etc.) applied to the two-dimensional image (projected 2D image) generated by projecting the three-dimensional model to a two-dimensional plane. This enables three-dimensional model decoding device 310 to know the filter information on filters applied to the decoded two-dimensional image. These pieces of filter information are capable of being reused when re-encoding the three-dimensional model using one of the methods recited in the present embodiment, after three-dimensional model decoding device 310 has decoded the three-dimensional model.

In the present embodiment, three-dimensional model encoding device 300 appends the two-dimensional binary map to the encoded data and transmits the encoded data to three-dimensional model decoding device 310 in order to differentiate between the active area and the inactive area of the decoded two-dimensional image, but the two-dimensional binary map does not necessarily need to be appended to the encoded data. Three-dimensional model encoding device 300 may, for example, assign value A, which is not used in the texture area, to the hole area, instead of generating the two-dimensional binary map. This enables three-dimensional model decoding device 310 to determine, when each pixel value of the decoded two-dimensional image has value A, that the pixels are included in the hole area. Three-dimensional model decoding device 310 may determine that the pixels are inactive pixels in the inactive area, and not to reproject the pixels in the three-dimensional space. Value A may be a value of (0, 0, 0), (255, 255, 255), or the like in the case of an RGB color space. With this, it is no longer necessary to append the two-dimensional binary map to the encoded data, making it possible to reduce the code amount.

Embodiment 8

In the present embodiment, a description will be given of a three-dimensional data encoding device and a three-dimensional data encoding method that encode three-dimensional data, and a three-dimensional data decoding device and a three-dimensional data decoding method that decode encoded data that has been encoded to three-dimensional data.

Figure 33:
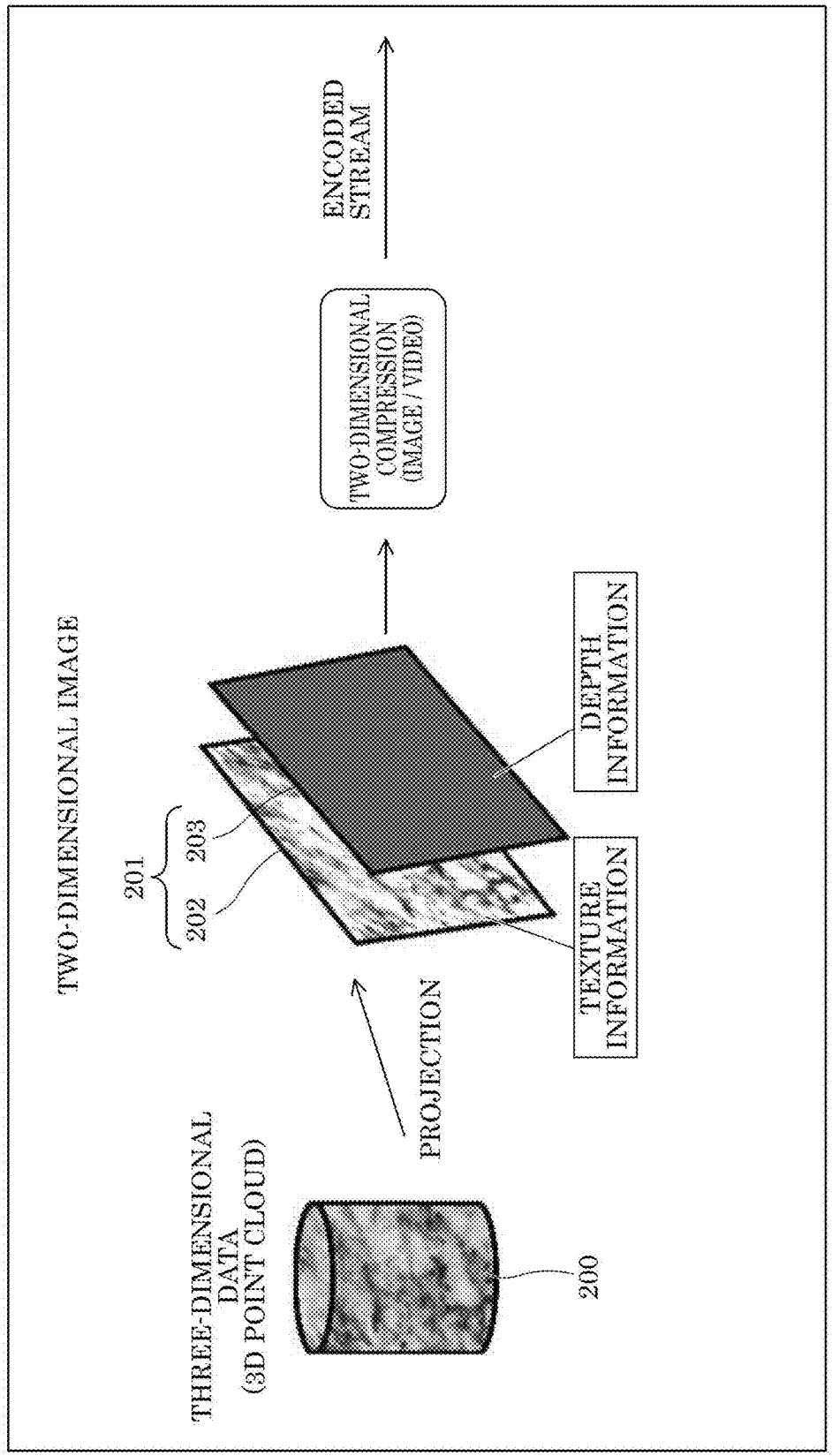
FIG. 33 is a diagram illustrating the outline of a three-dimensional data encoding method that encodes three-dimensional data according to Embodiment 8.

FIG. 33 is a diagram illustrating the outline of a three-dimensional data encoding method that encodes three-dimensional data.

In a three-dimensional data encoding method that encodes three-dimensional data 200, such as a three-dimensional point group (a three-dimensional point cloud or a three-dimensional model), two-dimensional compression, such as image encoding or video encoding, is applied to two-dimensional image 201 obtained by projecting three-dimensional data 200 on a two-dimensional plane. Texture information 202 indicating textures or colors, and depth information (distance information) 203 indicating the distance from a measurement position by a measurer, which is not illustrated, to a three-dimensional point cloud in a projection direction are included in two-dimensional image 201 obtained by projection.

Figure 34:
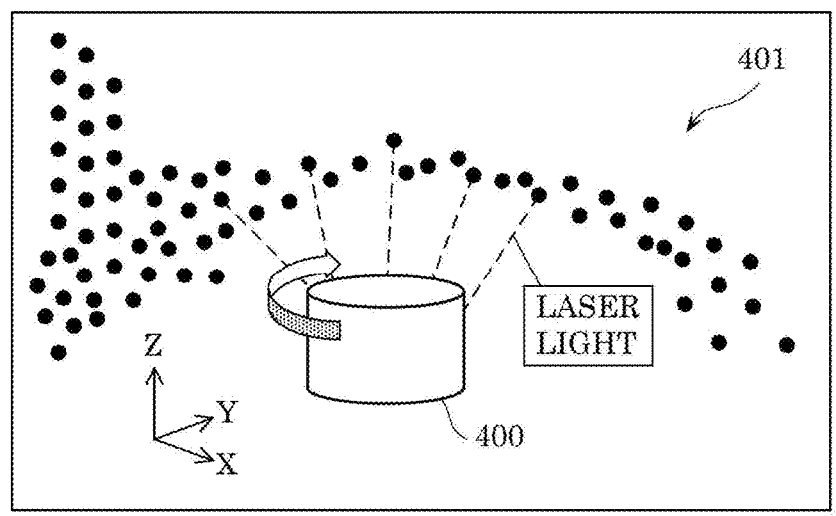
FIG. 34 is a diagram for describing the geometry information on a three-dimensional point cloud measured by a measurer according to Embodiment 8.

FIG. 34 is a diagram for describing the geometry information on a three-dimensional point cloud measured by the measurer.

Measurer 400 generates a three-dimensional point cloud represented by a plurality of three-dimensional positions on a measurement target by radially emitting an electromagnetic wave in a plurality of different directions, and obtaining the reflected wave reflected by an object (measurement target) in the periphery of measurer 400. Specifically, measurer 400 measures the time taken by the emitted electromagnetic wave to return to measurer 400 by being reflected by the measurement target after being emitted, and calculates the distance between measurer 400 and a point on the surface of the measurement target by using the measured time and the wavelength of the electromagnetic wave. Measurer 400 emits an electromagnetic wave in a plurality of radial directions defined in advance from a reference point of measurer 400. For example, measurer 400 emits an electromagnetic wave at a first angle interval around the horizontal direction, and emits an electromagnetic wave at a second angle interval around the vertical direction.

Therefore, measurer 400 can calculate the three-dimensional coordinates (three-dimensional orthogonal coordinates) of a plurality of points on the measurement target based on the detected detection and the direction in which the electromagnetic wave used for detection of the distance is emitted, by detecting the distance to the measurement target in each of the plurality of directions around measurer 400. Thus, measurer 400 can calculate the geometry information indicating a plurality of three-dimensional positions on the measurement target in the periphery of measurer 400, and can generate a three-dimensional model having the geometry information. Note that a three-dimensional position may be indicated by three-dimensional orthogonal coordinates in a three-dimensional space represented by three coordinate axes (X axis, Y axis, and Z axis) that orthogonally intersect with each other, or may be indicated by three-dimensional polar coordinates. Three-dimensional polar coordinates include the distance and direction before being converted into three-dimensional orthogonal coordinates.

In the present embodiment, measurer 400 is a three-dimensional laser measurer having a laser irradiator (not illustrated) that irradiates laser light as an electromagnetic wave, and a laser receiver (not illustrated) that receives the reflected light of the irradiated laser light that is reflected by the measurement target. Measurer 400 scans on the measurement target with the laser light by rotating or oscillating a unit including the laser irradiator and the laser receiver on two different axes, or by installing a movable mirror (Micro Electro Mechanical Systems (MEMS) mirror) that oscillates on two axes on the path of the laser light to be irradiated or received. Accordingly, measurer 400 can generate a highly accurate and highly dense three-dimensional model of the measurement target.

It is conceivable for a three-dimensional data encoding device to encode the geometry information on the three-dimensional point cloud obtained by measurer 400 with the following first method or second method.

Figure 35:
FIG. 35 is a diagram for describing an example of encoding the geometry information on a three-dimensional point cloud by using a first method according to Embodiment 8.

FIG. 35 is a diagram for describing an example of encoding the geometry information on a three-dimensional point cloud by using the first method.

In the first method, the three-dimensional data encoding device directly encodes the geometry information on the three-dimensional point cloud obtained by measurer 400. Specifically, the three-dimensional data encoding device generates a bitstream by encoding the three-dimensional coordinates of each three-dimensional point of the three-dimensional point cloud.

FIG. 36 and FIG. 37 are diagrams for describing examples of encoding a three-dimensional point cloud by using the second method.

In the second method, the three-dimensional data encoding device generates, from the three-dimensional point cloud obtained by measurer 400, a two-dimensional image in which each position of a plurality of three-dimensional points included in the three-dimensional point cloud is indicated, and generates a bitstream by encoding the generated two-dimensional image. The second method is a method of generating a two-dimensional image in which the distance from measurer 400 to a three-dimensional point cloud is indicated as a pixel value by projecting the three-dimensional point cloud onto a projecting plane, and encoding the generated two-dimensional image.

The geometry information obtained by measurer 400 includes the three-dimensional position that is the position in the three-dimensional space of the point at which the laser emitted by measurer 400 crosses an object to be measured. That is, since measurer 400 measures the three-dimensional position on the surface of the object to be measured that interrupts the laser, measurer 400 does not measure a position more distant from measurer 400 than the measured three-dimensional position. Therefore, the number of three-dimensional points measured with the laser emitted from measurer 400 in one specific direction is one. Accordingly, the three-dimensional data encoding device can project, onto projecting plane 410 virtually disposed in the periphery of measurer 400, each of a plurality of three-dimensional points included in the three-dimensional point cloud obtained by measurer 400, without overlapping. In the example of FIG. 36, projecting plane 410 is the side surface of a cylinder surrounding the periphery of measurer 400.

After spreading projecting plane 410 onto which the three-dimensional point cloud has been projected onto a two-dimensional plane, the three-dimensional data encoding device generates two-dimensional image 420 including a plurality of pixels corresponding to a plurality of positions on the two-dimensional plane onto which the three-dimensional point cloud has been projected, the plurality of pixels each having a pixel value indicating the distance from measurer 400 to each three-dimensional point. Then, the three-dimensional data encoding device generates a bitstream including the geometry information on the three-dimensional point cloud by encoding generated two-dimensional image 420. Accordingly, the three-dimensional data encoding device can efficiently encode a three-dimensional point cloud.

Figure 38:
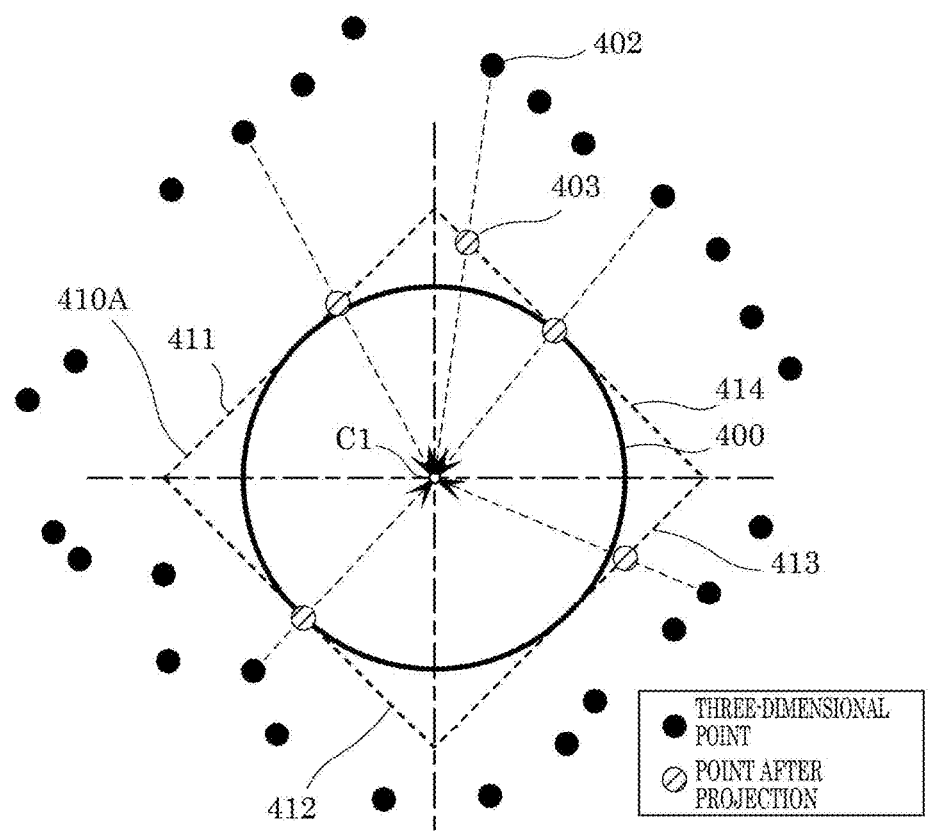
FIG. 38 is a diagram for describing a first example of a projection method in the second method according to Embodiment 8.

FIG. 38 is a diagram for describing a first example of the projection method in the second method.

As illustrated in FIG. 38, projecting plane 410A onto which a three-dimensional point cloud is projected may include a plurality of planes 411 to 414 that are virtually disposed in the periphery of measurer 400. In the plurality of planes 411 to 414, two adjacent planes contact each other. The three-dimensional data encoding device may normalize the geometry information on each of a plurality of three-dimensional points 402 of the three-dimensional point cloud, before the geometry information is projected onto the plurality of planes 411 to 414. Then, the three-dimensional data encoding device projects the geometry information after normalization onto projecting plane 410A, and generates a two-dimensional image including, as a plurality of first pixels, a plurality of pixels corresponding to the positions of a plurality of points 403 after projection on projecting plane 410A onto which the plurality of three-dimensional points 402 indicated by the geometry information after normalization have been projected.

When the geometry information on each of the plurality of three-dimensional points 402 is normalized and indicated by a numerical value of 0.0 to 1.0, one plane among the plurality of planes 411 to 414 may include the coordinates of the corners of the plane as parameters. The parameters of the plane may be defined as, for example, (1, 0, 0), (0, 1, 0), (1, 1, 0), and (1, 1, 0). The other planes may be defined by similar parameters.

Note that plane information indicating a plurality of planes is added to a bitstream.

Note that the three-dimensional data encoding device may project the geometry information on each of the plurality of three-dimensional points 402 onto the plurality of planes 411 to 414 without normalizing.

In the first example of the projection method, the three-dimensional data encoding device projects the plurality of three-dimensional points 402 onto each of planes 411 to 414 in the direction of reference point C1 for measurement by measurer 400. Reference point C1 is, for example, the center point of measurer 400. Reference point C1 is, for example, the original point at the measurement position of measurer 400. Reference point C1 is, for example, the intersection point of two axes on which measurer 400 rotates or oscillates the laser.

Figure 39:
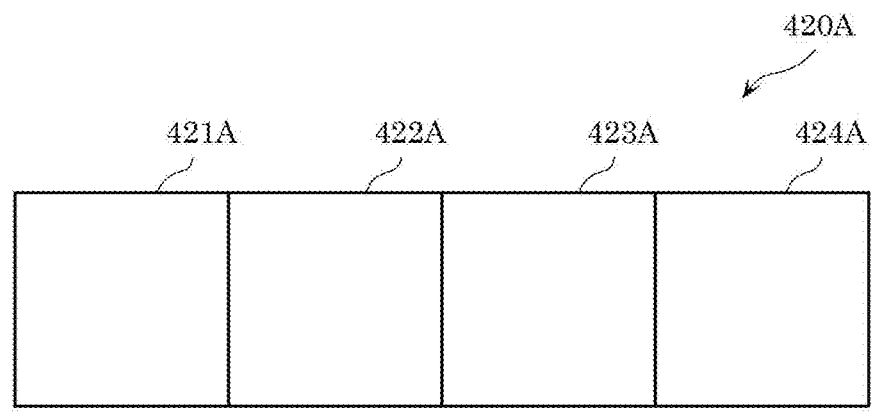
FIG. 39 is a diagram illustrating a first example of a two-dimensional image generated in the first example of the projection method according to Embodiment 8.

FIG. 39 is a diagram illustrating a first example of a two-dimensional image generated in the first example of the projection method.

For example, as illustrated in FIG. 39, the three-dimensional data encoding device may generate a plurality of sub-two-dimensional images 421A to 424A corresponding to the plurality of planes 411 to 414, respectively, by projecting the geometry information on each of the plurality of three-dimensional points 402 of the three-dimensional point cloud onto the plurality of planes 411 to 414. Then, the three-dimensional data encoding device may generate two-dimensional image 420A by integrating the plurality of sub-two-dimensional images 421A to 424A into one image.

The first example of two-dimensional image 420A is an example of a two-dimensional image in which sub-two-dimensional images 421A to 424A are integrated in a state of being arranged and disposed in the horizontal direction. Since two adjacent planes contact each other in the plurality of planes 411 to 414 that are disposed to surround measurer 400, in two-dimensional image 420A, there is a high possibility that the boundaries of the plurality of sub-two-dimensional images 421A to 424A corresponding to the plurality of planes 411 to 414 are seamlessly connected. Therefore, two-dimensional image 420A can be efficiently encoded.

Figure 40:
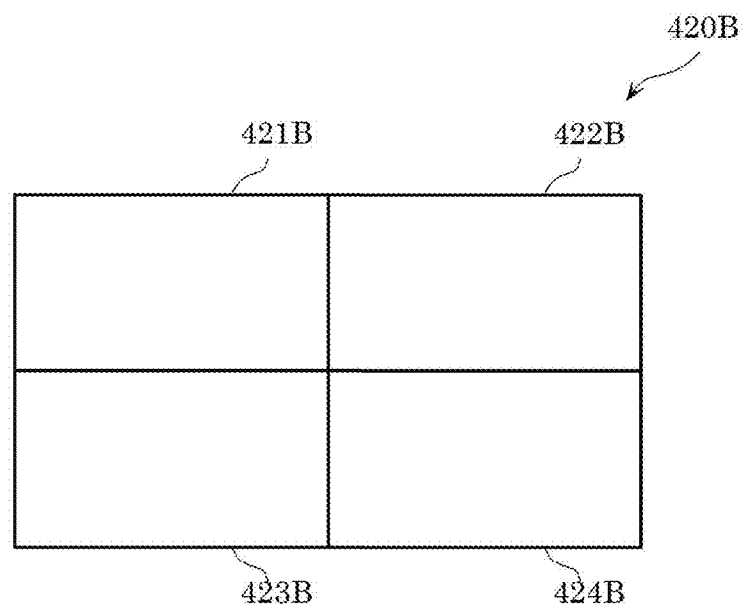
FIG. 40 is a diagram illustrating a second example of a two-dimensional image generated in the first example of the projection method according to Embodiment 8.

FIG. 40 is a diagram illustrating a second example of a two-dimensional image generated in the first example of the projection method.

As illustrated in FIG. 40, for example, the three-dimensional data encoding device may generate a plurality of sub-two-dimensional images 421B to 424B corresponding to the plurality of planes 411 to 414, respectively, by projecting the geometry information on each of the plurality of three-dimensional points 402 of the three-dimensional point cloud on the plurality of planes 411 to 414. Then, the three-dimensional data encoding device may generate two-dimensional image 420B by integrating the plurality of sub-two-dimensional images 421B to 424B into one image. The second example of two-dimensional image 420B is an example of a two-dimensional image in which sub-two-dimensional images 421B to 424B are integrated in a state of being arranged and disposed two by two in the horizontal direction and the vertical direction. In the second example, the resolution of each of the plurality of sub-two-dimensional images 421B to 424B corresponding to the plurality of planes 411 to 414 may be 1920×1080 (full HD). In this case, the resolution of integrated two-dimensional image 420B can be set to 3840×2160 (4K), and it is possible to perform encoding by using an existing 4K-compatible 2D encoder mounted in an existing terminal or the like.

Note that the two-dimensional images are not limited to the above-described first example and second example. The sub-two-dimensional images corresponding to the plurality of planes 411 to 414 may be integrated in any order and arrangement. When encoding an integrated two-dimensional image, the three-dimensional data encoding device may add, to the header of a bitstream, the information indicating that a plurality of sub-two-dimensional images are integrated, and the information indicating the order and arrangement by which sub-two-dimensional images are arranged in the case of integration.

Accordingly, after decoding the integrated two-dimensional image, the three-dimensional data decoding device can return the integrated two-dimensional image to a plurality of sub-two-dimensional images, and, by using the plurality of planes 411 to 414 corresponding to these, can restore the original three-dimensional point cloud by rearranging a plurality of first pixels included in the plurality of sub-two-dimensional images in the three-dimensional space.

Figure 41:
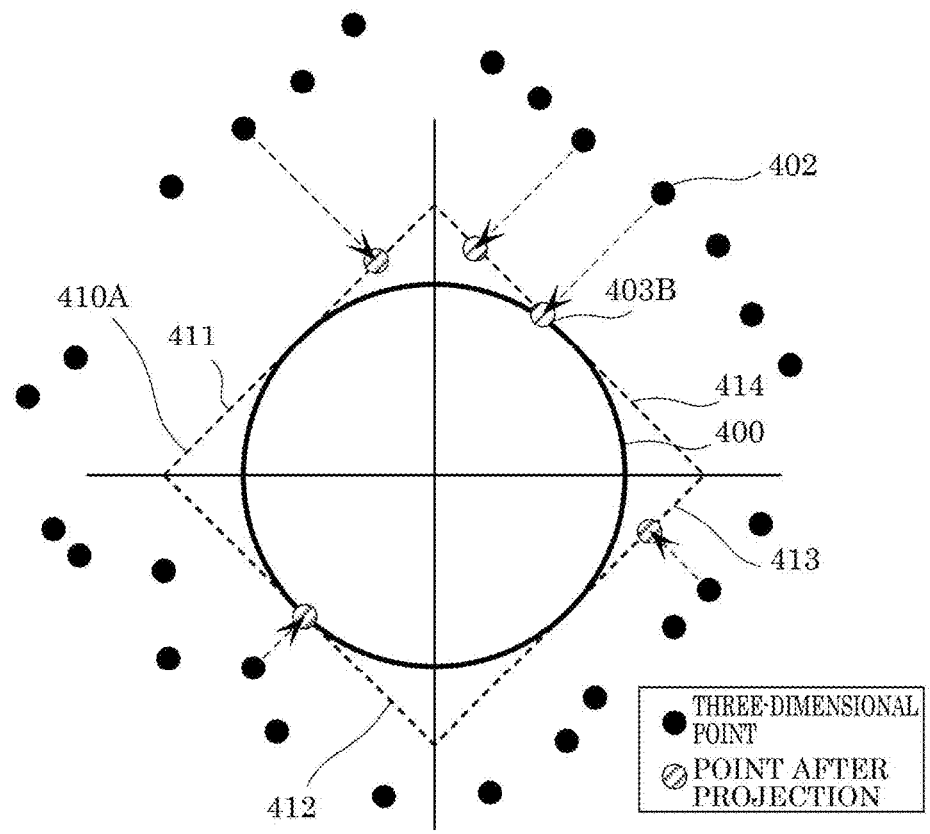
FIG. 41 is a diagram for describing a second example of the projection method in the second method according to Embodiment 8.

FIG. 41 is a diagram for describing a second example of the projection method in the second method.

Projecting plane 410A onto which a three-dimensional point cloud is projected is the same as that in the first example of the projection method described by using FIG. 38.

In the second example of the projection method, the three-dimensional data encoding device may project the plurality of three-dimensional points 402 onto points 403B that are perpendicular to one plane among the plurality of planes 411 to 414. Accordingly, the amount of computation of projection processing can be reduced.

Figure 42:
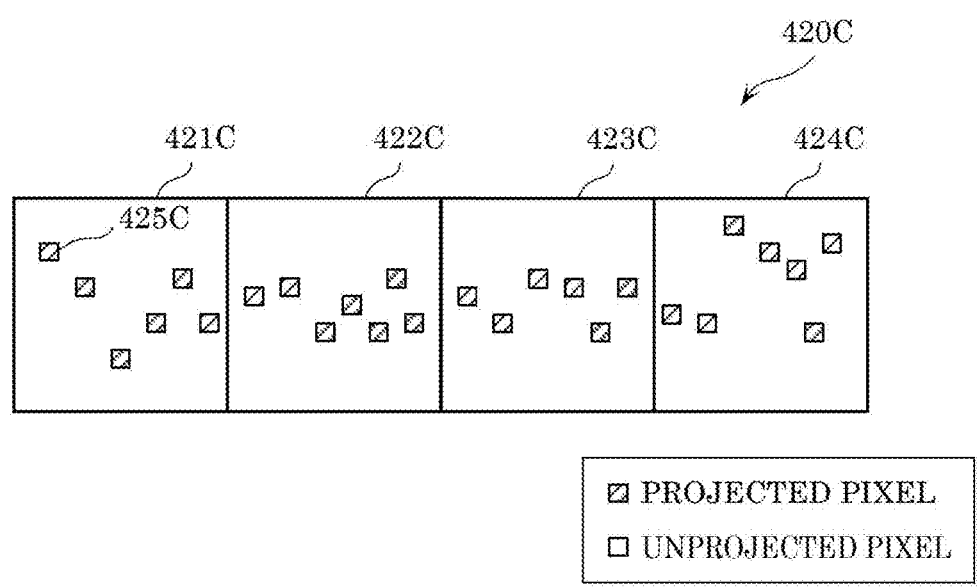
FIG. 42 is a diagram illustrating an example of a two-dimensional image in the case of including first pixels and second pixels according to Embodiment 8.

Additionally, in this case, a two-dimensional image generated by projection may include the first pixels for which the geometry information is projected, and second pixels for which the geometry information is not projected. FIG. 42 is a diagram illustrating an example of a two-dimensional image in the case of including the first pixels and the second pixels.

As illustrated in FIG. 42, the respective geometry information on the plurality of projected three-dimensional points 402 are indicated by a plurality of first pixels 425C. The geometry information is not indicated in the second pixels other than the plurality of first pixels 425C in two-dimensional image 420C. The second pixels need not have pixel values, or may have pixel values indicating invalidity. The pixel value indicating invalidity may be, for example, the minimum value among the possible values of the pixel value, may be the maximum value among the possible values of the pixel value, or may be a median among the possible values of the pixel value. When assigning the median, it is possible to suppress the occurrence of steep change in pixel values in two-dimensional image 420C after projection. Therefore, the encoding efficiency of two-dimensional encoding can be improved. Additionally, the three-dimensional data encoding device may smooth the pixel values of the second pixels and the pixel values of pixels in its periphery by performing smoothing processing, such as filtering processing, on a two-dimensional image after projection. Accordingly, the encoding efficiency of two-dimensional encoding can be improved.

Note that, in FIG. 42, the plurality of first pixels 425C are indicated by hatching of oblique lines, and the plurality of second pixels are indicated by white regions.

Note that whether each pixel in two-dimensional image 420C is the valid first pixel or the invalid second pixel may be indicated by a valid/invalid image that includes the pixel corresponding to each pixel constituting two-dimensional image 420C, and that indicates that the pixels of the positions corresponding to the plurality of first pixels are valid, and the pixels of the positions corresponding to the plurality of second pixels are invalid.

The valid/invalid image is a two-dimensional image different from two-dimensional image 420C, and when the valid/invalid image is generated, the valid/invalid image is two-dimensionally encoded, and added to a bitstream.

Note that the valid/invalid image may be encoded with methods other than two-dimensional encoding. For example, the valid/invalid image may be one-dimensionally encoded. The valid/invalid image is an example of pixel information.

Accordingly, after decoding two-dimensional image 420C, the three-dimensional data decoding device can determine which pixel is the valid first pixel and which pixel is the invalid second pixel, and can restore three-dimensional points by projecting only the valid first pixels onto the three-dimensional space.

Note that the plurality of three-dimensional points 402 may be projected onto any plane of the plurality of planes 411 to 414. For example, the three-dimensional data encoding device may select the plane that has the closest distance to three-dimensional point 402 to be projected in the three-dimensional space among the plurality of planes 411 to 414, and may project three-dimensional point 402 to be projected onto the selected plane. The projected first pixel may have the pixel value indicating the distance from measurer 400 to three-dimensional point 402 to be projected, or may have the pixel value indicating the distance from the plane that is the projection destination to three-dimensional point 402 to be projected. In the case of the latter, the pixel values (depth values, distances) after projection can be made small, and it is possible to suppress the occurrence of steep change in pixel values in the two-dimensional image after projection. Therefore, the encoding efficiency of two-dimensional encoding can be improved.

Note that the three-dimensional data encoding device may add, to the header of a bitstream, information for identifying whether projection has been performed in the first example or the second example of the projection method. Accordingly, since the three-dimensional data decoding device can determine whether a three-dimensional point cloud has been projected in the first example or has been projected in the second example, the three-dimensional point cloud can be restored with the correct method.

Figure 43:
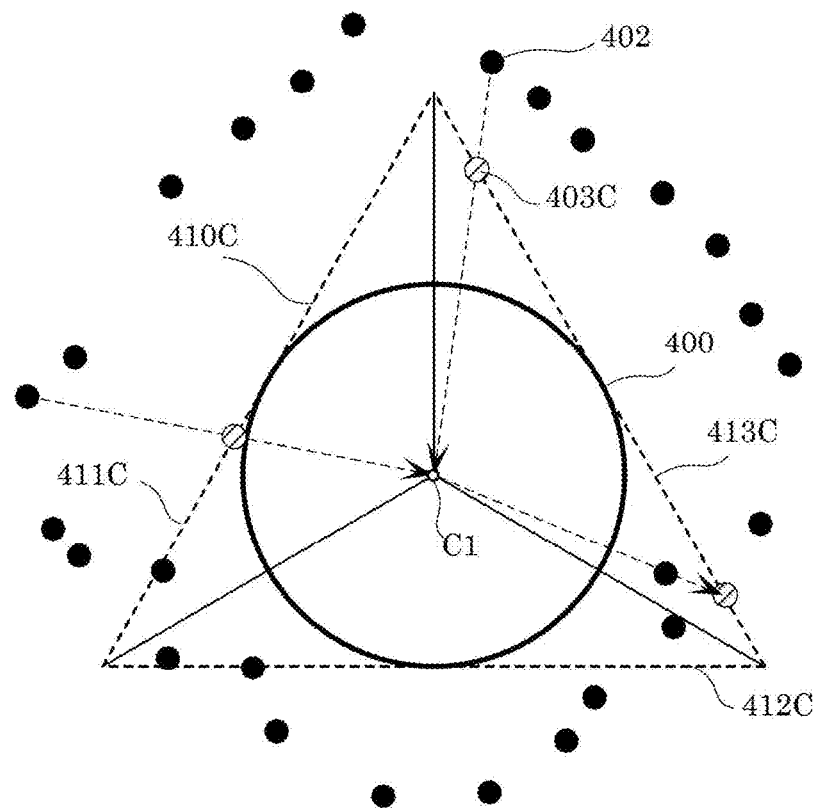
FIG. 43 is a diagram for describing a third example of the projection method in the second method according to Embodiment 8.

FIG. 43 is a diagram for describing a third example of the projection method in the second method.

As illustrated in FIG. 43, projecting plane 410C may be constituted by three planes 411C to 413C that are virtually disposed in the periphery of measurer 400. Additionally, other than this, a projecting plane may be constituted by five planes or six or more planes. In the third example of the projection method, the three-dimensional data encoding device projects the plurality of three-dimensional points 402 onto each of planes 411C to 413C in the direction of reference point C1 for measurement by measurer 400.

Figure 44:
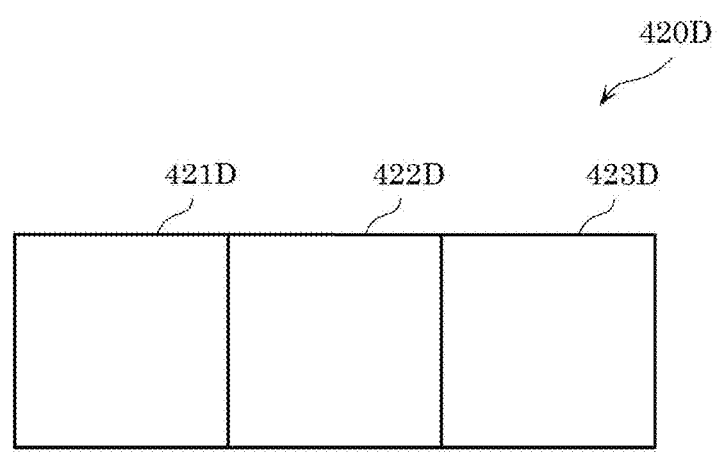
FIG. 44 is a diagram illustrating an example of a two-dimensional image generated in the third example of the projection method according to Embodiment 8.

FIG. 44 is a diagram illustrating an example of a two-dimensional image generated in the third example of the projection method.

Two-dimensional image 420D in this case is an example of a two-dimensional image in which sub-two-dimensional images 421D to 423C are integrated in the state of being arranged and disposed in the horizontal direction.

Figure 45:
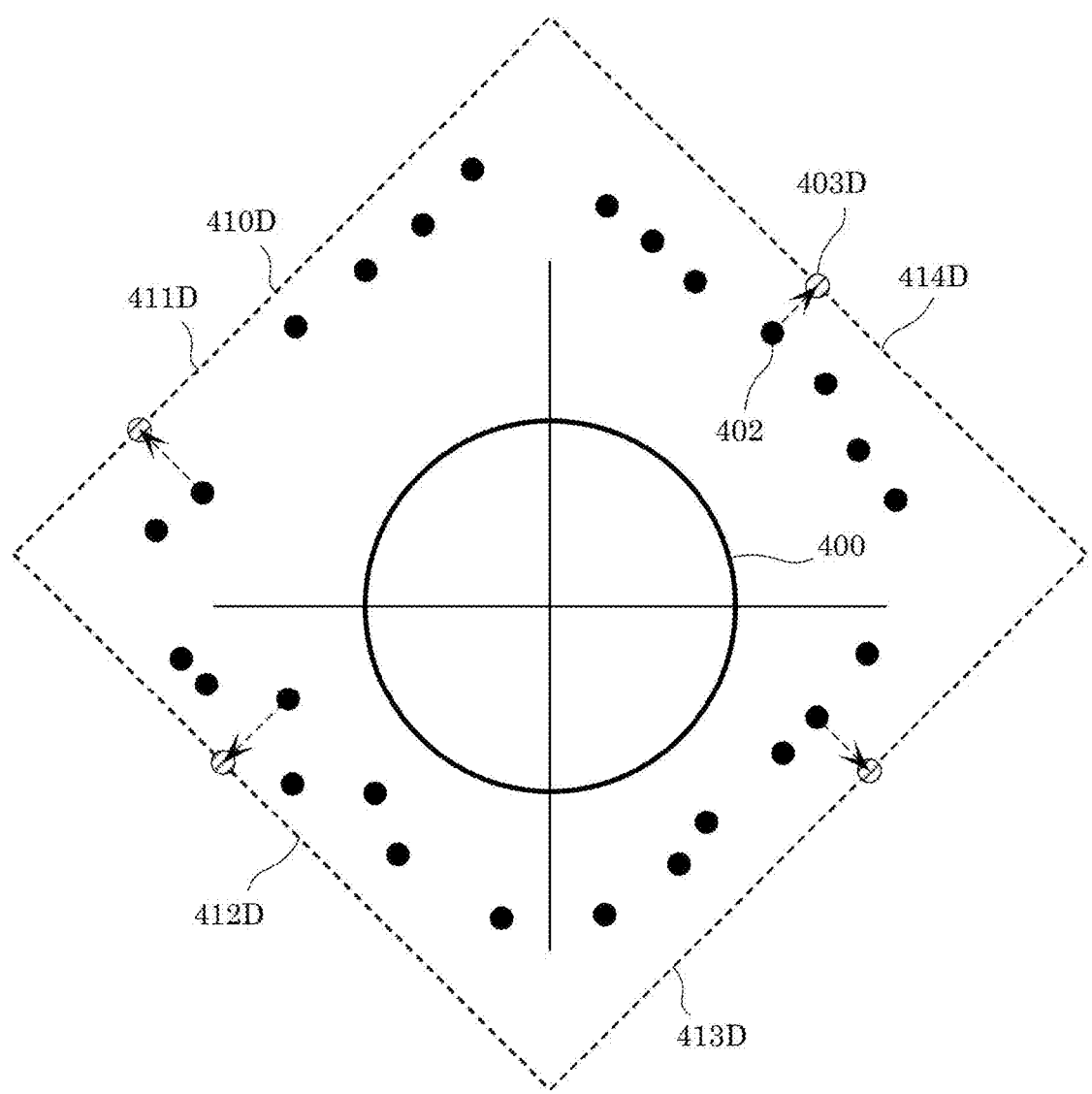
FIG. 45 is a diagram for describing a fourth example of the projection method in the second method according to Embodiment 8.

FIG. 45 is a diagram for describing a fourth example of the projection method in the second method.

As illustrated in FIG. 45, projecting plane 410D may be virtually disposed in the periphery of measurer 400, and in the outside of a three-dimensional point cloud measured by measurer 400. Projecting plane 410D is constituted by four planes 411D to 414D. In the fourth example of the projection method, the three-dimensional data encoding device may project the plurality of three-dimensional points 402 onto point 403D that are perpendicular to one plane among the plurality of planes 411D to 414D. The three-dimensional data encoding device may normalize the geometry information on each of the plurality of three-dimensional points 402 of the three-dimensional point cloud, before the geometry information is projected onto the plurality of planes 411D to 414D. The plurality of planes 411D to 414D may be set to four planes that pass through, among the plurality of three-dimensional points 402 of the three-dimensional point cloud, the points having the farthest coordinates on each of the plus side of the X axis direction, which is the axial direction in the horizontal direction of three-dimensional orthogonal coordinates, the minus side of the X axis direction, the plus side of the Y axis direction, and the minus side of the Y axis direction.

Figure 46:
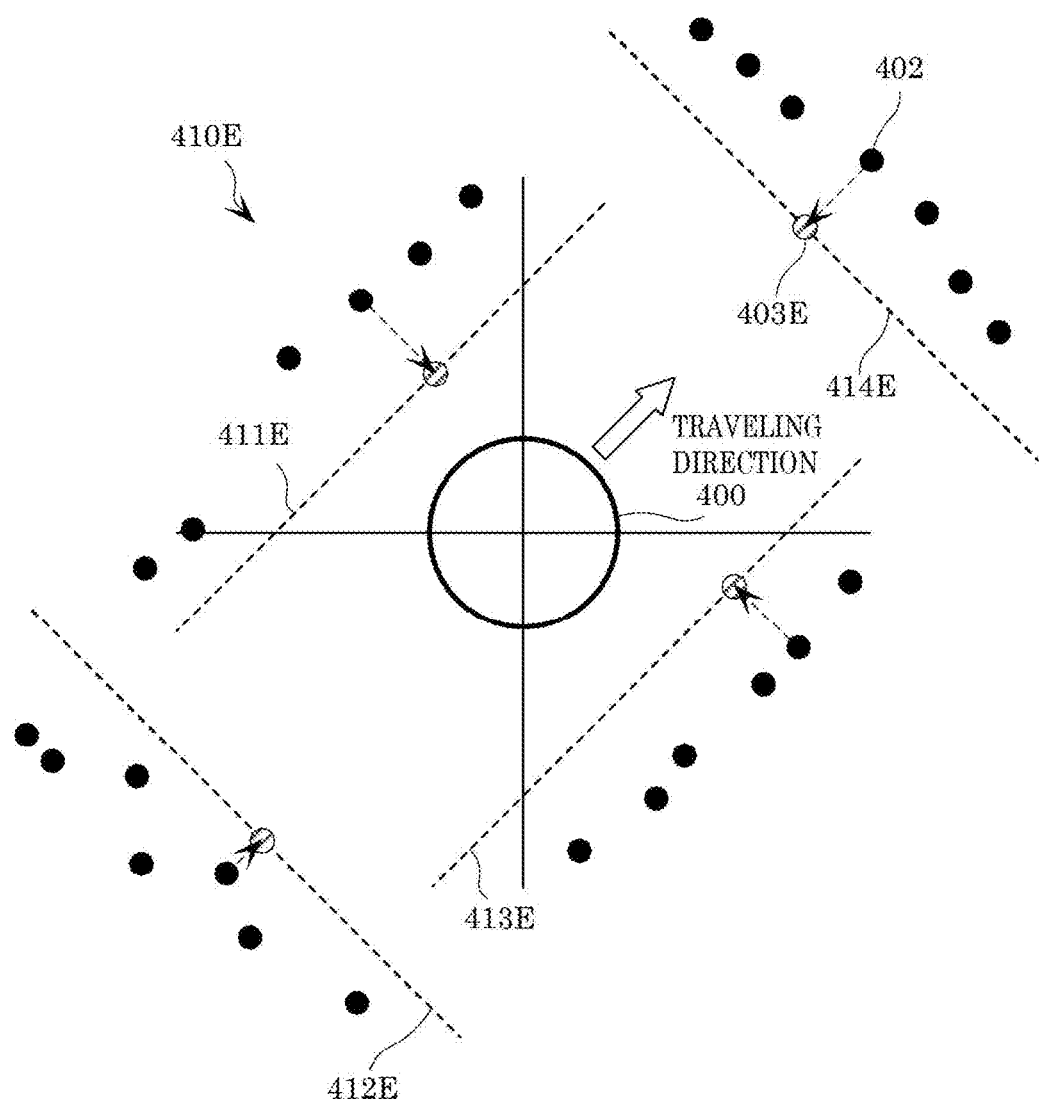
FIG. 46 is a diagram for describing a fifth example of the projection method in the second method according to Embodiment 8.

FIG. 46 is a diagram for describing a fifth example of the projection method in the second method.

As for projecting planes 410E, when measurer 400 is an in-vehicle equipment, and moves in a specific traveling direction, a case is conceivable where there are less obstacles close to measurer 400 on the traveling direction side or its opposite side, and there are many obstacles, such as buildings, walls, and trees, close to measurer 400 on the sides perpendicular to the traveling direction in the horizontal direction (that is, on the lateral sides). In this case, many three-dimensional points are measured at positions distant from measurer 400 (that is, positions that are more distant than a predetermined distance) in the traveling direction or its opposite direction, and many three-dimensional points are measured at positions close to measurer 400 in the direction perpendicular to the traveling direction (that is, positions that are closer than the predetermined distance). Therefore, in the traveling direction or its opposite direction, virtual planes 412E and 414E may be defined as projecting planes 410E at positions whose distances from measurer 400 are more distant than the predetermined distance, and in the direction perpendicular to the traveling direction, virtual planes 411E and 413E may be defined as projecting planes 410E at positions whose distances from measurer 400 are closer than the predetermined distance. Accordingly, since the three-dimensional data encoding device can set projecting plane 410E close to the three-dimensional point cloud, when generating a two-dimensional image having the pixel values indicating the distance from the plane that is a projection destination to three-dimensional point 402 to be projected, the pixel values (depth values, distances) after projection can be made small, and it is possible to suppress the occurrence of steep change in pixel values in the two-dimensional image after projection. Therefore, the encoding efficiency of two-dimensional encoding can be improved.

Note that the plane information indicating projecting planes 410E may be added to the header of a bitstream or the like. Accordingly, since the three-dimensional data decoding device can re-arrange the three-dimensional point cloud by using projecting planes 410E that are set at the time of encoding, the three-dimensional data decoding device can correctly decode the three-dimensional point cloud.

Note that, although the examples in the cases where measurer 400 is seen from above have been illustrated in the first example to the fifth example of the projection method, the present technique may also be applied to cases of other viewpoints. For example, the present technique may also be applied to the case of a side viewpoint.

Figure 47:
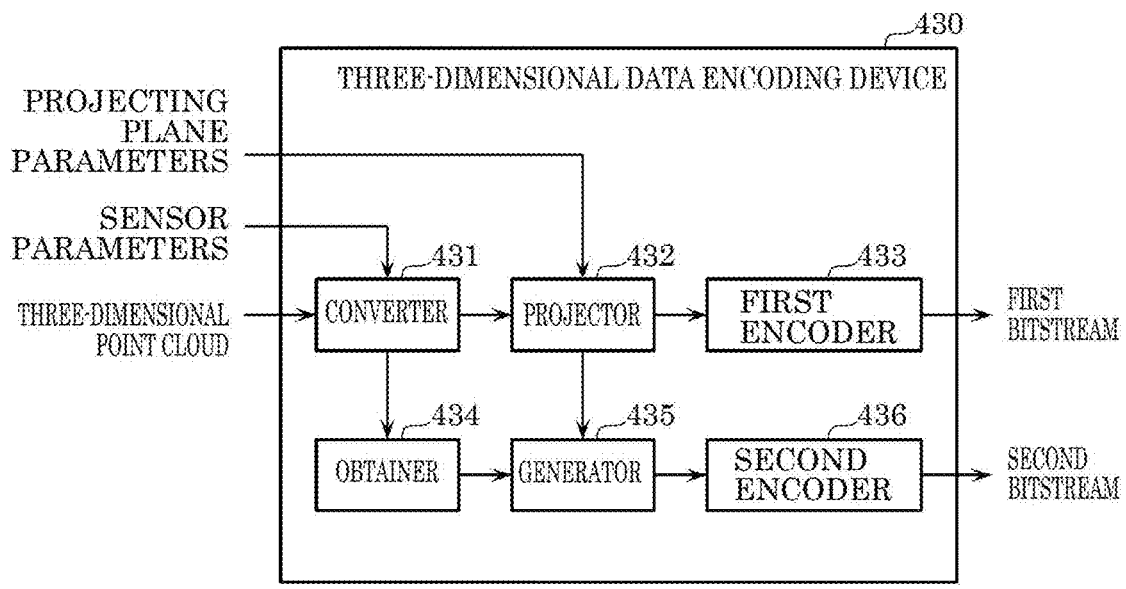
FIG. 47 is a block diagram illustrating an example of the configuration of a three-dimensional data encoding device according to Embodiment 8.

FIG. 47 is a block diagram illustrating an example of the configuration of a three-dimensional data encoding device.

Three-dimensional data encoding device 430 includes converter 431, projector 432, first encoder 433, obtainer 434, generator 435, and second encoder 436.

Converter 431 obtains a three-dimensional point cloud and a sensor parameter from measurer 400, and converts the geometry information indicated by three-dimensional orthogonal coordinates into three-dimensional polar coordinates on the basis of reference point C1 of measurer 400. The sensor parameter includes the information indicating a plurality of directions in which measurer 400 emits laser light. Additionally, the sensor parameter includes, for example, the information indicating the position and posture with which the three-dimensional point cloud has been measured by measurer 400. Note that converter 431 need not convert the geometry information indicated by three-dimensional orthogonal coordinates into the geometry information indicated by three-dimensional polar coordinates, and may perform the subsequent processing directly on the geometry information indicated by the three-dimensional orthogonal coordinates.

Projector 432 uses a plurality of three-dimensional points and projecting plane parameters that are included in the geometry information converted by converter 431 to project the plurality of three-dimensional points onto a projecting plane virtually disposed in the periphery of measurer 400. Accordingly, projector 432 generates a first two-dimensional image that includes, as a plurality of first pixels, a plurality of pixels corresponding to a plurality of positions on the projecting plane onto which the plurality of three-dimensional points are projected. The first two-dimensional image generated by projector 432 is a two-dimensional depth map having pixel values for calculating the distance from measurer 400 to the three-dimensional position corresponding to each of the plurality of first pixels. The first two-dimensional image is an image indicating the geometry information on the three-dimensional point cloud. The projecting plane parameters are, for example, the above-described parameter for planes when the projecting plane is constituted by a plurality of planes.

First encoder 433 generates a first bitstream by encoding the first two-dimensional image generated by projector 432.

Obtainer 434 obtains the reflectance and texture data (color information) as the attribute information of the three-dimensional point cloud. The reflectance and texture data correspond to each of the plurality of three-dimensional points of the three-dimensional point cloud.

Generator 435 generates a second two-dimensional image that corresponds to the two-dimensional depth map generated by projector 432, and in which respective pixels have the reflectance and texture data corresponding to the plurality of first pixels of the two-dimensional depth map. The second two-dimensional image is an image indicating the attribute information of the three-dimensional point cloud. Similar to the first two-dimensional image, the second two-dimensional image is a two-dimensional image corresponding to the projecting plane. Therefore, the second two-dimensional image may be a two-dimensional image in which a plurality of sub-two-dimensional images are integrated, or may be a plurality of sub-two-dimensional images.

Second encoder 436 generates a second bitstream by encoding the second two-dimensional image generated by generator 435.

Note that the first bitstream and the second bitstream may be a part of a bitstream generated by three-dimensional data encoding device 430. That is, in a bitstream, the second bitstream may be disposed after the first bitstream, or the first bitstream may be disposed after the second bitstream.

Note that three-dimensional data encoding device 430 may encode one two-dimensional image after integration, or may individually encode each of a plurality of sub-two-dimensional images. Three-dimensional data encoding device 430 may add, to the header of a bitstream or the like, the information indicating whether one two-dimensional image after integration has been encoded, or each of a plurality of sub-two-dimensional images has been individually encoded. Accordingly, three-dimensional data decoding device 440 can determine whether or not to separate the decoded two-dimensional image into a plurality of sub-two-dimensional images. Here, the two-dimensional image to be encoded may be the first two-dimensional image, or may be the second two-dimensional image.

Note that the resolution of the sub-two-dimensional image corresponding to each plane constituting the projecting plane may be a different resolution for each corresponding plane. For example, the three-dimensional data encoding device may set the resolution of a sub-two-dimensional image corresponding to a plane onto which more three-dimensional points are projected to be higher than the resolution of a sub-two-dimensional image corresponding to a plane onto which less three-dimensional points are projected than the above-described plane. In this manner, the larger the number of the projected three-dimensional points in a plane is, the higher the resolution of a sub-two-dimensional image corresponding to the plane may be set. Accordingly, it is possible to suppress the resolution of a two-dimensional image to be encoded (a two-dimensional image after being integrated or a plurality of sub-two-dimensional images) to a resolution sufficient for the number of projected three-dimensional points, and the encoding efficiency can be improved.

Additionally, the three-dimensional data encoding device may perform resolution conversion that reduces the resolution by projecting a three-dimensional point cloud onto a high resolution projecting plane, and then down-sampling the high resolution projecting plane after the three-dimensional point cloud has been projected, onto a projecting plane having a lower resolution than the projecting plane, and so on. For example, when the number of invalid second pixels after projection is larger than a predetermined number, or when the ratio of the second pixels to a two-dimensional image is higher than a predetermined rate, the three-dimensional data encoding device may improve the encoding efficiency by performing the resolution conversion that reduces the resolution.

Note that the resolution of the sub-two-dimensional image corresponding to each plane of a projecting plane may be added to the header of a bitstream or the like. Accordingly, the three-dimensional data decoding device can correctly decode a three-dimensional point cloud by using the resolution of the sub-two-dimensional image.

Figure 48:
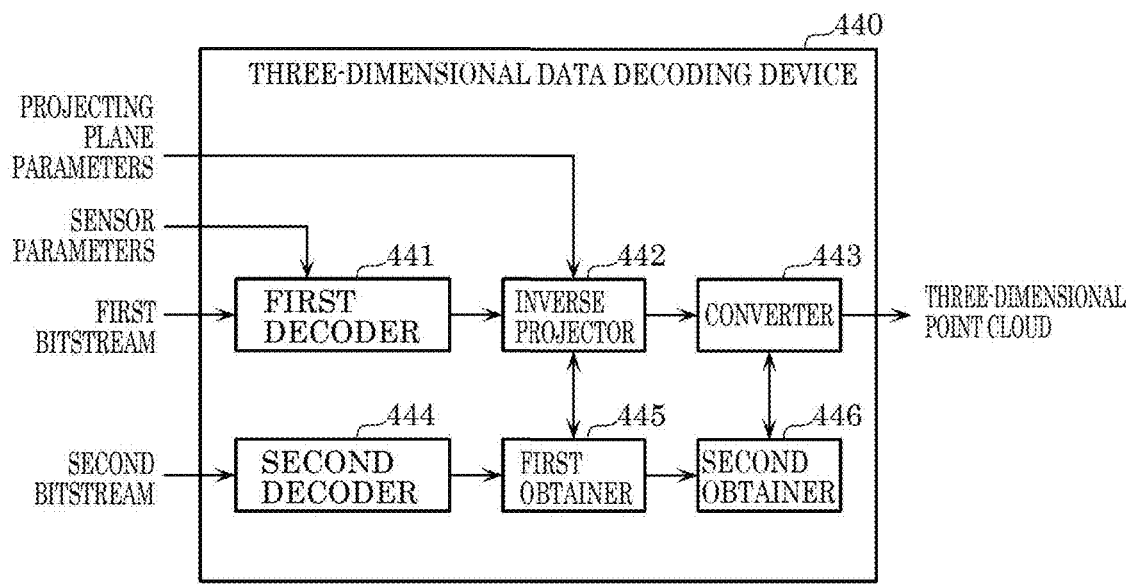
FIG. 48 is a block diagram illustrating an example of the configuration of a three-dimensional data decoding device according to Embodiment 8.

FIG. 48 is a block diagram illustrating an example of the configuration of a three-dimensional data decoding device.

Three-dimensional data decoding device 440 includes first decoder 441, inverse projector 442, converter 443, second decoder 444, first obtainer 445, and second obtainer 446.

First decoder 441 decodes a first bitstream, and obtains a first two-dimensional image.

Inverse projector 442 restores the geometry information on a plurality of three-dimensional points on a measurement target, by using the first two-dimensional image obtained by first decoder 441. Specifically, inverse projector 442 restores the geometry information on the plurality of three-dimensional points by re-arranging a plurality of first pixels included in the first two-dimensional image in the three-dimensional space in the periphery of measurer 400, by using the projecting plane parameters.

Converter 443 obtains sensor parameters from the first bitstream, and converts the geometry information on the plurality of restored three-dimensional points from the geometry information indicated by the three-dimensional polar coordinates on the basis of reference point C1 of measurer 400 into the geometry information indicated by the three-dimensional orthogonal coordinates. Note that converter 443 need not convert the geometry information indicated by the three-dimensional polar coordinates into the geometry information indicated by the three-dimensional orthogonal coordinates, and may perform the subsequent processing directly on the geometry information indicated by the three-dimensional polar coordinates.

Second decoder 444 decodes a second bitstream, and obtains a second two-dimensional image.

First obtainer 445 obtains the attribute information (reflectance and texture data) corresponding to the geometry information on each of the plurality of three-dimensional points, by using the second two-dimensional image obtained by second decoder 444.

Second obtainer 446 associates the attribute information obtained by first obtainer 445 with the geometry information on the plurality of three-dimensional points.

Converter 443 outputs a plurality of three-dimensional points, each including the geometry information and the attribute information, as a three-dimensional point cloud.

FIG. 49 is a diagram illustrating an example of the configuration of a bitstream.

As illustrated in FIG. 49, the bitstream may include projecting plane parameters. That is, the three-dimensional data encoding device may generate a bitstream including the projecting plane parameters. The projecting plane parameters may be included in the header of the bitstream. When the projecting plane parameters are plane parameters, the projecting plane parameters may be, for example, a, b, c, and d of a plane equation $ax+by+cz=d$ of a plane representing a projecting plane. Additionally, the projecting plane parameters may include the information indicating the number or resolution of planes included in the projecting plane. Note that b0 to bn in FIG. 49 indicate the pixel values (that is, depths) of a plurality of first pixels included in a two-dimensional image.

FIG. 50 is a diagram illustrating another example of the configuration of a bitstream.

As illustrated in FIG. 50, the bitstream may further include sensor parameters, in addition to the projecting plane parameters and the pixel values of the plurality of first pixels. That is, the three-dimensional data encoding device may generate a bitstream including the projecting plane parameters and the sensor parameters. The details of the sensor parameters will be described later.

The projecting plane parameters in FIG. 49 and FIG. 50 may be encoded data.

The sensor parameters in FIG. 50 may be encoded data.

Figure 51:
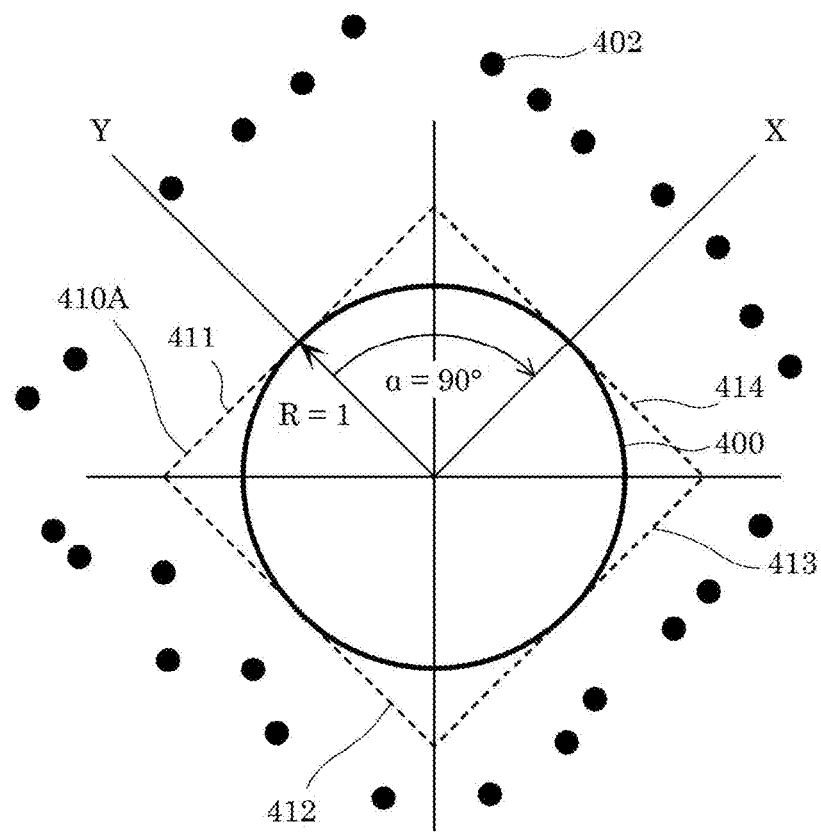
FIG. 51 is a diagram for describing a sixth example of the projection method in the second method according to Embodiment 8.

FIG. 51 is a diagram for describing a sixth example of the projection method in the second method. FIG. 52 is a diagram for describing three-dimensional polar coordinates.

Projecting plane 410A onto which a three-dimensional point cloud is projected is the same as that of the first example of the projection method described by using FIG. 38.

With the use of the following Equation 1, each three-dimensional point of the three-dimensional point cloud can be converted from three-dimensional orthogonal coordinates (X, Y, Z) into three-dimensional polar coordinates (R, α, β) on the basis of reference point C1 of measurer 400 by using the sensor parameters (α, β) of measurer 400.

As illustrated in (c) in FIG. 52, R of the three-dimensional polar coordinates represents the distance from reference point C1 of measurer 400 to three-dimensional point P1.

As illustrated in (b) in FIG. 52, a of the three-dimensional polar coordinates represents the angular component around a vertical axis passing through reference point C1 of measurer 400 for specifying the irradiation angle of the laser light from measurer 400 at the time when three-dimensional point P1 is measured, and represents the angle (horizontal angle) from a specific direction in the horizontal direction (for example, Y-axis plus direction). That is, the three-dimensional polar coordinate α represents the angle about the vertical axis (Z axis) between the Y-axis plus direction and the direction from reference point C1 to three-dimensional point P1.

As illustrated in (a) in FIG. 52, β of the three-dimensional polar coordinates represents the angular component about a horizontal axis passing through reference point C1 of measurer 400 for specifying the irradiation angle of the laser light from measurer 400 at the time when three-dimensional point P1 is measured, and represents the angle (vertical angle) from a specific direction (for example, Y-axis plus direction) along a plane (horizontal plane) that orthogonally intersects the horizontal axis. That is, the three-dimensional polar coordinate α represents the angle between the Y-axis plus direction and the direction from reference point C1 to three-dimensional point P1. That is, the three-dimensional polar coordinate β represents the angle about the horizontal axis (X axis) between the Y-axis plus direction and the direction from reference point C1 to three-dimensional point P1.

In this manner, each of the plurality of directions in which measurer 400 irradiates the laser light is defined by the angle β as a first angle relative to a reference plane (XY plane) that passes through measurer 400, and the angle α as a second angle from a reference angle (the Y-axis plus direction) about the axis (Z axis) that passes through measurer 400 and that orthogonally intersects the reference plane.

[Math. 1]

$$R = Z/\sin\beta$$
$$\alpha = \tan^{-1}\frac{X}{Y}$$
$$\beta = \tan^{-1}\frac{Z\cos\alpha}{Y}$$

Equation 1

The plurality of planes 411, 414, 413, and 412 included in projecting plane 410A can be defined by, for example, R=1, β=0°, and α=0°, α=90°, α=180°, and α=270°, respectively. In the three-dimensional orthogonal coordinates, the plurality of planes 411, 414, 413, and 412 can be defined as (0, 1, 0) (1, 0, 0), (0, −1, 0), and (−1, 0, 0), respectively.

In this manner, the three-dimensional point cloud obtained by measurer 400 may be indicated by the three-dimensional polar coordinates on the basis of reference point C1 of measurer 400. Each three-dimensional point of the three-dimensional point cloud may be indicated by (β, α, R, L). Note that L represents the reflectance obtained at the time when point P1 is obtained.

Equation 1 becomes the following Equation 2 when written for X, Y, and Z.

[Math. 2]

$$X = R \cos\beta \sin\alpha$$

$$Y = R \cos\beta \cos\alpha$$

$$Z = R \sin\beta$$

Equation 2

Figure 53:
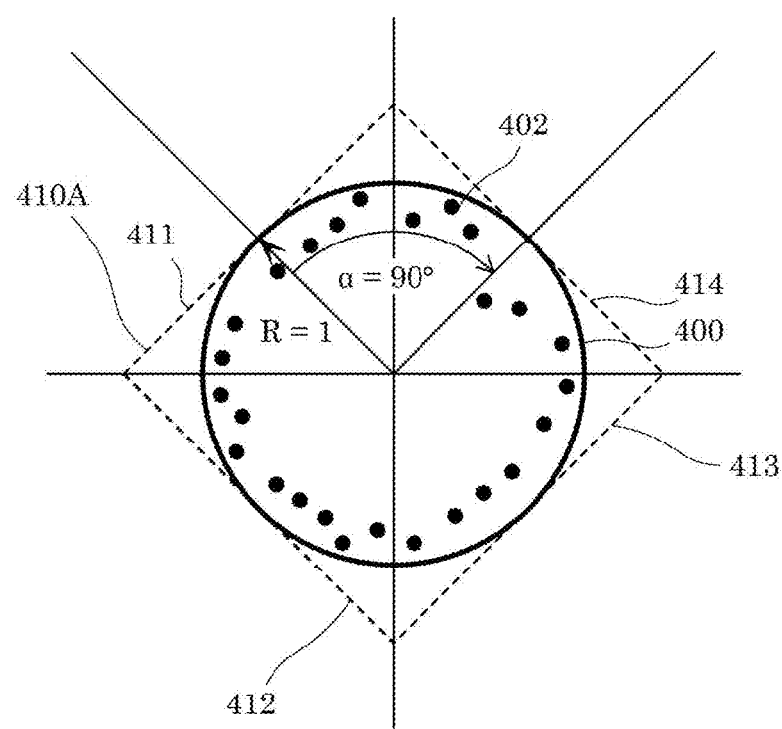
FIG. 53 is a diagram for describing a seventh example of the projection method in the second method according to Embodiment 8.

FIG. 53 is a diagram for describing a seventh example of the projection method in the second method.

Projecting plane 410A onto which a three-dimensional point cloud is projected is the same as that of the first example of the projection method described by using FIG. 38.

The three-dimensional data encoding device may convert the three-dimensional coordinates of each three-dimensional point of the three-dimensional point cloud into the three-dimensional polar coordinates as described with FIG. 51, and may thereafter normalize distance R to a value of 0.0 to 1.0. When the plurality of planes 411, 414, 413, and 412 of projecting plane 410A are defined as (0, 1, 0), (1, 0, 0), (0, −1, 0), and (−1, 0, 0), since the three-dimensional coordinates of each three-dimensional point are normalized for distance R, the plurality of three-dimensional points 402 will be disposed inside the region surrounded by the plurality of planes 411 to 414 as illustrated in FIG. 53.

Although each three-dimensional point included in the three-dimensional point cloud obtained by measurer 400 may be indicated by three-dimensional orthogonal coordinates, measurer 400 irradiates laser light at a constant first angle interval about the vertical axis, and at a constant second angle interval about the horizontal axis. Therefore, for example, when measurer 400 irradiates laser light at an angle about the vertical axis in k stages, α of the three-dimensional polar coordinates of a plurality of three-dimensional points included in a three-dimensional point cloud is converted into k values from $\alpha_1$ to $\alpha_k$. Additionally, similarly, for example, when measurer 400 irradiates laser light at an angle about the horizontal axis in n stages, β of the three-dimensional polar coordinates of a plurality of three-dimensional points included in a three-dimensional point cloud is converted into n values from $\beta_1$ to $\beta_n$.

Figure 54:
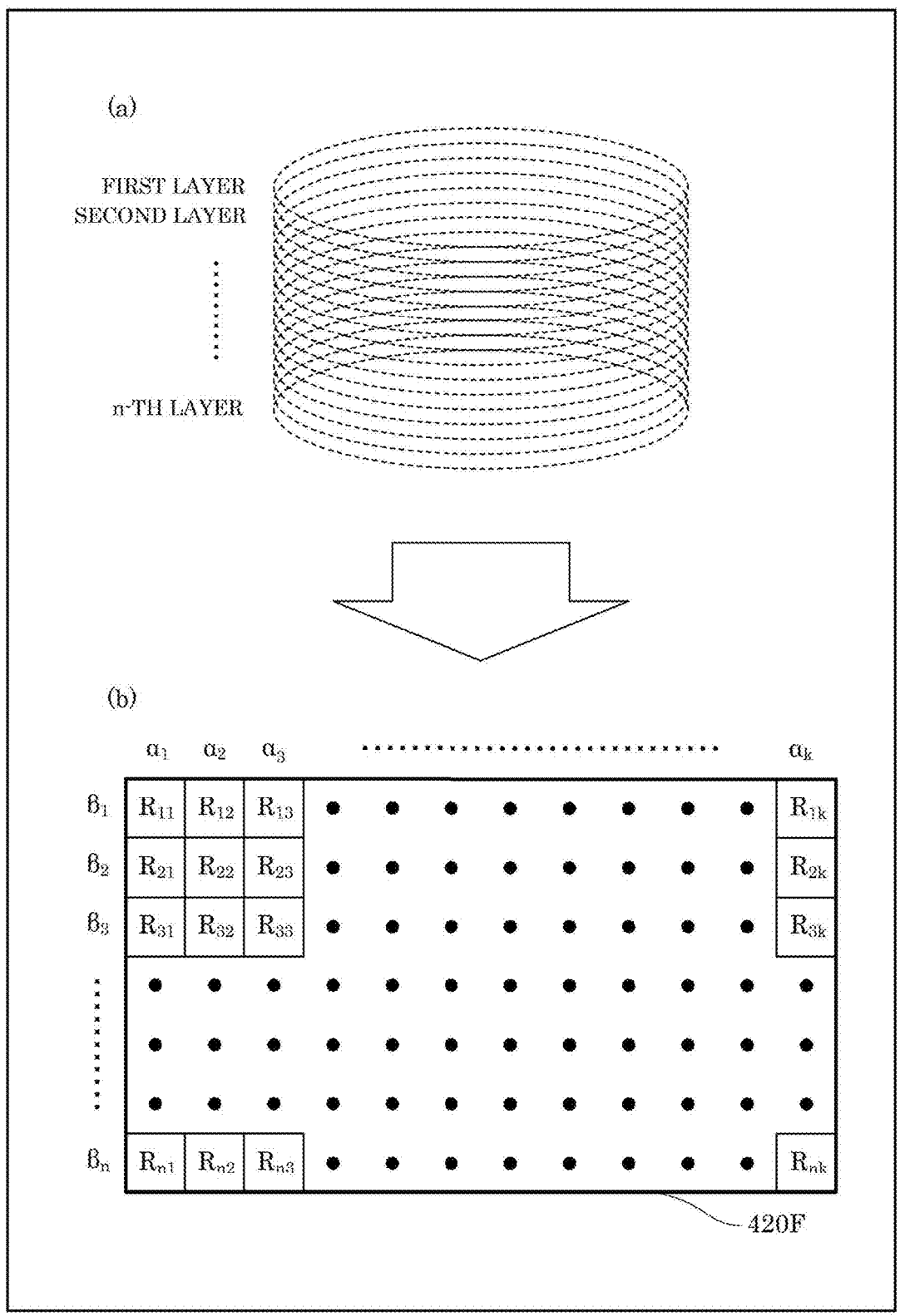
FIG. 54 is a diagram illustrating an example of a two-dimensional image generated in the seventh example of the projection method according to Embodiment 8.

Therefore, a n-layer three-dimensional point cloud including k points in each layer as illustrated in (a) in FIG. 54 may be represented by two-dimensional image 420F as illustrated in (b) in FIG. 54. Pixel value $R_{ij}$ in this two-dimensional image 420F indicates the distance measured with the laser light irradiated at vertical angle $\beta_i$ and horizontal angle $\alpha_j$. The vertical position in the vertical direction of each pixel of two-dimensional image 420F indicates angle β, and the horizontal position in the horizontal direction of each pixel of two-dimensional image 420F indicates angle α. In this manner, for each of a plurality of three-dimensional points, the three-dimensional data encoding device can convert the three-dimensional orthogonal coordinates indicated by the three-dimensional point into the three-dimensional polar coordinates represented by angles α and β and distance R, and can generate two-dimensional image 420F by using the conversion result.

Here, for pixels of the two-dimensional image illustrated by (b) in FIG. 54 for which the distance or reflectance has not been able to be obtained in measurement by measurer 400, a value indicating invalidity may be set as a pixel value. The value indicating invalidity may be the minimum value−1 or the maximum value+1 of the possible values for the distance, or the other value may be set. Accordingly, the three-dimensional data decoding device can specify the region for which three-dimensional points have not been able to be obtained, by referring to pixels from decoded two-dimensional image 420F that have been set with the value indicating invalidity. Additionally, the three-dimensional data encoding device may generate a valid/invalid image that is a two-dimensional image different from two-dimensional image 420F, and that includes the pixel corresponding to each pixel of two-dimensional image 420F. The valid/invalid image is an image in which whether each pixel in two-dimensional image 420F is the valid first pixel or the invalid second pixel. The valid/invalid image indicates that the pixels at the positions corresponding to a plurality of first pixels are valid, and indicates that the pixels at the positions corresponding to a plurality of second pixels are invalid.

Figure 55:
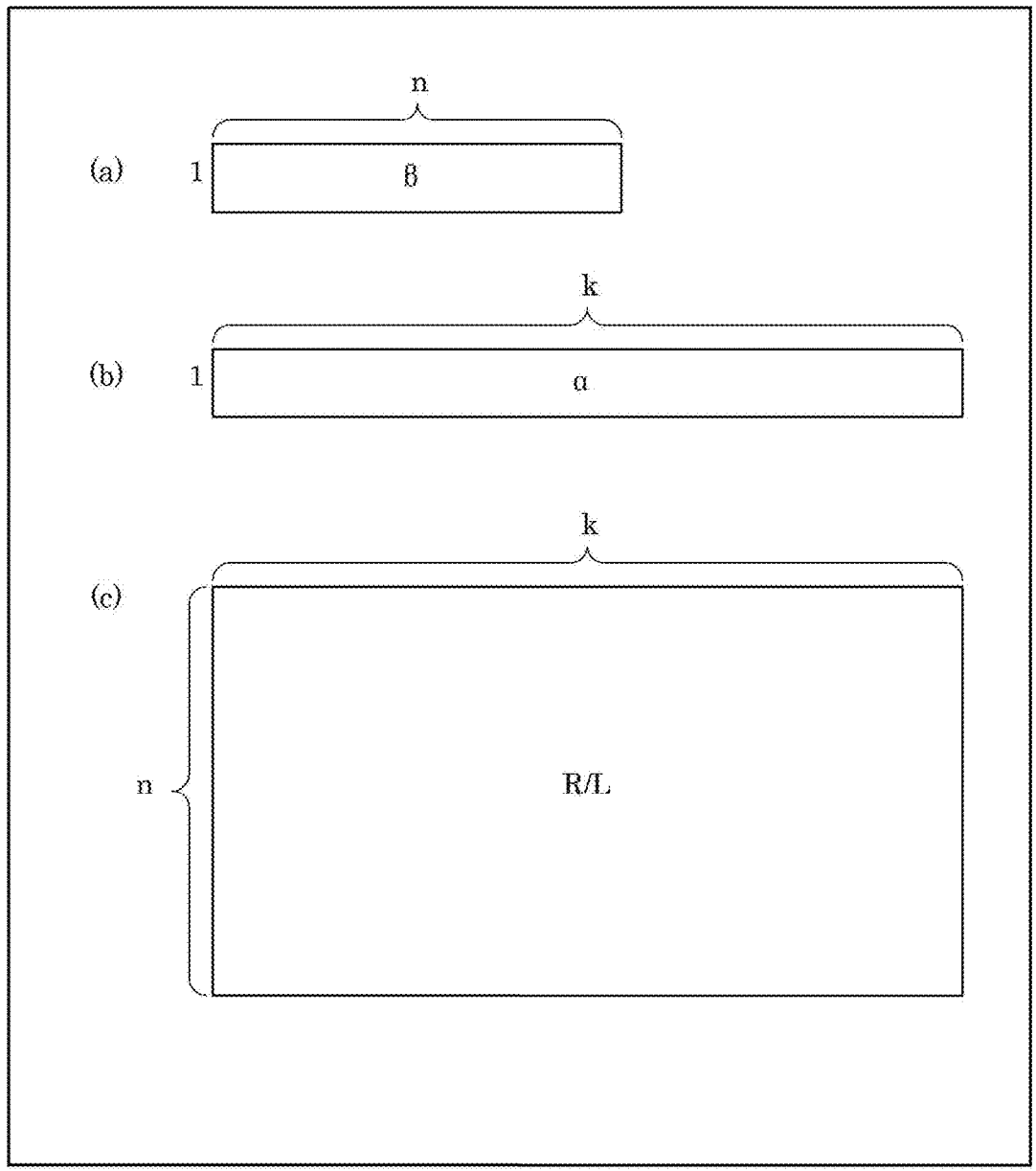
FIG. 55 is a diagram illustrating an example of sensor parameters and a two-dimensional image of a three-dimensional point cloud according to Embodiment 8.

FIG. 55 is a diagram illustrating an example of sensor parameters and a two-dimensional image of a three-dimensional point cloud.

As illustrated in (a) in FIG. 55, the sensor parameter includes n number of βs. Additionally, as illustrated in (b) in FIG. 55, the sensor parameter includes k number of as. As illustrated in (c) in FIG. 55, each of a plurality of pixels constituting a two-dimensional image includes the pixel value that indicates distance R and reflectance L measured at the time when laser light is irradiated in the irradiation direction specified by α and β corresponding to each pixel. As illustrated in (a) and (b) in FIG. 55, sensor parameters α and β may be encoded separately, or may be encoded in the state where they are integrated in a two-dimensional array.

Note that the sensor parameter need not have n number of βs, and need not have k number of as. For example, when measurer 400 irradiates the laser light at a constant interval, the sensor parameters may have the value (angle) indicating the constant interval. That is, the sensor parameters may have one α and one β.

Figure 56:
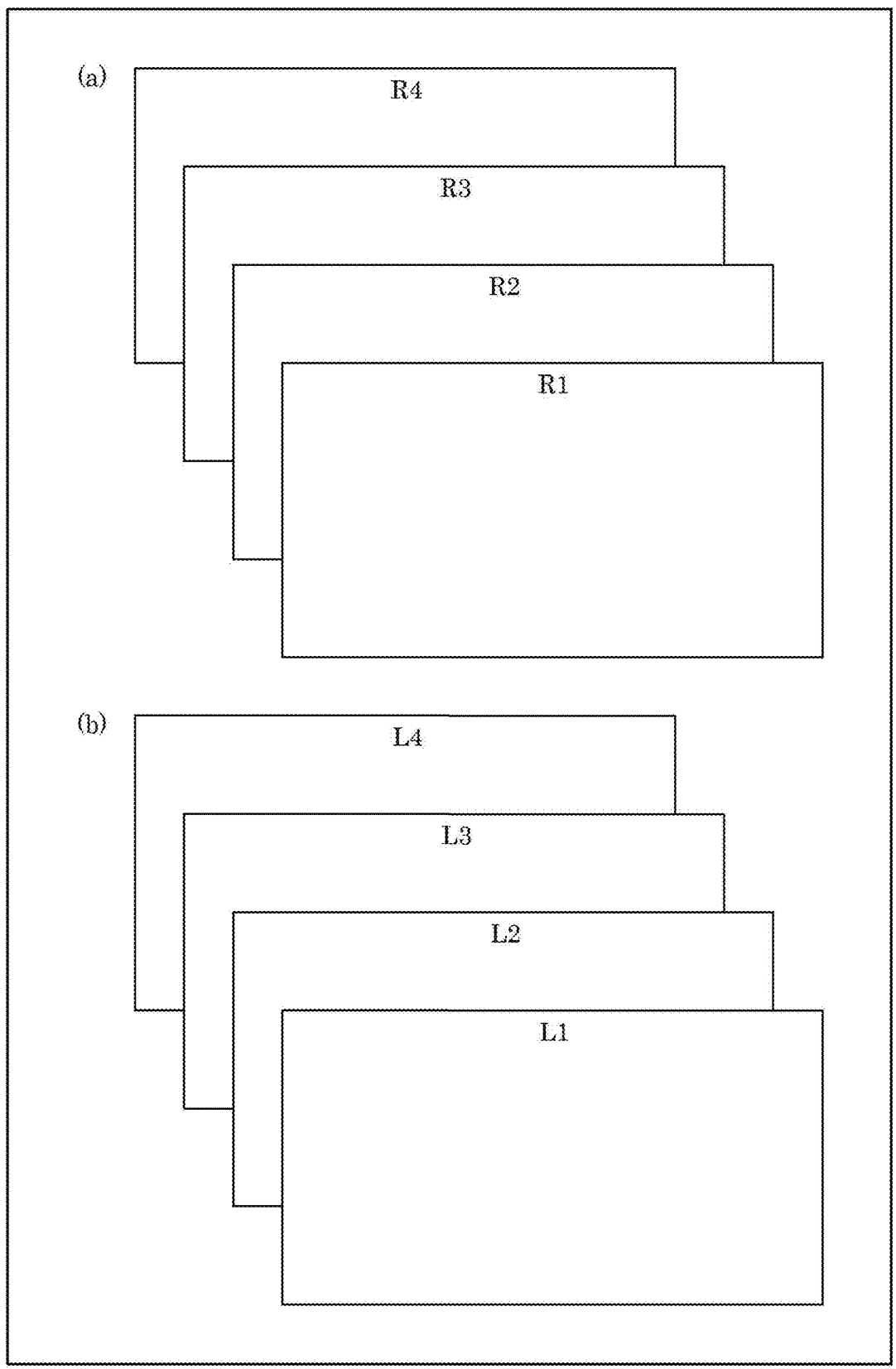
FIG. 56 is a diagram illustrating two-dimensional images generated when a plurality of measurement results are obtained at one measurement position according to Embodiment 8.

FIG. 56 is a diagram illustrating two-dimensional images generated when a plurality of measurement results are obtained at one measurement position.

In the above-described embodiment, measurer 400 may obtain a plurality of measurement results at one position. In this case, the three-dimensional data encoding device generates a plurality of two-dimensional images in which the pixel value indicates the distance as illustrated in (a) in FIG. 56. In this case, each pixel value of the plurality of two-dimensional images may be integrated into one pixel value in a plurality of pixels whose positions correspond to each other in the two-dimensional images. For example, the three-dimensional data encoding device may adopt, as one pixel value, the average or median of a plurality of pixel values held by a plurality of pixels whose positions correspond to each other. Accordingly, the distance with noise components removed can be calculated.

The three-dimensional data encoding device generates a plurality of two-dimensional images in which the pixel value indicates the reflectance as illustrated in (b) in FIG. 56. Also in the case of the reflectance, similar to the distance, integration into one pixel value may be performed.

Figure 57:
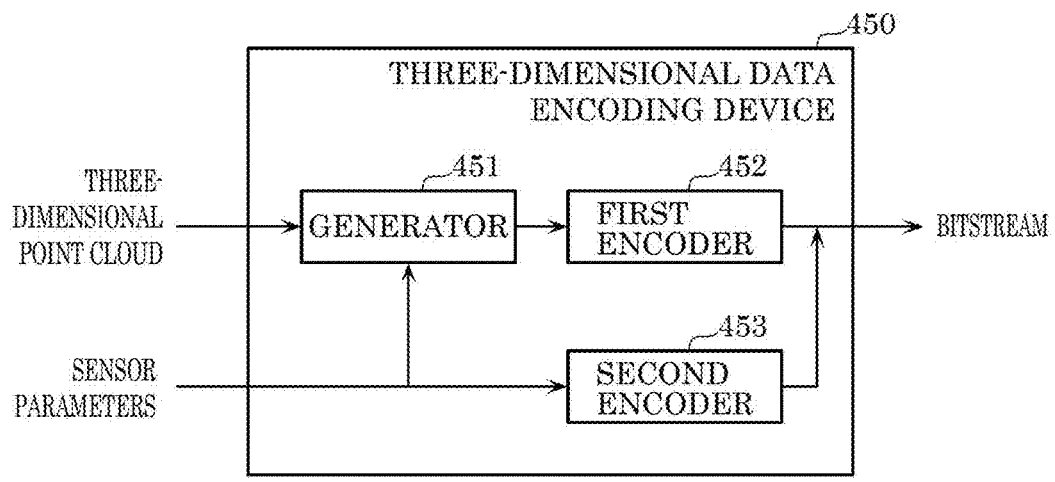
FIG. 57 is a block diagram illustrating another example of the configuration of the three-dimensional data encoding device according to Embodiment 8.

FIG. 57 is a block diagram illustrating another example of the configuration of a three-dimensional data encoding device.

Three-dimensional data encoding device 450 includes generator 451, first encoder 452, and second encoder 453.

Generator 451 obtains a three-dimensional point cloud and sensor parameters from measurer 400, and converts the geometry information indicated by three-dimensional orthogonal coordinates into the three-dimensional polar coordinates on the basis of reference point C1 of measurer 400. Then, by using the converted three-dimensional polar coordinates, generator 451 generates a two-dimensional image in which the position of each pixel indicates the vertical angle and horizontal angle from the reference direction for specifying the irradiation direction of the laser light, and in which the pixel value indicates the distance and/or the reflectance. Note that the sensor parameters include, for example, the information indicating the position and posture at which measurer 400 has measured the three-dimensional point cloud. Additionally, the sensor parameters also include the information indicating a plurality of directions in which measurer 400 emits the laser light.

First encoder 452 generates a bitstream by encoding the two-dimensional image generated by generator 451.

Second encoder 453 encodes the sensor parameters, and adds the sensor parameters to the bitstream generated by first encoder 452. For example, second encoder 453 adds the data obtained by encoding the sensor parameters as the header of a bitstream or the like.

Figure 58:
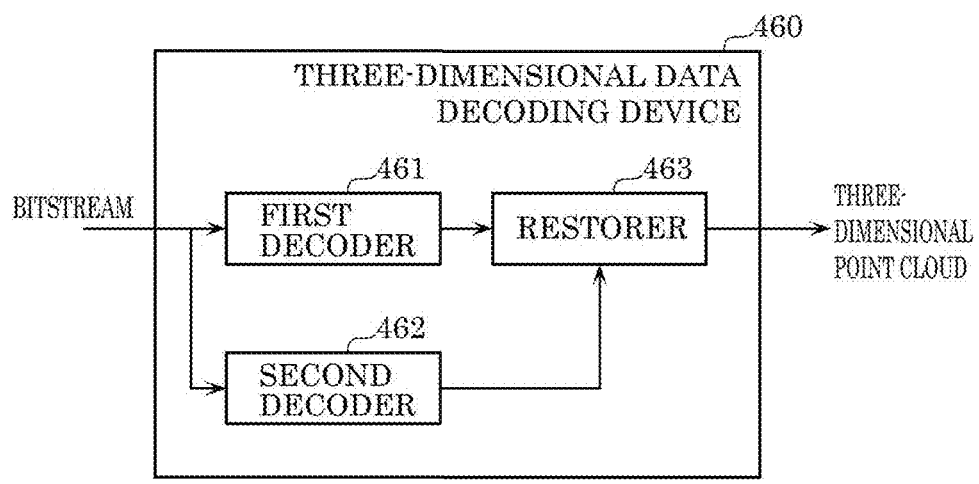
FIG. 58 is a block diagram illustrating another example of the configuration of the three-dimensional data decoding device according to Embodiment 8.

FIG. 58 is a block diagram illustrating another example of the configuration of a three-dimensional data decoding device.

Three-dimensional data decoding device 460 includes first decoder 461, second decoder 462, and restorer 463.

First decoder 461 decodes a bitstream, and obtains a two-dimensional image.

Second decoder 462 decodes the bitstream, and obtains sensor parameters.

Restorer 463 restores a three-dimensional point cloud by using the two-dimensional image obtained by first decoder 461, and the sensor parameters obtained by second decoder 462.

Note that the sensor parameters include an internal parameter, such as a design parameter or an optical parameter of measurer 400, and an external parameter indicating the position and posture relative to normal coordinates.

Figures 59, 60:
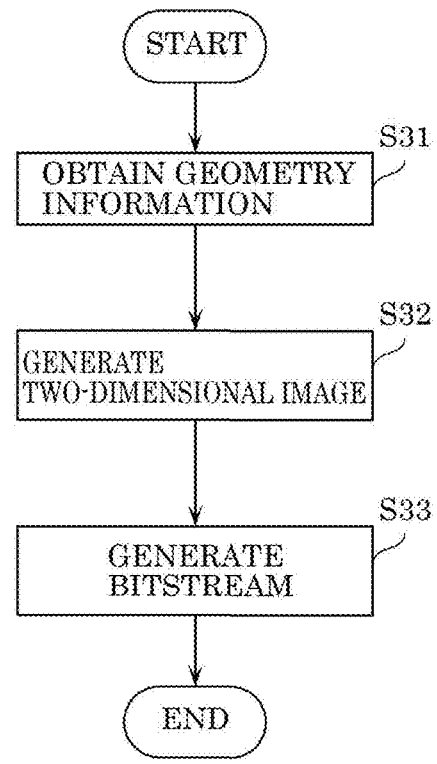
FIG. 59 is a diagram illustrating another example of the configuration of a bitstream according to Embodiment 8.
FIG. 60 is a flowchart of three-dimensional data encoding processing according to Embodiment 8.

FIG. 59 is a diagram illustrating another example of the configuration of a bitstream.

As illustrated in FIG. 59, the bitstream may include sensor parameters. That is, the three-dimensional data encoding device may generate a bitstream including the sensor parameters. Note that b0 to bn in FIG. 59 indicate the pixel values (that is, distance or reflectance) of a plurality of pixels constituting a two-dimensional image.

Although in the above-described embodiment, it is assumed that each of the plurality of first pixels of the generated two-dimensional image has a pixel value for calculating the distance from measurer 400 to the first three-dimensional position corresponding to the first pixel in the direction that corresponds to the first pixel among the plurality of directions in which measurer 400 irradiates the laser light, this is not the limitation. The pixel values of the plurality of first pixels may be the attribute information (for example, reflectance or color information) of the three-dimensional points of the three-dimensional point cloud, corresponding to the direction to which the first pixels correspond among the plurality of directions.

Note that measurer 400 may generate a three-dimensional point cloud having color information. The color information is color information that is generated by using an image imaged by measurer 400, and that indicates the color of each of a plurality of three-dimensional points included in a three-dimensional point cloud.

Specifically, measurer 400 may house a camera for imaging measurement target 500 in the periphery of measurer 400. The camera housed in measurer 400 images the region including the irradiation area of the laser light irradiated by measurer 400. Additionally, the imaged area imaged by the camera is associated with the irradiation area in advance. Specifically, the plurality of directions in which measurer 400 irradiates the laser light and each pixel in the image imaged by the camera are associated with each other in advance, and measurer 400 sets the pixel value of the image associated with the direction of the three-dimensional point as the color information that indicates the color of each of the plurality of three-dimensional points included in the three-dimensional point cloud.

In this manner, the three-dimensional point cloud of measurement target 500 generated by measurer 400 is represented by, for example, the collection of three-dimensional points indicating the respective three-dimensional positions of a plurality of measurement points on measurement target 500 (the surface of measurement target 500). The three-dimensional position indicated by each three-dimensional point of the three-dimensional point cloud is represented by, for example, the three-dimensional orthogonal coordinates of three value information that is formed from an X component, a Y component, and a X component of the three-dimensional coordinate space formed from XYZ axes. Note that the three-dimensional point cloud may include not only the geometry information indicated by the three-dimensional coordinates, but may also include the attribute information, such as the color information indicating the color of each three-dimensional point, the reflectance at the time when each three-dimensional point is measured with the laser light, and the shape information representing the surface shapes of each three-dimensional point and its periphery. The color information may be represented in, for example, the color space of RGB, or may be represented in another color space, such as HSV, HLS, and YUV.

As described above, a three-dimensional data encoding device according to this embodiment performs the processes shown in FIG. 60. The three-dimensional data encoding device obtains geometry information which includes first three-dimensional positions on a measurement target and is generated by measurer 400 that radially emits an electromagnetic wave in a plurality of directions that are different and obtains a reflected wave which is the electromagnetic wave that is reflected by the measurement target (S31). The three-dimensional data encoding device generates a two-dimensional image including first pixels corresponding to the plurality of directions, based on the geometry information (S32). The three-dimensional data encoding device encodes the two-dimensional image to generate a bitstream (S33). Each of the first pixels has a pixel value indicating a first three-dimensional position or attribute information of a three-dimensional point which is included in a three-dimensional point cloud and corresponds to a direction to which the first pixel corresponds among the plurality of directions.

For example, the pixel value indicating the first three-dimensional position is a pixel value for calculating a distance from the measurer to the first three-dimensional position corresponding to the first pixel having the pixel value, in the direction to which the first pixel corresponds among the plurality of directions.

For example, the generating of the two-dimensional image (S32) includes projecting the first three-dimensional positions included in geometry information onto a projecting plane which is virtually disposed in a periphery of the measurer to generate the two-dimensional image which includes, as the first pixels, pixels corresponding to positions of the projecting plane onto which the first three-dimensional positions are projected.

For example, the generating of the two-dimensional image (S32) includes normalizing the first three-dimensional positions included in geometry information and projecting second two-dimensional positions obtained through the normalizing onto a projecting plane to generate the two-dimensional image which includes, as the first pixels, pixels corresponding to positions on the projecting plane onto which the second three-dimensional positions are projected.

For example, the projecting plane includes one or more planes. Furthermore, the bitstream includes plane information indicating the one or more planes.

For example, the projecting plane includes a plurality of planes. The generating of the two-dimensional image (S32) includes (i) projecting the first two-dimensional positions included in the geometry information onto the plurality of planes to generate sub-two-dimensional images, and (ii) combining the sub-two-dimensional images into one image to generate the two-dimensional image.

For example, the two-dimensional image further includes second pixels for which none of the first three-dimensional positions are projected. The bitstream includes pixel information indicating whether each of pixels included in the two-dimensional image is one of the first pixels or one of the second pixels.

For example, the bitstream includes direction information indicating the plurality of directions in which measurer 400 emits the electromagnetic waves.

For example, each of the plurality of directions is defined by a first angle and a second angle, the first angle being formed relative to a reference plane passing through measurer 400, the second angle being formed relative to a reference direction centered on an axis which passes through measurer 400 and orthogonally intersects the reference plane.

For example, a vertical position in a vertical direction of each pixel of the two-dimensional image indicates the first angle. A horizontal position in a horizontal direction of each pixel of the two-dimensional image indicates the second angle.

For example, each of the first three-dimensional positions indicates three-dimensional coordinates in a three-dimensional space. The generating of the two-dimensional image (S32) includes, for each of the first three-dimensional positions, converting the three-dimensional coordinates indicated by the first three-dimensional position into the first angle, the second angle, and the distance, and generating the two-dimensional image using results of the converting.

For example, a three-dimensional data encoding device includes a processor and memory, and the processor, using the memory, performs the above-described processes.

Figure 61:
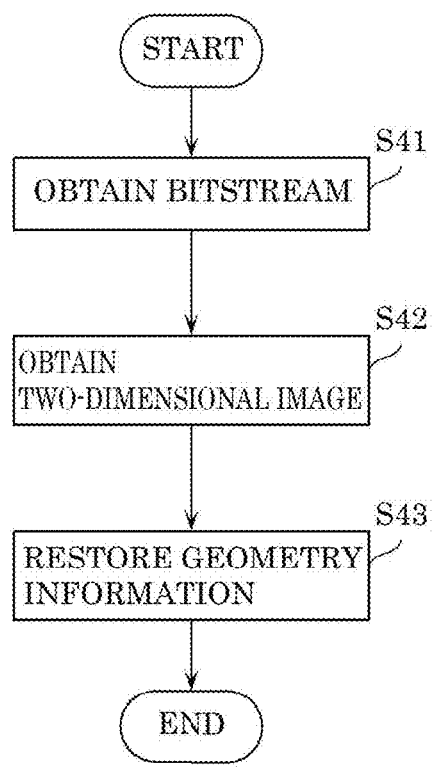
FIG. 61 is a flowchart of three-dimensional data decoding processing according to Embodiment 8.

Furthermore, a three-dimensional data decoding device according to this embodiment performs the processes shown in FIG. 61. The three-dimensional data decoding device obtains a bitstream generated by encoding a two-dimensional image including first pixels each corresponding to a different one of a plurality of directions which are different and extend radially from measurer 400, the first pixels each having a pixel value indicating a first three-dimensional position or attribute information of a three-dimensional point in the direction to which the first pixel corresponds (S41). The three-dimensional data decoding device decodes the bitstream to obtain the two-dimensional image (S42). The three-dimensional data decoding device restores geometry information including first three-dimensional positions on a measurement target, using the two-dimensional image, the first three-dimensional positions including the first three-dimensional position (S43).

For example, the pixel value indicating the first three-dimensional position is a pixel value for calculating a distance from the measurer to the first three-dimensional position corresponding to the first pixel having the pixel value, in the direction to which the first pixel corresponds among the plurality of directions.

For example, the two-dimensional image includes, as the first pixels obtained by projecting the first two-dimensional positions included in the geometry information onto a projecting plane which is virtually disposed in a periphery of the measurer, pixels corresponding to positions of the projecting plane onto which the first three-dimensional positions are projected. The restoring (S43) includes re-arranging the first pixels included in the two-dimensional image, in a three-dimensional space in a periphery of the measurer, to restore the geometry information including the first three-dimensional positions.

For example, the distances are represented by normalized information. The restoring (S43) includes restoring the first three-dimensional positions based on the normalized information.

For example, the projecting plane includes one or more planes. The bitstream includes plane information indicating the one or more planes. The restoring (S43) includes restoring the first three-dimensional positions by further using the plane information.

For example, the projecting plane includes one or more planes. The two-dimensional image includes sub-two-dimensional images each corresponding to a different one of the sub-two-dimensional images. The restoring (S43) includes rearranging the first pixels included in the sub-two-dimensional images, in the three-dimensional space in the periphery of the measurer, to restore the geometry information including the first three-dimensional positions.

For example, the two-dimensional image includes the first pixels for which the first three-dimensional positions are projected, and second pixels for which none of the first three-dimensional positions are projected. The bitstream includes pixel information indicating whether each of pixels included in the two-dimensional image is one of the first pixels or one of the second pixels.

For example, the bitstream includes direction information indicating the plurality of directions in which the measurer emits electromagnetic waves for measuring.

For example, each of the plurality of directions is defined by a first angle and a second angle, the first angle being formed relative to a reference plane passing through the measurer, the second angle being formed relative to a reference direction centered on an axis which passes through the measurer and orthogonally intersects the reference plane.

For example, a vertical position in a vertical direction of each pixel of the two-dimensional image indicates the first angle. A horizontal position in a horizontal direction of each pixel of the two-dimensional image indicates the second angle.

For example, the restoring (S43) includes, for each pixel included in the two-dimensional image, converting the first angle indicated by the vertical position of the pixel, the rotation angle indicated by the horizontal position of the pixel, and the distance indicated by the pixel value of the pixel, into three-dimensional coordinates in a three-dimensional space, to restore the first three-dimensional positions each indicated by a different set of the three-dimensional coordinates.

For example, the three-dimensional data decoding device includes a processor and memory, and the processor, using the memory, performs the above-described processes.

Although a three-dimensional data encoding device, a three-dimensional data decoding device, and the like, according to embodiments of the present disclosure have been described above, the present disclosure is not limited these embodiments.

Note that each of the processors included in the three-dimensional data encoding device, the three-dimensional data decoding device, and the like according to the above embodiments is typically implemented as a large-scale integrated (LSI) circuit, which is an integrated circuit (IC). These may take the form of individual chips, or may be partially or entirely packaged into a single chip.

Furthermore, the integrated circuit is not limited to an LSI, and may be implemented as a dedicated circuit or a general-purpose processor. Alternatively, a field programmable gate array (FPGA) that allows for programming after the manufacture of an LSI, or a reconfigurable processor that allows for reconfiguration of the connection and the setting of circuit cells inside an LSI may be employed.

Moreover, in the above embodiments, the structural components may be implemented as dedicated hardware or may be realized by executing a software program suited to such structural components. Alternatively, the structural components may be implemented by a program executor such as a CPU or a processor reading out and executing the software program recorded in a recording medium such as a hard disk or a semiconductor memory.

Furthermore, the present disclosure may be implemented as a three-dimensional data encoding method, a three-dimensional data decoding method, and the like, executed by a three-dimensional data encoding device, a three-dimensional data decoding device, and the like.

Also, the divisions of the functional blocks shown in the block diagrams are mere examples, and thus a plurality of functional blocks may be implemented as a single functional block, or a single functional block may be divided into a plurality of functional blocks, or one or more functions may be moved to another functional block. Also, the functions of a plurality of functional blocks having similar functions may be processed by single hardware or software in a parallelized or time-divided manner.

Also, the processing order of executing the steps shown in the flowcharts is a mere illustration for specifically describing the present disclosure, and thus may be an order other than the shown order. Also, one or more of the steps may be executed simultaneously (in parallel) with another step.

A three-dimensional data encoding device, a three-dimensional data decoding device, and the like according to one or more aspects have been described above based on the embodiments, but the present disclosure is not limited to these embodiments. The one or more aspects may thus include forms achieved by making various modifications to the above embodiments that can be conceived by those skilled in the art, as well forms achieved by combining structural components in different embodiments, without materially departing from the spirit of the present disclosure.

INDUSTRIAL APPLICABILITY

The present disclosure is applicable to a three-dimensional data encoding device and a three-dimensional data decoding device.

What is claimed is:

1. A three-dimensional data encoding method, comprising:
obtaining a plurality of parameters including first horizontal angle information and first vertical angle information;
converting, using at least one of the plurality of parameters, orthogonal geometry information into polar geometry information including second horizontal angle information, second vertical angle information, and distance information from a reference point corresponding to each position of a point included in three-dimensional point data; and
encoding the polar geometry information.

2. The three-dimensional data encoding method according to claim 1,
wherein the reference point corresponds to a position of a measurer that generates the orthogonal geometry information.

3. The three-dimensional data encoding method according to claim 1,
wherein the orthogonal geometry information and the plurality of parameters are obtained from a measurer.

4. The three-dimensional data encoding method according to claim 1, further comprising:
generating a two-dimensional image by projecting the polar geometry information converted on a vertical plane; and
encoding the two-dimensional image, wherein
the polar geometry information encoded includes the two-dimensional image encoded.

5. A three-dimensional data decoding method, comprising:
obtaining a plurality of parameters including first horizontal angle information and first vertical angle information;
decoding polar geometry information including second horizontal angle information, second vertical angle information, and distance information from a reference point corresponding to each position of a point included in three-dimensional point data;
converting, using at least one of the plurality of parameter, the polar geometry information into orthogonal geometry information.

6. The three-dimensional data decoding method according to claim 5,
wherein the reference point corresponds to a position of a measurer that generates the orthogonal geometry information.

7. The three-dimensional data decoding method according to claim 5,
wherein the plurality of parameters are generated from a measurer.

8. The three-dimensional data decoding method according to claim 5, further comprising:
the polar geometry information include a two-dimensional image generated by projecting the three-dimensional point data on a vertical plane; and
decoding the two-dimensional image.

9. A three-dimensional data encoding device, comprising:
a processor; and
memory,
wherein using the memory, the processor:
obtaining a plurality of parameters including first horizontal angle information and first vertical angle information;
converting, using at least one of the plurality of parameters, orthogonal geometry information into polar geometry information including second horizontal angle information, second vertical angle information, and distance information from a reference point corresponding to each position of a point included in three-dimensional point data; and
encoding the polar geometry information.

10. A three-dimensional data decoding device, comprising:
a processor; and
memory,
wherein using the memory, the processor:
obtaining a plurality of parameters including first horizontal angle information and first vertical angle information;
decoding polar geometry information including second horizontal angle information, second vertical angle information, and distance information from a reference point corresponding to each position of a point included in three-dimensional point data;
converting, using at least one of the plurality of parameter, the polar geometry information into orthogonal geometry information.

* * * * *